(12) United States Patent
Valouch et al.

(10) Patent No.: US 11,428,787 B2
(45) Date of Patent: Aug. 30, 2022

(54) DETECTOR FOR AN OPTICAL DETECTION OF AT LEAST ONE OBJECT

(71) Applicant: trinamiX GmbH, Ludwigshafen am Rhein (DE)

(72) Inventors: Sebastian Valouch, Ludwigshafen (DE); Wilfried Hermes, Ludwigshafen (DE); Stefan Hengen, Ludwigshafen (DE); Robert Send, Ludwigshafen (DE); Ingmar Bruder, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 705 days.

(21) Appl. No.: 16/344,511

(22) PCT Filed: Oct. 24, 2017

(86) PCT No.: PCT/EP2017/077148
§ 371 (c)(1),
(2) Date: Apr. 24, 2019

(87) PCT Pub. No.: WO2018/077868
PCT Pub. Date: May 3, 2018

(65) Prior Publication Data
US 2020/0049800 A1 Feb. 13, 2020

(30) Foreign Application Priority Data
Oct. 25, 2016 (EP) ..................................... 16195457

(51) Int. Cl.
*G01S 7/48* (2006.01)
*G01S 7/481* (2006.01)
*G01S 17/46* (2006.01)

(52) U.S. Cl.
CPC ............ *G01S 7/4816* (2013.01); *G01S 17/46* (2013.01)

(58) Field of Classification Search
None
See application file for complete search history.

(56) References Cited

U.S. PATENT DOCUMENTS 3,035,176 A 5/1962 Kis et al.
3,112,197 A 11/1963 Neugebauer et al.
(Continued)

FOREIGN PATENT DOCUMENTS

CA 1065054 10/1979
CA 2196563 12/1996
(Continued)

OTHER PUBLICATIONS

Kurt Konolige et al., "A Low-Cost Laser Distance Sensor", *2008 IEEE International Conference on Robotics and Automation*, Pasadena, CA, May 19-23, 2008.
(Continued)

*Primary Examiner* — Hovhannes Baghdasaryan
(74) *Attorney, Agent, or Firm* — Armstrong Teasdale LLP

(57) ABSTRACT

A detector (110) for an optical detection of at least one object (112) is proposed. Further, the invention relates to a method for optical detection of at least one object (112) and to various uses of the detector (110). The detector (110) comprises: —at least one optical sensor (114), the optical sensor (114) having at least one sensor region (132), the sensor region (132) comprising at least one curved substrate (142) and at least one film (134) having a photoconductive material (136), wherein the film (134) is placed on at least one surface (140, 172) of the curved substrate (142), wherein the optical sensor (114) is designed to generate at least one sensor signal in a manner dependent on an illumination of
(Continued)

the sensor region (132) by a light beam (124); —at least one transfer device (120), the transfer device (120) being adapted to transfer the light beam (124) from the object (112) to the optical sensor (114), thereby being adapted to guide the light beam (124) to the film (134) located on the curved substrate (142); and—at least one evaluation device (154), wherein the evaluation device (154) is designed to generate at least one item of information on a position of the object (112) by evaluating the sensor signal of the optical sensor (114). Thereby, a simple, cost-efficient and, still, reliable detector (110) for an accurate determining of a position of at least one object (112) in space is provided.

13 Claims, 3 Drawing Sheets

(56) References Cited

U.S. PATENT DOCUMENTS

| | | | |
|---|---|---|---|
| 3,384,752 A | 5/1968 | Odone | |
| 3,562,785 A | 2/1971 | Craig | |
| 3,564,268 A | 2/1971 | Bayne et al. | |
| 3,873,823 A | 3/1975 | Northrup et al. | |
| 3,937,950 A | 2/1976 | Hosoe et al. | |
| 3,954,340 A | 5/1976 | Blomqvist et al. | |
| 4,023,033 A | 5/1977 | Bricot et al. | |
| 4,053,240 A | 10/1977 | Aizawa et al. | |
| 4,079,247 A | 3/1978 | Briscot et al. | |
| 4,256,513 A | 3/1981 | Yoshida | |
| 4,286,035 A | 8/1981 | Nishizima et al. | |
| 4,346,293 A | 8/1982 | Fetzer | |
| 4,469,945 A | 9/1984 | Hoeberechts et al. | |
| 4,524,276 A | 6/1985 | Ohtombe | |
| 4,565,761 A | 1/1986 | Katagiri et al. | |
| 4,584,704 A | 4/1986 | Ferren | |
| 4,593,187 A | 6/1986 | Grotts et al. | |
| 4,602,158 A | 7/1986 | Barrett | |
| 4,603,258 A | 7/1986 | Sher et al. | |
| 4,647,193 A | 3/1987 | Rosenfeld | |
| 4,675,535 A | 6/1987 | Tsunekawa et al. | |
| 4,694,172 A | 9/1987 | Powell et al. | |
| 4,760,004 A | 7/1988 | Rochat et al. | |
| 4,760,151 A | 7/1988 | Rochat et al. | |
| 4,767,211 A | 8/1988 | Munakata et al. | |
| 4,773,751 A | 9/1988 | Matsuda et al. | |
| 4,927,721 A | 5/1990 | Gratzel et al. | |
| 4,952,472 A | 8/1990 | Baranyi et al. | |
| 5,082,363 A | 1/1992 | Nakanishi et al. | |
| 5,216,476 A | 6/1993 | Lanckton | |
| 5,227,985 A | 7/1993 | Dementhon et al. | |
| 5,235,377 A | 8/1993 | Ide et al. | |
| 5,291,066 A | 3/1994 | Neugebauer et al. | |
| 5,343,291 A | 8/1994 | Ohwada et al. | |
| 5,350,644 A | 9/1994 | Graetzel et al. | |
| 5,355,241 A | 10/1994 | Kelley | |
| 5,375,008 A | 12/1994 | Guerreri | |
| 5,512,997 A | 4/1996 | Ogawa | |
| 5,576,975 A | 11/1996 | Sasaki et al. | |
| 5,581,094 A | 12/1996 | Hara et al. | |
| 5,589,928 A | 12/1996 | Babbitt et al. | |
| 5,726,743 A * | 3/1998 | Krawczyk | G01S 7/4811 |
| | | | 356/28.5 |
| 5,856,844 A | 1/1999 | Batterman et al. | |
| 6,061,122 A | 5/2000 | Hoshino et al. | |
| 6,163,371 A | 12/2000 | Kato et al. | |
| 6,191,881 B1 | 2/2001 | Tajima | |
| 6,229,913 B1 | 5/2001 | Nayar et al. | |
| 6,266,142 B1 | 7/2001 | Junkins et al. | |
| 6,359,211 B1 | 3/2002 | Spitler et al. | |
| 6,417,836 B1 | 7/2002 | Kumar et al. | |
| 6,512,233 B1 | 1/2003 | Sato et al. | |
| 6,785,028 B1 | 8/2004 | Atsuumi et al. | |
| 6,930,297 B1 | 8/2005 | Nakamura | |
| 6,947,459 B2 | 9/2005 | Kurtz et al. | |
| 6,995,445 B2 | 2/2006 | Forrest et al. | |
| 7,022,966 B2 | 4/2006 | Gonzo et al. | |
| 7,049,601 B2 | 5/2006 | Agano | |
| 7,196,317 B1 | 3/2007 | Meissner et al. | |
| 7,247,851 B2 | 7/2007 | Okada et al. | |
| 7,301,608 B1 | 11/2007 | Mendenhall et al. | |
| 7,417,716 B2 | 8/2008 | Nagasaka et al. | |
| 7,626,569 B2 | 12/2009 | Lanier | |
| 7,677,742 B2 | 3/2010 | Hillmer et al. | |
| 7,768,498 B2 | 8/2010 | Wey | |
| 7,773,070 B2 | 8/2010 | Trisnadi et al. | |
| 7,939,932 B2 | 5/2011 | Martin | |
| 8,013,901 B2 | 9/2011 | Fukuhara et al. | |
| 8,019,166 B2 | 9/2011 | Cheng et al. | |
| 8,107,056 B1 | 1/2012 | Riza | |
| 8,144,173 B2 | 3/2012 | Baba | |
| 8,228,299 B1 | 7/2012 | Maloney et al. | |
| 8,231,809 B2 | 7/2012 | Pschirer et al. | |
| 8,345,003 B1 | 1/2013 | Trisnadi et al. | |
| 8,363,526 B2 | 1/2013 | Hotta et al. | |
| 8,390,793 B2 | 3/2013 | Yamaguchi et al. | |
| 8,411,289 B2 | 4/2013 | Takahashi | |
| 8,477,580 B2 | 7/2013 | Yamamoto et al. | |
| 8,563,855 B2 | 10/2013 | Pschirer et al. | |
| 8,593,565 B2 | 11/2013 | Shuster | |
| 8,902,354 B2 | 12/2014 | Shuster | |
| 8,908,157 B2 | 12/2014 | Eisele et al. | |
| 9,104,910 B2 | 8/2015 | Huang | |
| 9,385,326 B2 | 7/2016 | Wonneberger et al. | |
| 9,389,315 B2 | 7/2016 | Bruder et al. | |
| 9,428,518 B2 | 8/2016 | Wonneberger et al. | |
| 9,557,856 B2 | 1/2017 | Send et al. | |
| 9,646,365 B1 | 5/2017 | Hinkel et al. | |
| 9,665,182 B2 | 5/2017 | Send et al. | |
| 9,741,954 B2 | 8/2017 | Bruder et al. | |
| 9,787,899 B1 | 10/2017 | Hinkel et al. | |
| 9,829,564 B2 | 11/2017 | Bruder et al. | |
| 9,919,999 B2 | 3/2018 | Koenemann et al. | |
| 9,958,535 B2 | 5/2018 | Send et al. | |
| 9,989,623 B2 | 6/2018 | Send et al. | |
| 10,012,532 B2 | 7/2018 | Send et al. | |
| 10,094,927 B2 | 10/2018 | Send et al. | |
| 10,120,078 B2 | 11/2018 | Bruder et al. | |
| 10,290,817 B2 | 5/2019 | Battagliarin et al. | |
| 10,412,283 B2 | 9/2019 | Send et al. | |
| 2001/0025938 A1 | 10/2001 | Imai | |
| 2002/0011576 A1 | 1/2002 | Cho et al. | |
| 2003/0017360 A1 | 1/2003 | Tai et al. | |
| 2003/0094607 A1 | 5/2003 | Guenther et al. | |
| 2003/0128351 A1 | 7/2003 | Schmidt | |
| 2003/0132391 A1 | 7/2003 | Agano | |
| 2003/0227635 A1 | 12/2003 | Muller | |
| 2004/0178325 A1 | 9/2004 | Forrest et al. | |
| 2004/0190117 A1 | 9/2004 | Kubaink | |
| 2004/0216625 A1 | 11/2004 | Birnstock et al. | |
| 2005/0052120 A1 | 3/2005 | Gupta et al. | |
| 2005/0061957 A1 | 3/2005 | Kase | |
| 2005/0122308 A1 | 6/2005 | Bell et al. | |
| 2005/0184301 A1 | 8/2005 | Nagasaka et al. | |
| 2005/0217720 A1 | 10/2005 | Rey-Mermet et al. | |
| 2005/0227390 A1 | 10/2005 | Shtein et al. | |
| 2005/0227406 A1 | 10/2005 | Shtein et al. | |
| 2005/0268957 A1 | 12/2005 | Enomoto et al. | |
| 2005/0269616 A1 | 12/2005 | Andriessen | |
| 2006/0044546 A1 | 3/2006 | Lewin et al. | |
| 2006/0049397 A1 | 3/2006 | Pfeiffer et al. | |
| 2006/0065833 A1 | 3/2006 | Craig et al. | |
| 2006/0075585 A1 | 4/2006 | Krieger et al. | |
| 2006/0082546 A1 | 4/2006 | Wey | |
| 2007/0008515 A1 | 1/2007 | Otani et al. | |
| 2007/0010924 A1 | 1/2007 | Otani et al. | |
| 2007/0046625 A1 | 3/2007 | Yee | |
| 2007/0080925 A1 | 4/2007 | Radivojevic et al. | |
| 2007/0109558 A1 | 5/2007 | Harding | |
| 2007/0122927 A1 | 5/2007 | Li et al. | |
| 2007/0176165 A1 | 8/2007 | Forrest et al. | |
| 2007/0183047 A1 | 8/2007 | Phillips et al. | |
| 2007/0206181 A1 | 9/2007 | Arenberg et al. | |

(56) References Cited

U.S. PATENT DOCUMENTS

| | | |
|---|---|---|
| 2008/0013005 A1 | 1/2008 | Deane |
| 2008/0080789 A1 | 4/2008 | Marks |
| 2008/0157965 A1 | 7/2008 | Shahar |
| 2008/0170750 A1 | 7/2008 | Gordon |
| 2008/0025931 A1 | 10/2008 | Wada |
| 2008/0269482 A1 | 10/2008 | Pschirer et al. |
| 2008/0284925 A1 | 11/2008 | Han |
| 2008/0297487 A1 | 12/2008 | Hotelling et al. |
| 2009/0009747 A1 | 1/2009 | Wolf |
| 2009/0046543 A1 | 2/2009 | De Hoog et al. |
| 2009/0009701 A1 | 4/2009 | Yamaguchi |
| 2009/0153841 A1 | 6/2009 | Ophey et al. |
| 2009/0185158 A1 | 7/2009 | Wolf |
| 2009/0188547 A1 | 7/2009 | Hayashi et al. |
| 2009/0225319 A1 | 9/2009 | Lee |
| 2009/0231582 A1 | 9/2009 | Aebischer |
| 2009/0322677 A1 | 12/2009 | Lee et al. |
| 2010/0073462 A1 | 3/2010 | Lee et al. |
| 2010/0091263 A1 | 4/2010 | Kumagai et al. |
| 2010/0141927 A1 | 6/2010 | Hashimoto et al. |
| 2010/0141964 A1 | 6/2010 | Horsch |
| 2010/0194942 A1 | 8/2010 | Wada |
| 2010/0231513 A1 | 9/2010 | Deliwala |
| 2010/0258179 A1 | 10/2010 | Wieting |
| 2010/0279458 A1 | 11/2010 | Yeh |
| 2010/0282309 A1 | 11/2010 | Pschirer et al. |
| 2010/0283868 A1 | 11/2010 | Clark et al. |
| 2010/0297405 A1 | 11/2010 | Flores et al. |
| 2011/0032365 A1 | 2/2011 | Yett |
| 2011/0055846 A1 | 3/2011 | Perez et al. |
| 2011/0096319 A1 | 4/2011 | Otani et al. |
| 2011/0099105 A1 | 4/2011 | Mennie et al. |
| 2011/0103215 A1 | 5/2011 | Hotta et al. |
| 2011/0122287 A1 | 5/2011 | Kunishige et al. |
| 2011/0123188 A1 | 5/2011 | Cardwell et al. |
| 2011/0127788 A1 | 6/2011 | Nakanishi |
| 2011/0181553 A1 | 7/2011 | Brown et al. |
| 2011/0194097 A1 | 8/2011 | Yamaguchi et al. |
| 2011/0284756 A1 | 11/2011 | Miko et al. |
| 2011/0286661 A1 | 11/2011 | Lee et al. |
| 2011/0297235 A1 | 12/2011 | Bergmann |
| 2011/0306413 A1 | 12/2011 | Bickerstaff et al. |
| 2011/0317146 A1 | 12/2011 | Gu et al. |
| 2012/0013885 A1 | 1/2012 | Yang et al. |
| 2012/0061587 A1 | 3/2012 | Wu |
| 2012/0062517 A1 | 3/2012 | Lai et al. |
| 2012/0063287 A1 | 3/2012 | Yamamoto et al. |
| 2012/0105690 A1 | 5/2012 | Waqas et al. |
| 2012/0146028 A1 | 6/2012 | Oda et al. |
| 2012/0160298 A1 | 6/2012 | Kanamoto et al. |
| 2012/0162410 A1 | 6/2012 | Vaillant |
| 2012/0206336 A1 | 8/2012 | Bruder |
| 2012/0242867 A1 | 9/2012 | Shuster |
| 2012/0249998 A1 | 10/2012 | Eisele et al. |
| 2012/0250137 A1 | 10/2012 | Maxik et al. |
| 2012/0262365 A1 | 10/2012 | Mallinson |
| 2012/0262696 A1 | 10/2012 | Eisele et al. |
| 2012/0289672 A1 | 11/2012 | Kastler et al. |
| 2012/0293651 A1 | 11/2012 | Kawamata et al. |
| 2012/0320160 A1 | 12/2012 | Drazic |
| 2012/0328906 A1 | 12/2012 | Kwon et al. |
| 2013/0033579 A1 | 2/2013 | Wajs |
| 2013/0076695 A1 | 3/2013 | Gomez et al. |
| 2013/0135604 A1 | 5/2013 | Gogolla et al. |
| 2013/0201492 A1 | 8/2013 | Takahashi |
| 2013/0222551 A1 | 8/2013 | Shamir et al. |
| 2013/0235390 A1 | 9/2013 | Holzapfel et al. |
| 2013/0242283 A1 | 9/2013 | Bailey et al. |
| 2013/0266210 A1 | 10/2013 | Morgan-Mar et al. |
| 2013/0271818 A1 | 10/2013 | Maxik et al. |
| 2013/0320302 A1 | 12/2013 | Park et al. |
| 2014/0015242 A1 | 1/2014 | Forrest |
| 2014/0043610 A1 | 2/2014 | Engel et al. |
| 2014/0066656 A1 | 3/2014 | Bruder et al. |
| 2014/0078376 A1 | 3/2014 | Shuster |
| 2014/0124782 A1 | 5/2014 | Jung et al. |
| 2014/0132724 A1 | 5/2014 | Choi et al. |
| 2014/0209789 A1 | 7/2014 | Hu |
| 2014/0211295 A1 | 7/2014 | Maxik et al. |
| 2014/0217329 A1 | 8/2014 | Hayoz et al. |
| 2014/0233028 A1 | 8/2014 | Englund |
| 2014/0291480 A1* | 10/2014 | Bruder ............... G01S 7/4816 250/206 |
| 2014/0347442 A1 | 11/2014 | Wang et al. |
| 2014/0368726 A1 | 12/2014 | Gladnick |
| 2015/0029326 A1 | 1/2015 | Backman et al. |
| 2015/0085166 A1 | 3/2015 | Shuster |
| 2015/0111337 A1 | 4/2015 | Welker et al. |
| 2015/0124241 A1 | 5/2015 | Eisele et al. |
| 2015/0124268 A1 | 5/2015 | Bruder et al. |
| 2015/0132887 A1 | 5/2015 | Welker et al. |
| 2015/0170400 A1 | 6/2015 | Seitz et al. |
| 2015/0286340 A1 | 10/2015 | Send et al. |
| 2015/0346911 A1 | 12/2015 | Christiansson |
| 2015/0372046 A1 | 12/2015 | Kim et al. |
| 2016/0099429 A1 | 4/2016 | Bruder et al. |
| 2016/0124074 A1 | 5/2016 | Wonneberger et al. |
| 2016/0127664 A1 | 5/2016 | Bruder et al. |
| 2016/0139243 A1 | 5/2016 | Send et al. |
| 2016/0140786 A1 | 5/2016 | Wang |
| 2016/0155575 A1 | 6/2016 | Yamato et al. |
| 2016/0177177 A1 | 6/2016 | Koenemann et al. |
| 2016/0211464 A1 | 7/2016 | Tanabe et al. |
| 2016/0218302 A1 | 7/2016 | Hermes et al. |
| 2016/0224110 A1 | 8/2016 | Massonneau et al. |
| 2016/0248021 A1 | 8/2016 | Sundarraj et al. |
| 2016/0255323 A1 | 9/2016 | Wajs |
| 2016/0266257 A1 | 9/2016 | Bruder et al. |
| 2016/0286199 A1 | 9/2016 | Wajs et al. |
| 2016/0320489 A1 | 11/2016 | Send et al. |
| 2016/0364015 A1 | 12/2016 | Send et al. |
| 2017/0039793 A1 | 2/2017 | Send et al. |
| 2017/0074652 A1 | 3/2017 | Send et al. |
| 2017/0082426 A1 | 3/2017 | Bruder et al. |
| 2017/0082486 A1 | 3/2017 | Send et al. |
| 2017/0123593 A1 | 5/2017 | Send et al. |
| 2017/0183295 A1 | 6/2017 | Koenemann et al. |
| 2017/0205230 A1 | 7/2017 | Send et al. |
| 2017/0219694 A1 | 8/2017 | Send et al. |
| 2017/0219709 A1 | 8/2017 | Send et al. |
| 2017/0237926 A1 | 8/2017 | Bruder et al. |
| 2017/0250334 A1 | 8/2017 | Hermes et al. |
| 2017/0263868 A1 | 9/2017 | Tanabe et al. |
| 2017/0309828 A1 | 10/2017 | Tanabe et al. |
| 2017/0363465 A1 | 12/2017 | Send et al. |
| 2017/0363741 A1 | 12/2017 | Send et al. |
| 2018/0003993 A1 | 1/2018 | Send et al. |
| 2018/0007343 A1 | 1/2018 | Send et al. |
| 2018/0017679 A1 | 1/2018 | Valouch et al. |
| 2018/0031672 A1 | 2/2018 | Bruder et al. |
| 2018/0044357 A1 | 2/2018 | Spielmann et al. |
| 2018/0067213 A1 | 3/2018 | Send et al. |
| 2018/0136319 A1 | 5/2018 | Send et al. |
| 2018/0182980 A1 | 6/2018 | Lennartz et al. |
| 2018/0210064 A1 | 7/2018 | Send et al. |
| 2018/0231376 A1 | 8/2018 | Send et al. |
| 2018/0238993 A1 | 8/2018 | Send et al. |
| 2018/0243045 A1 | 8/2018 | Franjic et al. |
| 2018/0249051 A1 | 8/2018 | Send et al. |
| 2018/0276843 A1 | 9/2018 | Send et al. |
| 2018/0329024 A1 | 11/2018 | Send et al. |
| 2018/0356501 A1 | 12/2018 | Send et al. |
| 2019/0129035 A1 | 5/2019 | Valouch et al. |
| 2019/0129036 A1 | 5/2019 | Valouch et al. |
| 2019/0140129 A1 | 5/2019 | Valouch et al. |
| 2019/0157470 A1 | 5/2019 | Send et al. |
| 2019/0170849 A1 | 6/2019 | Hermes et al. |
| 2019/0172964 A1 | 6/2019 | Hermes et al. |
| 2019/0198206 A1 | 6/2019 | Ter Maat et al. |

(56) References Cited

U.S. PATENT DOCUMENTS

2019/0277703 A1 9/2019 Valouch et al.
2020/0003899 A1 1/2020 Lungenschmied et al.

FOREIGN PATENT DOCUMENTS

| | | |
|---|---|---|
| CN | 1270706 | 10/2000 |
| CN | 1677053 A | 10/2005 |
| CN | 1723564 A | 1/2006 |
| CN | 1777859 | 5/2006 |
| CN | 1809801 A | 7/2006 |
| CN | 1894976 | 1/2007 |
| CN | 1896686 A | 1/2007 |
| CN | 101129074 | 2/2008 |
| CN | 101290348 A | 10/2008 |
| CN | 101449181 | 6/2009 |
| CN | 101650173 A | 2/2010 |
| CN | 101655350 | 2/2010 |
| CN | 101859439 A | 10/2010 |
| CN | 102096962 | 6/2011 |
| CN | 201897828 | 7/2011 |
| CN | 102435136 | 5/2012 |
| CN | 102506754 A | 6/2012 |
| CN | 102549380 | 7/2012 |
| CN | 102549381 A | 7/2012 |
| CN | 102737435 | 10/2012 |
| CN | 102833569 | 12/2012 |
| CN | 103106411 A | 5/2013 |
| CN | 103322910 A | 9/2013 |
| CN | 103403494 | 11/2013 |
| CN | 103492835 | 1/2014 |
| CN | 103649677 | 3/2014 |
| CN | 103650478 | 3/2014 |
| DE | 2 417 854 | 10/1974 |
| DE | 25 01 124 A1 | 8/1975 |
| DE | 32 25 372 A1 | 2/1983 |
| DE | 42 11 875 | 10/1993 |
| DE | 196 04 856 | 8/1997 |
| DE | 10146752 | 4/2002 |
| DE | 10 2005 043 627 A1 | 3/2007 |
| DE | 10 2005 053 995 | 5/2007 |
| DE | 10 2007 037 875 A1 | 2/2009 |
| DE | 10 2010 042 278 | 4/2012 |
| DE | 20 2012 009 070 | 1/2013 |
| DE | 10 2014 108 353 A1 | 12/2014 |
| EP | 0 112 169 A2 | 6/1984 |
| EP | 0 185 450 A2 | 6/1986 |
| EP | 0 309 631 | 4/1989 |
| EP | 0 754 930 A2 | 1/1997 |
| EP | 1 176 646 A1 | 1/2002 |
| EP | 1 191 819 | 3/2002 |
| EP | 1 330 117 | 7/2003 |
| EP | 1 373 272 | 1/2004 |
| EP | 1 667 246 A1 | 6/2006 |
| EP | 1 832 910 | 9/2007 |
| EP | 1 947 477 | 7/2008 |
| EP | 2 205 657 A1 | 7/2010 |
| EP | 2 220 141 A1 | 8/2010 |
| EP | 2 507 286 A2 | 10/2012 |
| EP | 2 527 866 A1 | 11/2012 |
| EP | 2 725 617 A1 | 4/2014 |
| EP | 2 735 542 | 5/2014 |
| EP | 2 813 324 | 12/2014 |
| EP | 2 818 493 A1 | 12/2014 |
| EP | 15 153 215 | 1/2015 |
| EP | 2 831 180 | 2/2015 |
| EP | 15 157 363 | 3/2015 |
| EP | 15 164 653 | 4/2015 |
| EP | 2 884 303 A1 | 6/2015 |
| EP | 15 177 275 | 7/2015 |
| EP | 15 180 353 | 8/2015 |
| EP | 15 180 354 | 8/2015 |
| EP | 15 185 005 | 9/2015 |
| EP | 15 191 960 | 10/2015 |
| EP | 15 196 238 | 11/2015 |
| EP | 15 196 239 | 11/2015 |
| EP | 15 197 744 | 12/2015 |
| EP | 15 155 835 | 2/2016 |
| EP | 16 155 834 | 2/2016 |
| EP | 16 155 845 | 2/2016 |
| EP | 3 008 421 | 4/2016 |
| EP | 3 008 757 | 4/2016 |
| EP | 3 036 503 | 6/2016 |
| GB | 2 432 723 | 5/2007 |
| JP | S59-50579 | 3/1984 |
| JP | 59-79805 | 5/1984 |
| JP | 61-89501 | 5/1986 |
| JP | S61-135280 | 6/1986 |
| JP | 61-186804 | 8/1986 |
| JP | 61-245579 | 10/1986 |
| JP | 64-17485 | 1/1989 |
| JP | H02-170004 | 6/1990 |
| JP | 04-240817 | 8/1992 |
| JP | 5-48833 A | 2/1993 |
| JP | 05-240640 | 9/1993 |
| JP | 6-133321 | 5/1994 |
| JP | 7-146113 | 6/1995 |
| JP | 7-318630 | 12/1995 |
| JP | 8-159714 | 6/1996 |
| JP | 8-292586 A | 11/1996 |
| JP | 10-26513 A | 1/1998 |
| JP | 10-221064 | 8/1998 |
| JP | H11-230860 | 8/1999 |
| JP | 11-257917 | 9/1999 |
| JP | 11-325825 | 11/1999 |
| JP | 3110095 | 11/2000 |
| JP | 2001-516150 | 9/2001 |
| JP | 2002-176191 | 6/2002 |
| JP | 2003-307407 | 10/2003 |
| JP | 2004-508691 | 3/2004 |
| JP | 2005-509909 | 4/2005 |
| JP | 2005-189087 | 7/2005 |
| JP | 2005-241340 A | 9/2005 |
| JP | 2005-296268 | 10/2005 |
| JP | 2006-514366 | 4/2006 |
| JP | 2006-337254 | 12/2006 |
| JP | 2007-521559 | 8/2007 |
| JP | 2007-530978 | 11/2007 |
| JP | 2008-522418 | 6/2008 |
| JP | 2008-164538 | 7/2008 |
| JP | 2009-257890 | 11/2009 |
| JP | 2010-081002 | 4/2010 |
| JP | 2010-218770 | 9/2010 |
| JP | 2010-531520 | 9/2010 |
| JP | 2011-503673 | 1/2011 |
| JP | 2011-027707 | 2/2011 |
| JP | 2012-519584 | 8/2012 |
| JP | 2012-522248 | 9/2012 |
| JP | 2012-229964 | 11/2012 |
| JP | 2012-231154 | 11/2012 |
| JP | 2013-051674 | 3/2013 |
| TW | 2011-40111 A | 11/2011 |
| WO | 99-09603 | 2/1999 |
| WO | WO 01/29576 A1 | 4/2001 |
| WO | WO 02/076988 | 10/2002 |
| WO | WO 02/101838 A1 | 12/2002 |
| WO | 03/012371 A1 | 2/2003 |
| WO | WO 03/098617 | 11/2003 |
| WO | WO 2004/072909 | 8/2004 |
| WO | WO 2004/114112 A1 | 12/2004 |
| WO | WO 2005/106965 A1 | 11/2005 |
| WO | WO 2007/006717 | 1/2007 |
| WO | WO 2007/054470 A1 | 5/2007 |
| WO | WO 2008/122531 | 10/2008 |
| WO | WO 2008/145172 | 12/2008 |
| WO | WO 2009/013282 A1 | 1/2009 |
| WO | WO 2009/021859 | 2/2009 |
| WO | WO 2009/053291 A1 | 4/2009 |
| WO | WO 2009/058115 A1 | 5/2009 |
| WO | WO 2009/105801 | 9/2009 |
| WO | WO 2010/088032 A2 | 8/2010 |
| WO | WO 2010/094636 A1 | 8/2010 |
| WO | WO 2010/118409 | 10/2010 |
| WO | WO 2010/118450 | 10/2010 |
| WO | WO 2011/067192 A2 | 6/2011 |

(56) References Cited

FOREIGN PATENT DOCUMENTS

| WO | WO 2011/083722 | 7/2011 |
|---|---|---|
| WO | WO 2011/091967 A2 | 8/2011 |
| WO | WO 2012/001628 A1 | 1/2012 |
| WO | WO 2012/046181 A1 | 4/2012 |
| WO | WO 2012/049038 A1 | 4/2012 |
| WO | WO 2012/085803 A1 | 6/2012 |
| WO | WO 2012/091814 | 7/2012 |
| WO | WO 2012/110924 A1 | 8/2012 |
| WO | WO 2012/115593 | 8/2012 |
| WO | WO 2012/139354 | 10/2012 |
| WO | 2012/152812 A1 | 11/2012 |
| WO | 2012/168395 A1 | 12/2012 |
| WO | WO 2006/134370 | 12/2012 |
| WO | WO 2013/009676 | 1/2013 |
| WO | WO 2013/090960 | 6/2013 |
| WO | WO 2013/091016 A1 | 6/2013 |
| WO | 2013/118037 A1 | 8/2013 |
| WO | WO 2013/116883 | 8/2013 |
| WO | WO 2013/144177 A1 | 10/2013 |
| WO | WO 2013/156101 A1 | 10/2013 |
| WO | 2013/170982 A1 | 11/2013 |
| WO | 2014/086722 A1 | 6/2014 |
| WO | 2014/097489 A1 | 6/2014 |
| WO | WO 2014/097181 A1 | 6/2014 |
| WO | WO 2014/123522 | 8/2014 |
| WO | 2014/178923 A2 | 11/2014 |
| WO | 2014/198623 A1 | 12/2014 |
| WO | 2014/198625 A1 | 12/2014 |
| WO | 2014/198626 A1 | 12/2014 |
| WO | 2014/198629 A1 | 12/2014 |
| WO | 2015/024871 A1 | 2/2015 |
| WO | WO 2015/081362 | 6/2015 |
| WO | WO 2015/091607 | 6/2015 |
| WO | WO 2015/150989 | 10/2015 |
| WO | WO 2015/159192 | 10/2015 |
| WO | WO 2015/161989 | 10/2015 |
| WO | WO 2015/162528 | 10/2015 |
| WO | WO 2015/176981 | 11/2015 |
| WO | WO 2015/177784 A2 | 11/2015 |
| WO | 2015/193804 A2 | 12/2015 |
| WO | 2016/005893 A1 | 1/2016 |
| WO | WO 2016/012274 | 1/2016 |
| WO | 2016/051323 A1 | 4/2016 |
| WO | WO 2016/066494 | 5/2016 |
| WO | 2016/092449 A1 | 6/2016 |
| WO | 2016/092454 A1 | 6/2016 |
| WO | WO 2016/083914 | 6/2016 |
| WO | WO 2016/120392 | 8/2016 |
| WO | WO 2016/146725 | 9/2016 |
| WO | WO 2017/089553 | 6/2017 |
| WO | WO 2017/144401 | 8/2017 |
| WO | WO 2018/096083 | 5/2018 |
| WO | WO 2018/115073 | 6/2018 |
| WO | WO 2018/146138 | 8/2018 |
| WO | WO 2018/146146 | 8/2018 |
| WO | WO 2018/167215 | 9/2018 |
| WO | WO 2018/193045 | 10/2018 |
| WO | WO 2019/002199 | 1/2019 |
| WO | WO 2019/011803 | 1/2019 |
| WO | WO 2019/038354 | 2/2019 |
| WO | WO 2019/042956 | 3/2019 |
| WO | WO 2019/042959 | 3/2019 |

OTHER PUBLICATIONS

X. Jiang et al., Dreidimensionales Computersehen, Chapter 2, Springer, Berlin Heidelberg (1997).
International Preliminary Report on Patentability and Written Opinion dated Aug. 22, 2019 in PCT/EP2018/053057.
U.S. Appl. No. 16/328,912, filed Feb. 27, 2019, Johan Ter Maat, et al.
U.S. Appl. No. 13/357,206, filed Jan. 24, 2012, U.S. Pat. No. 9,001,029, Bruder, et al.
U.S. Appl. No. 14/132,570, filed Dec. 18, 2013, U.S. Pat. No. 9,389,315, Bruder, et al.
U.S. Appl. No. 14/460,529, filed Aug. 15, 2014, U.S. Pat. No. 9,665,182, Send, et al.
U.S. Appl. No. 14/460,540, filed Jan. 31, 2017, U.S. Pat. No. 9,557,856, Send, et al.
U.S. Appl. No. 14/598,432, filed Jan. 16, 2015, US 2015-0124268, Bruder, et al.
U.S. Appl. No. 14/787,909, filed Oct. 29, 2015, U.S. Pat. No. 9,741,954, Bruder, et al.
U.S. Appl. No. 14/897,981, filed Dec. 11, 2015, US 2016-0124074, Wonneberger, et al.
U.S. Appl. No. 14/897,467, filed Dec. 10, 2015, U.S. Pat. No. 9,989,623, Send, et al.
U.S. Appl. No. 14/896,958, filed Dec. 9, 2015, U.S. Pat. No. 9,829,564, Bruder, et al.
U.S. Appl. No. 15/099,717, filed Apr. 15, 2016, U.S. Pat. No. 10,120,078, Bruder, et al.
U.S. Appl. No. 15/105,489, filed Jun. 16, 2016, US 2016-0320489, Send, et al.
U.S. Appl. No. 15/301,112, filed Sep. 30, 2016, US 2017-0140786, Send, et al.
U.S. Appl. No. 15/304,328, filed Oct. 14, 2016, US 2017-0039793, Send, et al.
U.S. Appl. No. 15/305,379, filed Oct. 20, 2016, US 2017-0074652, Send, et al.
U.S. Appl. No. 15/319,156, filed Dec. 15, 2016, US 2017-0123593, Send, et al.
U.S. Appl. No. 15/319,156, filed Dec. 15, 2016, US 2017-0082426, Bruder, et al.
U.S. Appl. No. 15/367,213, filed Dec. 2, 2016, U.S. Pat. No. 10,012,532, Send, et al.
U.S. Appl. No. 15/324,223, filed Jan. 5, 2017, US 2017-0205230, Send, et al.
U.S. Appl. No. 15/514,830, filed Mar. 28, 2017, U.S. Pat. No. 10,094,927, Send, et al.
U.S. Appl. No. 15/492,007, filed Apr. 20, 2017, U.S. Pat. No. 9,958,535, Send, et al.
U.S. Appl. No. 15/534,335, filed Jun. 8, 2017, US 2017-0363465, Send, et al.
U.S. Appl. No. 15/534,294, filed Jun. 8, 2017, US 2018-0276843, Send, et al.
U.S. Appl. No. 15/533,572, filed Jun. 6, 2017, US 2018-0003993, Send, et al.
U.S. Appl. No. 15/534,343, filed Jun. 8, 2017, US 2018-0007343, Send, et al.
U.S. Appl. No. 15/587,420, filed May 5, 2017, US 2017-0237926, Bruder, et al.
U.S. Appl. No. 15/534,041, filed Jun. 8, 2017, US 2017-0363741, Send, et al.
U.S. Appl. No. 15/547,664, filed Jul. 31, 2017, US 2018-0017679, Valouch, et al.
U.S. Appl. No. 15/554,496, filed Aug. 30, 2017, US 2018-0067213, Send, et al.
U.S. Appl. No. 15/727,733, filed Oct. 9, 2017, US 2018-0031672, Bruder, et al.
U.S. Appl. No. 15/567,885, filed Oct. 19, 2017, US 2018-0136319, Send, et al.
U.S. Appl. No. 15/744,334, filed Jan. 12, 2018, US 2018-0210064, Send, et al.
U.S. Appl. No. 15/751,283, filed Feb. 8, 2018, US 2018-0231376, Send, et al.
U.S. Appl. No. 15/758,135, filed Mar. 7, 2018, US 2018-0249051, Send, et al.
U.S. Appl. No. 15/775,424, filed May 11, 2018, US 2018-0329024, Send, et al.
U.S. Appl. No. 15/778,454, filed May 23, 2018, US 2018-0356501, Send, et al.
U.S. Appl. No. 15/960,581, filed Apr. 24, 2018, US 2018-0238993, Send, et al.
U.S. Appl. No. 16/090,990, filed Oct. 3, 2018, US 2019-0140129, Valouch, et al.
U.S. Appl. No. 16/091,409, filed Oct. 4, 2018, Send, et al.

(56) References Cited

OTHER PUBLICATIONS

U.S. Appl. No. 16/094,402, filed Oct. 17, 2018, US 2019-0129036, Valouch, et al.
U.S. Appl. No. 16/095,846, filed Oct. 23, 2018, Valouch, et al.
U.S. Appl. No. 16/096,361, filed Oct. 25, 2018, US 2019-0129035, Valouch, et al.
U.S. Appl. No. 16/321,143, filed Jan. 28, 2019, Hermes, et al.
U.S. Appl. No. 16/321,054, filed Jan. 28, 2019, Hermes, et al.
U.S. Appl. No. 16/344,538, filed Apr. 24, 2019, Valouch, et al.
U.S. Appl. No. 16/347,364, filed May 3, 2019, Eberspach, et al.
U.S. Appl. No. 16/461,654, filed May 16, 2019, Schildknecht, et al.
Ikeoka, et al., "Real-Time Depth Estimation with Wide Detectable Range Using Horizontal Planes of Sharp Focus Proceedings", ACIVS 2011: Advanced Concepts for Intelligent Vision Systems, pp. 669-680 (with English Abstract) (https://link.springer.com/chapter/10.1007/978-3-642-23687-7_60).
Japanese Office Action dated Nov. 5, 2019, in corresponding Japanese Patent Application No. 2017-558775 w/English translation.
Wikipedia—Printed Circuit Board: https://en.wikipedia.org/wiki/Printed_circuit_board (25 pages).
ISO 21348 Definitions of Solar Irradiance Spectral Categories, http://SpaceWx.com.
J. Robertson, "High Dielectric Constant Oxides", *European Physical Journal Applied Physics*, vol. 28, No. 3, pp. 265-291, 2004.
J.A. Kittl et al., "High-k Dielectrics for Future Generation Memory Devices", *Microelectronic Engineering*, Vo. 86 (2009) 1789-1795.
Serap Günes, et al., "Hybrid Solar Cells", *Inorganica Chimica Acta* 361, (2008), p. 581-588.
John E. Anthony, et al., "n-Type Organic Semiconductors in Organic Electronics", *Adv. Mater.* 2010, 22, pp. 3876-3892.
Tian-yi Li, et al., "Small Molecule Near-Infrared Boron Dipyrromethene Donors for Organic Tandem Solar Cells", *J. Am. Chem. Soc.* 2017, 139, 13636-13639.
Christian Ulrich et al., "Organic Thin-Film Photovoltaic Cells Based on Oligothiophenes with Reduced Bandgap", *Adv. Funct. Mater.* 2007, 17, pp. 2991-2999.
Ronald Gresser, et al., "Synthesis and Characterization of Near-Infrared Absorbing Benzannulated Aza-BODIPY Dyes", *Chem. Eur. J.* 2011, 17, pp. 2939-2947.
Amaresh Mishra, et al., "Small Molecule Organic Semiconductors on the Move: Promises for Future Solar Energy Technology", *Angew. Chem. Int. Ed.* 2012, 51, 2020-2067.
Huifeng Yao et al., "Molecular Desion of Benzodithiophene-Based Organic Photovoltaic Materials", *Chem. Rev.* 2016, 116, 7397-7457.
Moritz Riede, et al., "Efficient Organic Tandem Solar Cells based on Small Molecules", *Adv. Funct. Mater.* 2011, 21, pp. 3019-3028.
Rico Schueppel, et al., "Controlled Current Matching in Small Molecule Organic Tandem Solar Cells Using Doped Spacer Layers", *J. Appl. Phys.* 107, 044503, 2010.
Jan Meiss et al., "Fluorinated Zinc Phthalocyanine as Donor for Efficient Vacuum-Deposited Organic Solar Cells," *Adv. Funct. Mater.* 2012, 22, pp. 405-414.
Extended Search Report dated Aug. 23, 2011 in Europe Application No. 11154531.5 (With English Translation of Category of Cited Documents).
Erwin Bacher, et al., "Synthesis and Characterization of Photo-Cross-Linkable Hole-Conducting Polymers", Macromolecules, vol. 38, 2005, pp. 1640-1647.
H. Bruce Goodbrand, et al., "Ligand-Accelerated Catalysis of the Ullmann Condensation: Application to Hole Conducting Triarylamines", J. Org. Chem., vol. 64, 1999, pp. 670-674.
Felix E. Goodson, et al., "Palladium-Catalyzed Synthesis of Pure, Regiodefined Polymeric Triarylamines", J. Am. Chem. Soc., vol. 121, 1999, pp. 7527-7539.
John F. Hartwig, "Transition Metal Catalyzed Synthesis of Arylamines and Aryl Ethers from Aryl Halides and Triflates: Scope and Mechanism", Angew. Chem. Int. Ed., vol. 37, 1998, pp. 2046-2067.

Sheila I. Hauck, et al., "Tetraazacyclophanes by Palladium-Catalyzed Aromatic Amination. Geometrically Defined, Stable, High-Spin Diradicals", Organic Letters, vol. 1, No. 13, 1999, pp. 2057-2060.
Ping-Hsin Huang, et al., "Synthesis and Characterization of new fluorescent two-photon absorption chromophores", J. Mater. Chem., vol. 16, 2006, pp. 850-857.
Qinglan Huang, et al., "Molecularly 'Engineered' Anode Adsorbates for Probing OLED Interfacial Structure-Charge Injection/Luminance Relationships: Large, Structure-Dependent Effects", J. Am. Chem. Soc., vol. 125, 2003, pp. 14704-14705.
A. Balionyte, et al., "Carbazolyl-substituted triphenyldiamine derivatives as novel photoconductive amorphous molecular materials", Journal of Photochemistry and Photobiology A: Chemistry, vol. 162, 2004, pp. 249-252.
G. R. A. Kumara, et al., "Fabrication of Dye-Sensitized Solar Cells Using Triethylamine Hydrothiocyanate as a CuI Crystal Growth Inhibitor", Langmuir, vol. 18, 2002, pp. 10493-10495.
Lukas Schmidt-Mende, et al., "Organic Dye for Highly Efficient Solid-State Dye-Sensitized Solar Cells", Adv. Mater., vol. 17, No. 7, 2005, pp. 813-815.
James Lindley, "Copper Assisted Nucleophilic Substitution of Aryl Halogen", Tetrahedron, vol. 40, No. 9, 1984, pp. 1433-1456.
Yunqi Liu, et al., "Synthesis and characterization of a novel bipolar polymer for light-emitting diodes", Chem. Commun., vol. 24, 1998, pp. 2747-2748.
Narukuni Hirata, et al., "Interface engineering for solid-state dye-sensitised nanocrystalline solar cells: the use of an organic redox cascade", Chem. Commun., vol. 5, 2006, pp. 535-537.
Qingjiang Yu, et al., "High-Efficiency Dye-Sensitized Solar Cells: The Influence of Lithium Ions on Exciton Dissociation, Charge Recombination, and Surface States", ACS Nano, vol. 4, No. 10, 2010, pp. 6032-6038.
Bin Peng, et al., "Systematic investigation of the role of compact $TiO_2$ solar cells", Coordination Chemistry Reviews, vol. 248, 2004, pp. 1479-1489.
Jiun Yi Shen, et al., "High $T_g$ blue emitting materials for electroluminescent devices", J. Mater. Chem., vol. 15, 2005, pp. 2455-2463.
Tobat P. I. Saragi, et al., "Comparison of Charge-Carrier Transport in Thin Films of Spiro-Linked Compounds and Their Corresponding Parent Compounds", Adv. Funct. Mater., vol. 16, 2006, pp. 966-974.
V. P. S. Perera, et al., "Dye-Sensitized Solid-State Photovoltaic Cells Based on Dye Multilayer-Semiconductor Nanostructures", J. Phys. Chem. B, vol. 107, 2003, pp. 13758-13761.
U. Bach, et al., "Solid-state dye-sensitized mesoporous $TiO_2$ solar cells with high photon-to-electron conversion efficiencies", Nature, vol. 395, 1998, pp. 583-585.
John P. Wolfe, et al., "Rational Development of Practical Catalysts for Aromatic Carbon-Nitrogen Bond Formation", Acc. Chem. Res. vol. 31, 1998, pp. 805-818.
Bryant H. Yang, et al., "Palladium-Catalyzed amination of aryl halides and sulfonates", Journal of Organometallic Chemistry, vol. 576, 1999, pp. 125-146.
Zhong Hui Li, et al., "Synthesis and Functional Properties of Strongly Luminescent Diphenylamino End-Capped Oligophenylenes", J. Org. Chem., vol. 69, 2004, pp. 921-927.
Brian O'Regan, et al., "A low-cost, high-efficiency solar cell based on dye-sensitized colloidal $TiO_2$ films", Letters to Nature, vol. 353, 1991, pp. 737-740.
International Search Report dated Sep. 24, 2014 in PCT/EP2014/061682.
International Preliminary Report on Patentability and Written Opinion dated Dec. 15, 2015 in PCT/EP2014/061682.
International Preliminary Report on Patentability and Written Opinion dated Dec. 21, 2015 in PCT/EP2014/061695.
International Search Report and Written Opinion dated May 31, 2012 in PCT/IB2012/050592 filed on Feb. 9, 2012.
Supplementary European Search Report dated Nov. 19, 2014, issued in corresponding European Patent Application No. EP 12 74 6808.
Volker Viereck, et al., Large-area applications of optical MEMS: micromirror arrays guide daylight, optimize indoor illumination, Optical Components, Photonik International 2, 2009, pp. 48-49.

(56) References Cited

OTHER PUBLICATIONS

C.U. Murade, et al., "High speed adaptive liquid microlens array", Optics Express, vol. 20, No. 16, Jul. 30, 2012, pp. 18180-18187.
Jason Heikenfeld, et al., "Recent Progress in Arrayed Electrowetting Optics", Optics & Photonics News, vol. 20, No. 1, Jan. 1, 2009, pp. 20-26.
Tao Peng, "Algorithms and models for 3-D shape measurement using digital fringe projections", Dissertation, University of Maryland (College Park, Md.), Jan. 16, 2007, 268 pages (http://drum.lib.umd.edu//handle/1903/6654; http://en.wikipedia.org/wiki/Gray_code; http://en.wikipedia.org/wiki/Structured-light_3D_scanner).
Jie-Ci Yang et al., "An Intelllgent Automated Door Control System Based on a Smart", Sensors, 2013, 13(5), pp. 5923-5936; doi:10.3390/s130505923 www.mdpi.com/journal/sensors.
Tomas Leijtens, et al., "Hole Transport Materials with Low Glass Transition Temperatures and High Solubility for Application in Solid-State Dye-Sensitized Solar Cells", ACS Nano, vol. 6, No. 2, 2012, pp. 1455-1462 www.acsnano.org.
International Search Report and Written Opinion dated Oct. 31, 2014 in PCT/EP2014/067466 filed Aug. 15, 2014.
Paul Pargas, "Phenomena of Image Sharpness Recognition of CdS and CdSe Photoconductors" Journal of the Optical Society of America, vol. 54, No. 4, Apr. 1964, pp. 516-519.
Paul Pargas, "A Lens Measuring Method Using Photoconductive Cells" Journal of the SMPTE, vol. 74, Jun. 1965, pp. 501-504.
Jack T. Billings, "An Improved Method for Critical Focus of Motion-Picture Optical Printers" Journal of the SMPTE, vol. 80, Aug. 1971, pp. 624-628.
International Search Report dated Sep. 9, 2014 in PCT/EP2014/061688 filed Jun. 5, 2014.
Written Opinion of the International Searching Authority dated Sep. 9, 2014 in PCT/EP2014/061688 filed Jun. 5, 2014.
International Search Report and Written Opinion of the International Searching Authority dated Mar. 12, 2015 in PCT/EP2014/078155 Filed Dec. 17, 2014.
International Search Report and Written Opinion of the International Searching Authority dated May 16, 2014 in PCT/IB2013/061095.
Seigo Ito, et al., "High-Efficiency Organic-Dye-Sensitized Solar Cells Controlled by Nanocrystalline-$TiO_2$ Electrode Thickness", Adv. Mater., vol. 18, 2006, pp. 1202-1205.
Atte Haapalinna, et al., "Measurement of the Absolute Linearity of Photodetectors with a Diode Laser," Meas. Sci. Technol., 10, (1999) 1075-1078.
M. R. Andersen, et al., "Kinect Depth Sensor Evaluation for Computer Vision Applications",Electrical and Computer Engineering, Technical Report ECE-TR-6, Aarhus University, 2012, 39 pages.
Takumi Kinoshita, et al., "Wideband dye-sensitized solar cells employing a phosphine-coordinated ruthenium sensitizer", Nature Photonics, vol. 7, 2013, pp. 535-239.
Office Action dated Apr. 22, 2015 in Chinese Patent Application No. 201280018328.5 (submitting English translation only).
International Search Report and Written Opinion dated Sep. 3, 2014 in PCT/EP2014/061691.
International Preliminary Report on Patentability dated Sep. 25, 2015 in PCT/EP2014/061691.
Kuthirumal, S., et al., "Flexible Depth of Field Photography," IEEE Transactions on Pattern Analysis and Machine Intelligence, vol. 33, No. 1 (2011), pp. 58-71.
Hiura Shinsaku et al., "Depth Measurement by the Multi-Focus Camera," Computer Vision and Pattern Recognition, 1998. Proceedings. 1998 IEEE Computer Society Conference on Santa Barbara, CA, USA, Jun. 23-25, 1998, pp. 953-959.
International Preliminary Report on Patentability and Written Opinion dated Dec. 23, 2015 in PCT/EP2014/061688.
Denis Klimentjew, et al., "Multi Sensor Fusion of Camera and 3D Laser Range Finder for Object Recognition" 2010 IEEE International Conference on Multisensor Fusion and Integration for Intelligent Systems, 2010, pp. 236-241.

International Search Report and Written Opinion dated Nov. 21, 2014 in PCT/EP2014/067465.
"So funktioniert die DLP-Technologie" DLP-Technologie—www.dlp.com/de/technology/how-dlp-works, 2014, 2 Pages.
"NEW—Ultra-Compact Pockels Cells with Brewster Polarizer and Waveplate for Laser Q-Switching" Leysop Ltd, Manfacturers and Suppliers of Electro-Optic Components—http://www.leysop.com/integrated_pockels_cell.htm, Aug. 4, 2013, 2 Pages.
D. Scaramuzza, et al., "Extrinsic Self Calibration of a Camera and a 3D Laser Range Finder from Natural Scenes" 2007 IEEE/RSJ International Conference on Intelligent Robots and Systems, 2007, (4164-4169) 8 pages.
International Search Report dated Aug. 28, 2015, in PCT/IB2015/052769, filed Apr. 16, 2015.
International Search Report and Written Opinion dated Jun. 30, 2015 in PCT/IB15/052233 Filed Mar. 26, 2015.
International Search Report dated Sep. 22, 2015, in Application No. PCT/IB2015/052785, filed on Apr. 16, 2015.
International Search Report dated Nov. 27, 2015, in PCT/IB2015/055121, filed Jul. 7, 2015.
International Search Report and Written Opinion dated Mar. 29, 2016, in PCT/IB2015/054536, filed Jun. 16, 2015.
International Search Report and Written Opinion dated Jan. 18, 2016 in PCT/IB2015/057412 filed Sep. 28, 2015.
Wang, Feng-Peng et al., "Distance Measurement using Digital Cameras Based on Laser Spot Detection", published on Jun. 30, 2011, School of Physics and Electronic Information, Gannan Normal University, Ganzhou 341000, China (with English Abstract).
Bahaa E. A. Saleh, et al., "Fundamentals of Photonics" John Wiley & Sons, Inc., Chapter 3, 1991, pp. 80-107 (with Cover Page).
International Search Report dated Mar. 21, 2016, in PCT/IB2015/059406.
International Search Report and Written Opinion in PCT/IB2015/059411 dated Mar. 16, 2016 filed Dec. 7, 2015.
Nam-Trung Nguyen, "Micro-optofluidic Lenses: A review", Biomicrofluidics, 2010, vol. 4, 031501-15.
Uriel Levy et al., "Tunable optofluidic devices", Microfluid Nanofluid, 2008, vol. 4, pp. 97-105.
International Search Report dated Mar. 22, 2016 in PCT/IB2015/059408 filed Dec. 7, 2015.
International Search Report dated Mar. 15, 2016 in PCT/IB2015/059404 filed Dec. 7, 2015.
International Search Report and Written Opinion dated Mar. 21, 2016, in PCT/IB2015/059403, filed Dec. 7, 2015.
International Preliminary Report and Written Opinion dated Mar. 10, 2016, in PCT/IB2015/059404.
International Search Report and Written Opinion dated May 27, 2016, in PCT/EP2016/051817, filed Jan. 28, 2016.
International Search Report dated May 20, 2016, in PCT/EP2016/054532.
International Preliminary Report on Patentability dated Aug. 1, 2017, in PCT/EP2016/051817.
Linyi Bian, et al., "Recent Progress in the Design of Narrow Bandgap Conjugated Polymers for High-Efficiency Organic Solar Cells", Progress in Polymer Science, vol. 37, 2012, pp. 1292-1331.
Antonio Facchetti, "Polymer donor-polymer acceptor (all-polymer) solar Cells", Materials Today, vol. 16 No. 4, Apr. 2013, pp. 123-132.
Graham H. Carey, et al., "Colloidal Quantum Dot Solar Cells", Chemical Reviews, vol. 115 No. 23, 2015, pp. 12732-12763.
Jason P. Clifford, et al., "Fast, Sensitive and Spectrally Tunable Colloidal Quantum-Dot Photodetectors", Nature Nanotechnology, Jan. 2009, pp. 1-5.
Kotaro Fukushima, et al., "Crystal Structures and Photocarrier Generation of Thioindigo Derivatives", Journal of Physical Chemistry B, vol. 102 No. 31, 1998, pp. 5985-5990.
Serap Günes, et al., "Hybrid Solar Cells", Inorganica Chimica Acta, vol. 361, 2008, pp. 581-588.
R. S. Mane, et al., "Chemical Deposition Method for Metal Chalcogenide Thin Films", Materials Chemistry and Physics, vol. 65, 2000, pp. 1-31.
Wilfried Hermes, "Emerging Thin-Film Photovoltaic Technologies", Chemie Ingenieur Technik, 2015, vol. 87 No. 4, pp. 376-389.

(56)  References Cited

OTHER PUBLICATIONS

Paul H. Keck, "Photoconductivity in Vacuum Coated Selenium Films", Journal Optical Society of America, vol. 42 No. 4, Apr. 1952, pp. 221-225, with cover page.
Frank H. Moser, et al., "Phthalocyanine Compounds", Reinhold Publishing Corporation, 1963, p. 69-76 with cover pages.
M. Popescu, "Disordered Chalcogenide Optoelectronic Materials: Phenomena and Applications", Journal of Optoelectronics and Advanced Materials, vol. 7 No. 4, Aug. 2005, pp. 2189-2210.
Friedrich Andreas Sperlich, "Electron Paramagnetic Resonance Spectroscopy of Conjugated Polymers and Fullerenes for Organic Photovoltaics", Julius-Maximilians-Universität Würzburg, 2013, pp. 1-127.
F. Stöckmann, "Superlinear Photoconductivity", Physica Status Solidi, vol. 34, 1969, pp. 751-757.
Evangelos Theocharous, "Absolute Linearity Measurements on a PbS Detector in the Infrared", Applied Optics, vol. 45 No. 11, Apr. 10, 2006, pp. 2381-2386.
Evangelos Theocharous, et al., "Absolute Linearity Measurements on HgCdTe Detectors in the Infrared Region", Applied Optics, vol. 43 No. 21, Jul. 20, 2004, pp. 4182-4188.
Arthur L.Thomas, "Phthalocyanine Research and Applications", CRC Press, 1990, pp. 253-271 with cover pages.
International Search Report and Written Opinion dated Jul. 19, 2016 in PCT/EP2016/058487 filed Apr. 18, 2016.
International Preliminary Report on Patentability and Written Opinion dated Feb. 1, 2018, in PCT/EP2016/066783.
http://www.plenoptic.info/pages/refocusing.html.
C. Hahne, A. Aggoun, S. Haxha, V. Velisavljevic, and J. Fernández, "Light field geometry of a standard plenoptic camera," Opt. Express 22, 26659-26673 (2014).
C. Hahne, A. Aggoun, S. Haxha, V. Velisavljevic, and J. Fernández, "Baseline of virtual cameras acquired by a standard plenoptic camera setup," in 3D-TV-Conference: The True Vision—Capture, Transmission and Display of 3D Video (3DTV-CON), Jul. 2-4, 2014.
C. Hahne, A. Aggoun, and V. Velisavljevic, "The refocusing distance of a standard plenoptic photograph," in 3D-TV-Conference: The True Vision—Capture, Transmission and Display of 3D Video (3DTV-CON), Jul. 8-10, 2015.
C. Hahne and A. Aggoun, "Embedded FIR filter design for real-time refocusing using a standard plenoptic video camera," Proc. SPIE 9023, in Digital Photography X, 902305 (Mar. 7, 2014).
Baeg et al., "Organic Light Detectors: Photodiodes and Phototransistors", *Advanced Materials*, vol. 25, No. 31, Mar. 11, 2013, pp. 4267-4295.
Office Action dated Jan. 3, 2018, in Chinese Patent Application No. 201610552144.7 parallel to U.S. Appl. No. 15/364,680.
International Preliminary Report on Patentability and Written Opinion dated Feb. 22, 2018 in PCT/EP2016/069049).
Office Action dated Mar. 5, 2018, in corresponding Chinese Patent Application No. 201480056299.0.
R. M. Schaffert, "A New High-Sensitivity Organic Photoconductor for Electrophotography", *IBM J. Res. Develop.*, 1971, p. 75-89.
P. Gregory, Ed., *Chemistry and Technology of printing and imaging systems*, Chapman & Hall, 1996, Chap. 4, R.S. Gairns, *Electrophotography*, p. 76-112.
International Search Report and Written Opinion dated Nov. 17, 2016, in PCT/EP2016/071628, filed Sep. 14, 2016.
"Telezentrisches Objektiv" Retrieved from the Internet: https://de.wikipedia.org/wiki/Telezentrisches_Objektiv. Date of retrieval: Sep. 11, 2015, 3 Pages.
Benjamin F. Grewe, et al., "Fast Two-Layer Two-Photon Imaging of Neuronal Cell Populations Using an Electrically Tunable Lens," *Biomedical Optics Express*, vol. 2, No. 7, Jul. 1, 2011 (pp. 2035-2046).
Petr Bartu et al, "Conformable Large-AreaPposition-Sensitive Photodetectors Based on Luminescence-Collecting Silicone Waveguides," *Journal of Applied Physics*, 107, 123101 (2010).

Roland Stolarski, "Fluorescent Naphthalimide Dyes for Polyester Fibres," *Fibres & Textiles in Eastern Europe*, vol. 17, No. 2 (73) pp. 91-95 (2009).
Ayse Aktas et al., "Synthesis, Characterization, Electrochemical and Spectroelectrochemical Properties of Peripherally Tetra-Substituted Metal-Free and Metallophthalocyanines," *Dyes and Pigments*, 99, (2013) 613-619.
Hairong Li, et al., "Syntheses and Properties of Octa-, Tetra-, and Di- Hydroxy-Substituted Phthalocyanines," *Tetrahedron*, 65 (2009) 3357-3363.
"Methine Dyes and Pigments," *Ullmann's Encyclopedia of Industrial Chemistry*, vol. 23 (2012).
Jing Liu, et al., "Sulfone-Rhodamines: A New Class of Near-Infrared Fluorescent Dyes for Bioimagin," *ACS Applied Materials& Interfaces*, 8, 22953-22962 (2016).
E. Noelting et al., "Berichte der deutschen chemischen Gesellschaft", *Band*, 38, S. 3516-3527 (1905).
T. Nedelcev et al., "Preparation and Characterization of a New Derivative of Rhodamine B with an Alkoxysilane Moiety," *Dyes and Pigments*, 76 (2008), 550-556.
Aurore Loudet et al., "BODIPY Dyes and Their Derivatives: Syntheses and Spectroscopic Properties," *Chem.Rev.*, 107 (2007) 4981-4932.
Weili Zhao, et al., "Conformationally Restricted Aza-Bodipy: A Highly fluorescent, Stable, Near-Infrared-Absorbing Dye", *Angew. Chem. Int. Ed.*, 44 (2005) 1677-1679.
Georg M. Fischer, et al., "Near-Infrared Dyes and Fluorophores Based on Diketopyrrolopyrroles," *Angew. Chem. Int. Ed.* 46 (2007) 3750-3753.
Amaresh Mishra et al., "Small Molecule Organic Semiconductors on the Move: Promises for Future Solar Energy Technology," *Angew. Chem. Int. Ed.*, 51, (2012), 2020-2067.
G. Seybold et al., "New Perylene and Violanthrone Dyestuffs for Fluorescent Collectors," *Dyes and Pigments*, 11 (1989) 303-317.
Nam-Trung Nguyen, "Micro-Optofluidic Lenses: A Review", *Biomicrofluidics*, 4, (2010) 031501.
Uriel Levy et al., "Tunable Optofluidic Devices," *Microfluid Nanofluid* (2008) 4: 97-105.
Robert Koeppe et al., "Video-Speed Detection of the Absolute Position of a Light Point on a Large-Area Photodetector Based on Luminescent Waveguides," *Optics Express*, vol. 18, No. 3, (Feb. 1, 2010), 2209.
Office Action dated Jul. 9, 2018, in Japanese Patent Application No. 2017-007544.
Xing Lin, et al., "Coded focal stack photography", Computational Photography (ICCP), 2013 IEEE International Conference On, Apr. 19, 2013, XP032424246, pp. 1-9.
Nabeel A. Riza, et al., "Noncontact distance sensor using spatial signal processing", Optics Letters, Optical Society of America, vol. 34, No. 4, Feb. 15, 2009, XP001522006, pp. 434-436.
Nabeel A. Riza, et al., "Smart agile lens remote optical sensor for three-dimensional object shape measurements", Applied Optics, Optical Society of America, vol. 49, No. 7, Mar. 1, 2010, XP001552714, pp. 1139-1150.
International Search Report dated Nov. 7, 2017, in corresponding PCT/EP2017/057867.
International Search Report dated Jul. 7, 2017, in corresponding PCT/EP2017/057825.
Street (Ed.): Technology and Applications of Amorphous Silicon, Sprlnger-Verlag Heidelberg, 2010, pp. 346-349.
International Search Report dated Aug. 17, 2017, in corresponding PCT/EP2017/060057.
International Search Report dated Aug. 1, 2017, in corresponding PCT/EP2017/060058.
Walter Fuhs, "Hydrogenated Amorphous Silicon—Material Properties and Device Applications", in S. Baranovski, Charge Transport in Disordered Solids, Wiley, p. 97-147, 2006.
Office Action dated Dec. 18, 2018, in Japanese Patent Application No. 2016-518930.
A.G. Pattantyus-Abraham, I.J. Kramer, A.R. Barkhouse, X. Wang, G. Konstantatos, R. Debnath, L. Levina, I. Raabe, M.K. Nazeeruddin, M. Grätzel, and E.H. Sargent, *Depleted-Heterojunction Colloidal Quantum Dot Solar Cells*, ACS Nano 4 (6), May 24, 2010.

(56) References Cited

OTHER PUBLICATIONS

R. Martins and E. Fortunato, *Thin Film Position Sensitive Detectors: from 1D to 3D Applications*, Chap. 8 in R. A. Street (Ed.), *Technology and Applications of Amorphous Silicon*, Springer, 2010.
International Search Report dated Oct. 20, 2017 in PCT/EP2017/068956 filed on Jul. 27, 2017.
Leskela, M. et al., "Preparation of lead sulfide thin films by the atomic layer epitaxy process," Pergamon Press plc, Vacuum/vol. 41/Nos. 4-6, pp. 1457-1459 (1990).
Dasgupta, N. et al., "Fabrication and Characterization of Lead Sulfide Thin Films by Atomic Layer Deposition," The Electrochemical Society, ECS Transactions, 16 (4) 29-36 (2008), Total 8 pages.
Dasgupta, N. et al., "Design of an atomic layer deposition reactor for hydrogen sulfide compatibility," Review of Scientific Instruments 81, 044102 (2010), Total 6 pages.
Xu, J. et al., "Atomic layer deposition of absorbing thin films on nanostructured electrodes for short-wavelength infrared photosensing," AIP Publishing, Applied Physics Letters 107, 153105 (2015), Total 5 pages.
Blount, G., et al., "Photoconductive properties of chemically deposited PbS with dielectric overcoatings," AIP Publishing, Journal of Applied Physics 46, 3489 (1975), Total 12 pages.
Groner, M. et al., "Low-Temperature $Al_2O_3$ Atomic Layer Deposition," American Chemical Society, Chem. Mater., vol. 16, No. 4, 2004, pp. 639-645.
Yoon, W. et al., "Electrical Measurement Under Atmospheric Conditions of PbSe Nanocrystal Thin Films Passivated by Remote Plasma Atomic Layer Deposition of $Al_2O_3$," IEEE Transactions on Nanotechnology, vol. 12, No. 2, Mar. 2013, pp. 146-151.
Hu, C., et al., "Air-stable short-wave infrared PbS colloidal quantum dot photoconductors passivated with $Al_2O_3$ atomic layer deposition," AIP Publishing, Applied Physics Letters 105, 171110 (2014), Total 5 pages.
Liu, Y., et al., "Robust, Functional Nanocrystal Solids by Infilling with Atomic Layer Deposition," ACS Publications, American Chemical Society, Nano Letters 2011, 11, pp. 5349-5355.
Liu, Y., et al., "PbSe Quantum Dot Field-Effect Transistors with Air-Stable Electron Mobilities above 7 $cm^2$ $V^{-1}$ $s^{-1}$," ACS Publications, American Chemical Society, Nano Letters 2013, 13, pp. 1578-1587.
George, S., "Atomic Layer Deposition: An Overview," American Chemical Society, Chem. Rev. 2010, 110, pp. 111-131.
Konstantatos, G., et al., "Engineering the Temporal Response of Photoconductive Photodetectors via Selective Introduction of Surface Trap States," American Chemical Society, Nano Letters 2008, vol. 8, No. 5, pp. 1446-1450.
Soci, C., et al., "ZnO Nanowire UV Photodetectors with High Internal Gain," American Chemical Society, Nano Letters 2007, vol. 7, No. 4, pp. 1003-1009.
List of integrated circuit packaging types (Wikipedia article, downloaded Jan. 15, 2019 from https://en.wikipedia.org/wiki/List_of_integrated_circuit_packaging_types).
List of integrated circuit packaging types, Dimension Reference (Wikipedia article, downloaded Jan 15. 2019 from https://en.wikipedia.org/wiki/List_of_integrated_circuit_packaging_types#PIN-PITCH).
*Wikipedia*, Article denoted, "Thermocouple", retrieved Jul. 20, 2016.
Chinese Office Action dated Jan. 29, 2019, in Chinese Patent Application No. 201580036919.9.
Pekkola et al., "Focus-Induced Photoresponse: a novel way to measure distances with photodetectors", *Scientific Reports* (2018) 8:9208, 8 pages.
L. Pintilie, et al., "Field-effect-assisted photoconductivity in PbS films deposited on silicon dioxide", *J. Appl. Phys.* 91, p. 5782, 2002.
U.S. Appl. No. 16/484,369, filed Aug. 7, 2019, Lungenschmied, et al.
U.S. Appl. No. 16/478,907, filed Jul. 18, 2019, Valouch, et al.
U.S. Appl. No. 16/483,231, filed Aug. 2, 2019, Send, et al.

* cited by examiner

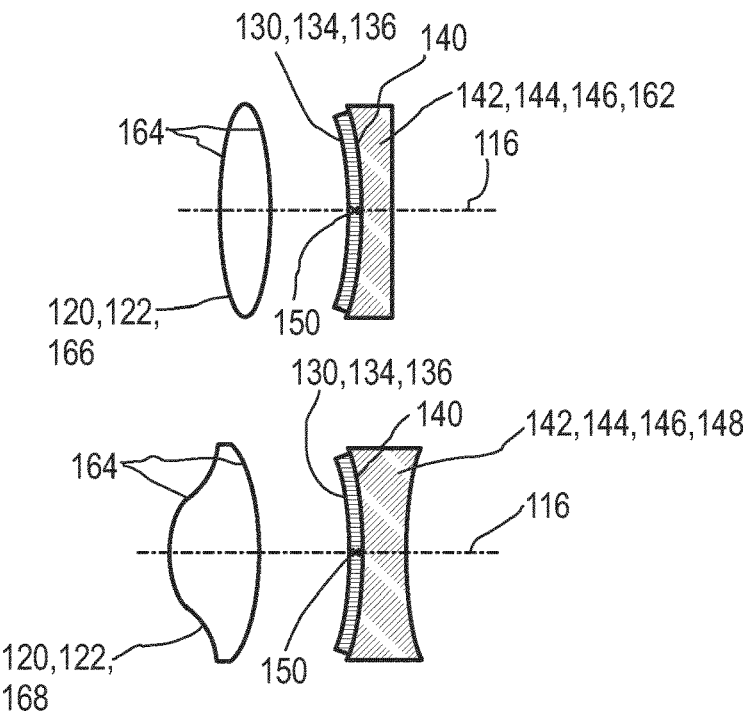
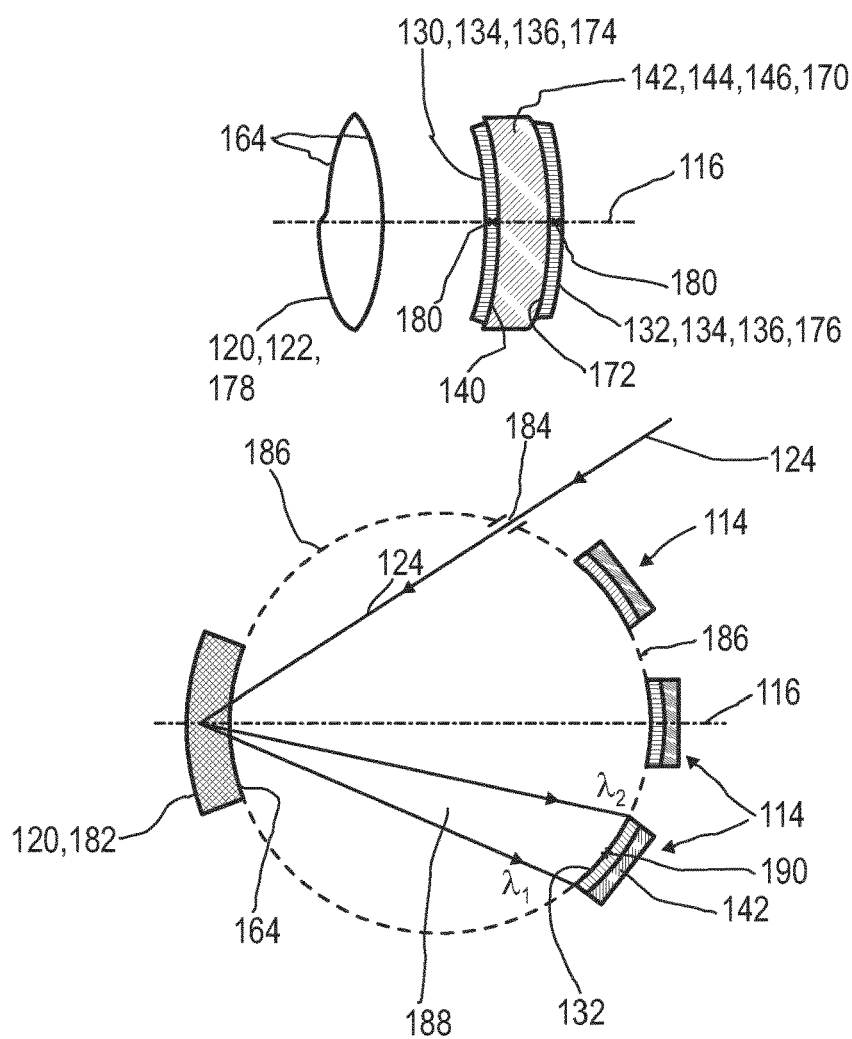

DETECTOR FOR AN OPTICAL DETECTION OF AT LEAST ONE OBJECT

FIELD OF THE INVENTION

The invention relates to a detector for an optical detection of at least one object, in particular, for determining a position of at least one object, specifically with regard to a depth, a width, or both to the depth and the width of the at least one object. Furthermore, the invention relates to a human-machine interface, an entertainment device, a scanning system, a tracking system, a stereoscopic system; and a camera. Further, the invention relates to a method for optical detection of at least one object and to various uses of the detector. Such devices, methods and uses can be employed for example in various areas of daily life, gaming, traffic technology, mapping of spaces, production technology, security technology, medical technology or in the sciences. However, further applications are possible.

PRIOR ART

Various detectors for optically detecting at least one object are known on the basis of optical sensors. WO 2012/110924 A1 discloses a detector comprising at least one optical sensor, wherein the optical sensor exhibits at least one sensor region. Herein, the optical sensor is designed to generate at least one sensor signal in a manner dependent on an illumination of the sensor region. According to the so-called "FiP effect", the sensor signal, given the same total power of the illumination, is hereby dependent on a geometry of the illumination, in particular on a beam cross-section of the illumination on the sensor region. Herein, the FiP effect is described in an exemplary manner for dye solar cells, preferably for solid dye solar cells (solid dye sensitized solar cells, sDSC), i.e. components having at a first electrode, an n-semiconducting metal oxide, a dye, a solid organic p-type semiconductor, and a second electrode. The detector furthermore has at least one evaluation device designated to generate at least one item of geometrical information from the sensor signal, in particular at least one item of geometrical information about the illumination and/or the object.

WO 2014/097181 A1 discloses a method and a detector for determining a position of at least one object, by using at least one transversal optical sensor and at least one longitudinal optical sensor. Preferably, a stack of longitudinal optical sensors is employed, in particular to determine a longitudinal position of the object with a high degree of accuracy and without ambiguity. In particular, the transversal optical sensor and the longitudinal optical sensor are thin film devices, having an arrangement of layers including electrodes and a photovoltaic material. Thus, the sensor region of the optical sensors is formed by the respective device facing towards or away from the object. Herein, substrates which are used for the plurality of the optical sensors in the stack can differ by having a different shape, in particular selected from the group comprising a planar, a planar-convex, a planar-concave, a biconvex, or a biconcave form, such as lenses or prisms. Further, WO 2014/097181 A1 discloses a human-machine interface, an entertainment device, a tracking system, and a camera, each comprising at least one such detector for determining a position of at least one object.

WO 2016/120392 A1 discloses a further kind of optical sensors which may exhibit the FiP effect. Herein, the sensor region of the optical sensor comprises a photoconductive material, preferably selected from lead sulfide (PbS), lead selenide (PbSe), lead telluride (PbTe), cadmium telluride (CdTe), indium phosphide (InP), cadmium sulfide (CdS), cadmium selenide (CdSe), indium antimonide (InSb), mercury cadmium telluride (HgCdTe; MCT), copper indium sulfide (CIS), copper indium gallium selenide (CIGS), zinc sulfide (ZnS), zinc selenide (ZnSe), copper zinc tin sulfide (CZTS), solid solutions and/or doped variants thereof. Herein, the photoconductive material is deposited on an insulating substrate, in particular a ceramic substrate or a transparent or a translucent substrate, such as glass or quartz. In addition, the FiP effect could be observed in hydrogenated amorphous semiconducting materials, in particular in hydrogenated amorphous silicon (a-Si:H), located in the sensor region.

Despite the advantages implied by the above-mentioned devices and detectors, there still is a need for improvements with respect to a simple, cost-efficient and, still, reliable spatial detector.

Problem Addressed by the Invention

Therefore, a problem addressed by the present invention is that of specifying a device and a method for optically detecting at least one object which at least substantially avoid the disadvantages of known devices and methods of this type. In particular, an improved simple, cost-efficient and, still, reliable spatial detector for determining the position of an object in space would be desirable.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used herein, the expressions "have", "comprise" and "contain" as well as grammatical variations thereof are used in a non-exclusive way. Thus, the expression "A has B" as well as the expression "A comprises B" or "A contains B" may both refer to the fact that, besides B, A contains one or more further components and/or constituents, and to the case in which, besides B, no other components, constituents or elements are present in A.

In a first aspect of the present invention, a detector for optical detection, in particular, for determining a position of at least one object, specifically with regard to a depth or to both the depth and a width of the at least one object is disclosed.

The "object" generally may be an arbitrary object, chosen from a living object and a non-living object. Thus, as an example, the at least one object may comprise one or more articles and/or one or more parts of an article. Additionally or alternatively, the object may be or may comprise one or more living beings and/or one or more parts thereof, such as one or more body parts of a human being, e.g. a user, and/or an animal.

As used herein, a "position" generally refers to an arbitrary item of information on a location and/or orientation of the object in space. For this purpose, as an example, one or more coordinate systems may be used, and the position of the object may be determined by using one, two, three or more coordinates. As an example, one or more Cartesian coordinate systems and/or other types of coordinate systems may be used. In one example, the coordinate system may be a coordinate system of the detector in which the detector has a predetermined position and/or orientation. As will be outlined in further detail below, the detector may have an optical axis, which may constitute a main direction of view of the detector. The optical axis may form an axis of the coordinate system, such as a z-axis. Further, one or more additional axes may be provided, preferably perpendicular to the z-axis.

Thus, as an example, the detector may constitute a coordinate system in which the optical axis forms the z-axis and in which, additionally, an x-axis and a y-axis may be provided which are perpendicular to the z-axis and which are perpendicular to each other. As an example, the detector and/or a part of the detector may rest at a specific point in this coordinate system, such as at the origin of this coordinate system. In this coordinate system, a direction parallel or antiparallel to the z-axis may be regarded as a longitudinal direction, and a coordinate along the z-axis may be considered a longitudinal coordinate. An arbitrary direction perpendicular to the longitudinal direction may be considered a transversal direction, and an x- and/or y-coordinate may be considered a transversal coordinate.

Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

As used herein, the detector for optical detection generally is a device which is adapted for providing at least one item of information on the position of the at least one object. The detector may be a stationary device or a mobile device. Further, the detector may be a stand-alone device or may form part of another device, such as a computer, a vehicle or any other device. Further, the detector may be a hand-held device. Other embodiments of the detector are feasible.

The detector may be adapted to provide the at least one item of information on the position of the at least one object in any feasible way. Thus, the information may e.g. be provided electronically, visually, acoustically or in any arbitrary combination thereof. The information may further be stored in a data storage of the detector or a separate device and/or may be provided via at least one interface, such as a wireless interface and/or a wire-bound interface.

The detector for an optical detection of at least one object according to the present invention comprises:
- at least one optical sensor, the optical sensor having at least one sensor region, the sensor region comprising at least one curved substrate and at least one film having a photoconductive material, wherein the film is placed on at least one surface of the curved substrate, wherein the optical sensor is designed to generate at least one sensor signal in a manner dependent on an illumination of the sensor region by a light beam;
- at least one transfer device, the transfer device being adapted to transfer the light beam from the object to the optical sensor, thereby being adapted to guide the light beam to the film located on the curved substrate; and
- at least one evaluation device, wherein the evaluation device is designed to generate at least one item of information on a position of the object by evaluating the sensor signal of the optical sensor.

Herein, the components listed above may be separate components. Alternatively, two or more of the components as listed above may be integrated into one component. Further, the at least one evaluation device may be formed as a separate evaluation device independent from the transfer device and the at least one optical sensor, but may preferably be connected to the at least one optical sensor in order to receive the sensor signal. Alternatively, the at least one evaluation device may fully or partially be integrated into the at least one optical sensor.

As used herein, the "optical sensor" is, in general, a device which is designed to generate at least one sensor signal in a manner dependent on an illumination of the sensor region by the light beam. In particular, the optical sensor may be a "longitudinal optical sensor", which is, generally, a device being designed to generate at least one longitudinal sensor signal in a manner dependent on an illumination of the sensor region by the light beam, wherein the longitudinal sensor signal, given the same total power of the illumination, is dependent, according to the so-called "FiP effect" on a beam cross-section of the light beam in the sensor region. The longitudinal sensor signal may generally be an arbitrary signal indicative of the longitudinal position, which may also be denoted as a depth. As an example, the longitudinal sensor signal may be or may comprise a digital and/or an analog signal. As an example, the longitudinal sensor signal may be or may comprise a voltage signal and/or a current signal. Additionally or alternatively, the longitudinal sensor signal may be or may comprise digital data. The longitudinal sensor signal may comprise a single signal value and/or a series of signal values. The longitudinal sensor signal may further comprise an arbitrary signal which is derived by combining two or more individual signals, such as by averaging two or more signals and/or by forming a quotient of two or more signals.

Further, the sensor region of the longitudinal optical sensor is illuminated by at the least one light beam. Given the same total power of the illumination, the electrical conductivity of the sensor region, therefore, depends on the beam cross-section of the light beam in the sensor region, be denominated as a "spot size" generated by the incident beam within the sensor region. Thus, the observable property that the electrical conductivity of the photoconductive material depends on an extent of the illumination of the sensor region comprising the photoconductive material by an incident light beam particularly accomplishes that two light beams comprising the same total power but generating different spot sizes on the sensor region provide different values for the electrical conductivity of the photoconductive material in the sensor region and are, consequently, distinguishable with respect to each other.

Further, since the longitudinal sensor signal is determined by applying an electrical signal, such as a voltage signal and/or a current signal, the electrical conductivity of the material which is traversed by the electrical signal is, therefore, taken into account when determining the longitudinal sensor signal. As will be explained below in more detail, an application of a bias voltage source and of a load resistor employed in series with the longitudinal optical sensor may preferably be used here. As a result, the longitudinal optical sensor which comprises a photoconductive material within the sensor region, thus, principally allows determining the beam cross-section of the light beam in the sensor region from a recording of the longitudinal sensor signal, such as by comparing at least two longitudinal sensor signals, at least one item of information on the beam cross-section, specifically on the beam diameter.

Further, since the beam cross-section of the light beam in the sensor region, according to the above-mentioned FiP effect, given the same total power of the illumination, depends on the longitudinal position or depth of an object which emits or reflects the light beam which impinges on the sensor region, the longitudinal optical sensor may, therefore, be applied to determining a longitudinal position of the respective object. For potential embodiments of the longitudinal optical sensor and the longitudinal sensor signal, reference may be made to the optical sensor as disclosed in WO 2012/110924 A1 or in WO 2014/097181 A1.

Alternatively, the optical sensor may be a transversal optical sensor, which, in general, refers to a device which may be adapted to determine a transversal position of at least one light beam traveling from the object to the detector. The transversal optical sensor is described below in more detail.

According to the present invention, the at least one optical sensor exhibits at least one sensor region, wherein the sensor region comprises at least one photoconductive material. As used herein, the term "photoconductive material" refers, based on WO 2016/120392 A1, to a material which is capable of sustaining an electrical current and, therefore, exhibits a specific electrical conductivity, wherein, specifically, the electrical conductivity is dependent on the illumination of the material. Since an electrical resistivity is defined as the reciprocal value of the electrical conductivity, alternatively, the term "photoresistive material" may also be used to denominate the same kind of material. In this kind of material, the electrical current may be guided via at least one first electrical contact through the material to at least one second electrical contact, wherein the first electrical contact is isolated from the second electrical contact while both the first electrical contact and the second electrical contact are in direct connection with the material. For this purpose, the direct connection may be provided by any known measure known from the state of the art, such as plating, welding, soldering, or depositing electrically highly conductive substances, in particular metals like gold, silver, platinum or palladium as well as alloys comprising at least one of the mentioned metals, at the contact zones.

For the purposes of the present invention, the photoconductive material as used in the sensor region of the optical sensor may, preferably, comprise an inorganic photoconductive material, an organic photoconductive material, a combination, a solid solution, and/or a doped variant thereof. In this regard, the inorganic photoconductive material may, in particular, comprise one or more of selenium, tellurium, a selenium-tellurium alloy, a metal oxide, a group IV element or compound, i.e. an element from group IV or a chemical compound with at least one group IV element, a group III-V compound, i.e. a chemical compound with at least one group III element and at least one group V element, a group II-VI compound, i.e. a chemical compound with, on one hand, at least one group II element or at least one group XII element and, on the other hand, at least one group VI element, and/or a chalcogenide. However, other inorganic photoconductive materials may equally be appropriate.

As mentioned above, the chalcogenide, preferably selected from a group comprising sulfide chalcogenides, selenide chalcogenides, telluride chalcogenides, ternary chalcogenides, quaternary and higher chalcogenides, may preferably be appropriate to be used as the photoconductive material in the sensor region of the optical sensor. As generally used, the term "chalcogenide" refers to a compound which may comprise a group 16 element of the periodic table apart from an oxide, i.e. a sulfide, a selenide, and a telluride. In particular, the photoconductive material may be or comprise a sulfide chalcogenide, preferably lead sulfide (PbS), a selenide chalcogenide, preferably lead selenide (PbSe), a telluride chalcogenide, preferably cadmium telluride (CdTe), or a ternary chalcogenide is, preferably mercury zinc telluride (HgZnTe; MZT). Since at least the mentioned preferred photoconductive materials are, generally, known to exhibit a distinctive absorption characteristic within the infrared spectral range, the optical sensor having the layer which comprises the mentioned preferred photoconductive material may, preferably, be used as an infrared sensor. However, other embodiments and/or other photoconductive materials, in particular, the photoconductive materials as described below, may also be feasible.

In particular, the sulfide chalcogenide may be selected from a group comprising lead sulfide (PbS), cadmium sulfide (CdS), zinc sulfide (ZnS), mercury sulfide (HgS), silver sulfide ($Ag_2S$), manganese sulfide (MnS), bismuth trisulfide ($Bi_2S_3$), antimony trisulfide ($Sb_2S_3$), arsenic trisulfide ($As_2S_3$), tin (II) sulfide (SnS), tin (IV) disulfide ($SnS_2$), indium sulfide ($In_2S_3$), copper sulfide (CuS or $Cu_2S$), cobalt sulfide (CoS), nickel sulfide (NiS), molybdenum disulfide ($MoS_2$), iron disulfide ($FeS_2$), and chromium trisulfide ($CrS_3$).

In particular, the selenide chalcogenide may be selected from a group comprising lead selenide (PbSe), cadmium selenide (CdSe), zinc selenide (ZnSe), bismuth triselenide ($Bi_2Se_3$), mercury selenide (HgSe), antimony triselenide ($Sb_2Se_3$), arsenic triselenide ($As_2Se_3$), nickel selenide (NiSe), thallium selenide (TlSe), copper selenide (CuSe or $Cu_2Se$), molybdenum diselenide ($MoSe_2$), tin selenide (SnSe), and cobalt selenide (CoSe), and indium selenide ($In_2Se_3$). Further, solid solutions and/or doped variants of the mentioned compounds or of other compounds of this kind may also be feasible.

In particular, the telluride chalcogenide may be selected from a group comprising lead telluride (PbTe), cadmium telluride (CdTe), zinc telluride (ZnTe), mercury telluride (HgTe), bismuth tritelluride ($Bi_2Te_3$), arsenic tritelluride ($As_2Te_3$), antimony tritelluride ($Sb_2Te_3$), nickel telluride (NiTe), thallium telluride (TlTe), copper telluride (CuTe), molybdenum ditelluride ($MoTe_2$), tin telluride (SnTe), and cobalt telluride (CoTe), silver telluride ($Ag_2Te$), and indium telluride ($In_2Te_3$). Further, solid solutions and/or doped variants of the mentioned compounds or of other compounds of this kind may also be feasible.

In particular, the ternary chalcogenide may be selected from a group comprising mercury cadmium telluride (HgCdTe; MCT), mercury zinc telluride (HgZnTe), mercury cadmium sulfide (HgCdS), lead cadmium sulfide (PbCdS), lead mercury sulfide (PbHgS), copper indium disulfide ($CuInS_2$; CIS), cadmium sulfoselenide (CdSSe), zinc sulfoselenide (ZnSSe), thallous sulfoselenide (TlSSe), cadmium zinc sulfide (CdZnS), cadmium chromium sulfide ($CdCr_2S_4$), mercury chromium sulfide ($HgCr_2S_4$), copper chromium sulfide ($CuCr_2S_4$), cadmium lead selenide (CdPbSe), copper indium diselenide ($CuInSe_2$), indium gallium arsenide (InGaAs), lead oxide sulfide ($Pb_2OS$), lead oxide selenide ($Pb_2OSe$), lead sulfoselenide (PbSSe), arsenic selenide telluride ($As_2Se_2Te$), cadmium selenite ($CdSeO_3$), cadmium zinc telluride (CdZnTe), and cadmium zinc selenide (CdZnSe), further combinations by applying compounds from the above listed binary chalcogenides and/or binary III-V-compounds as listed below. Further, solid solutions and/or doped variants of the mentioned compounds or of other compounds of this kind may also be feasible.

With regard to quaternary and higher chalcogenides, this kind of material may be selected from a quaternary and higher chalcogenide which may be known to exhibit suitable photoconductive properties. In particular, a compound having a composition of $Cu(In, Ga)S/Se_2$ or of $Cu_2ZnSn(S/Se)_4$ may be feasible for this purpose.

With regard to the III-V compound, this kind of semiconducting material may be selected from a group comprising indium antimonide (InSb), boron nitride (BN), boron phosphide (BP), boron arsenide (BAs), aluminum nitride (AlN), aluminum phosphide (AlP), aluminum arsenide (AlAs), aluminum antimonide (AlSb), indium nitride (InN), indium phosphide (InP), indium arsenide (InAs), indium antimonide (InSb), gallium nitride (GaN), gallium phosphide (GaP), gallium arsenide (GaAs), and gallium antimonide (GaSb). Further, solid solutions and/or doped variants of the mentioned compounds or of other compounds of this kind may also be feasible.

With regard to the II-VI compound, this kind of semiconducting material may be selected from a group comprising cadmium sulfide (CdS), cadmium selenide (CdSe), cadmium telluride (CdTe), zinc sulfide (ZnS), zinc selenide (ZnSe), zinc telluride (ZnTe), mercury sulfide (HgS), mercury selenide (HgSe), mercury telluride (HgTe), cadmium zinc telluride (CdZnTe), mercury cadmium telluride (HgCdTe), mercury zinc telluride (HgZnTe), and mercury zinc selenide (CdZnSe). However, other II-VI compounds may be feasible. Further, solid solutions of the mentioned compounds or of other compounds of this kind may also be applicable.

With regard to the metal oxides, this kind of semiconducting material may be selected from a known metal oxide which may exhibit photoconductive properties, particularly from the group comprising copper (II) oxide (CuO), copper (I) oxide ($CuO_2$), nickel oxide (NiO), zinc oxide (ZnO), silver oxide ($Ag_2O$), manganese oxide (MnO), titanium dioxide ($TiO_2$), barium oxide (BaO), lead oxide (PbO), cerium oxide ($CeO_2$), bismuth oxide ($Bi_2O_3$), cadmium oxide (CdO), ferrite ($Fe_3O_4$), and perovskite oxides ($ABO_3$, wherein A is a divalent cation, and B a tetravalent cation). In addition, ternary, quarternary or higher metal oxides may also be applicable. Furthermore, solid solutions and/or doped variants of the mentioned compounds or of other compounds of this kind, which could be stoichiometric compounds or off-stoichiometric compounds, may also be feasible. As explained later in more detail, it may be preferable to select a metal oxide which might, simultaneously, also exhibit transparent or translucent properties.

With regard to a group IV element or compound, this kind of semiconducting material may be selected from a group comprising doped diamond (C), doped silicon (Si), silicon carbide (SiC), and silicon germanium (SiGe), wherein the semiconducting material may be selected from a crystalline material, a microcrystalline material, or, preferably, from an amorphous material. As generally used, the term "amorphous" refers to a non-crystalline allotropic phase of the semiconducting material. In particular, the photoconductive material may comprise at least one hydrogenated amorphous semiconducting material, wherein the amorphous material has, in addition, been passivated by applying hydrogen to the material, whereby, without wishing to be bound by theory, a number of dangling bonds within the material appear to have been reduced by several orders of magnitude. In particular, the hydrogenated amorphous semiconducting material may be selected from a group consisting of hydrogenated amorphous silicon (a-Si:H), a hydrogenated amorphous silicon carbon alloy (a-SiC:H), or a hydrogenated amorphous germanium silicon alloy (a-GeSi:H). However, other kinds of materials, such as hydrogenated microcrystalline silicon (μc-Si:H), may also be used for these purposes.

Alternatively or in addition, the organic photoconductive material may, in particular, be or comprise an organic compound, in particular an organic compound which may be known to comprise appropriate photoconductive properties, preferably polyvinylcarbazole, a compound which is generally used in xerography. However, a large number of other organic molecules which are described in WO 2016/120392 A1 in more detail may also be feasible.

In a further preferred embodiment, the photoconductive material may be provided in form of a colloidal film which may comprise quantum dots. This particular state of the photoconductive material which may exhibit slightly or significantly modified chemical and/or physical properties with respect to a homogeneous layer of the same material may, thus, also be denoted as colloidal quantum dots (CQD). As used herein, the term "quantum dots" refers to a state of the photoconductive material in which the photoconductive material may comprise electrically conducting particles, such as electrons or holes, which are confined in all three spatial dimensions to a small volume that is usually denominated as a "dot". Herein, the quantum dots may exhibit a size which can, for simplicity, be considered as diameter of a sphere that might approximate the mentioned volume of the particles. In this preferred embodiment, the quantum dots of the photoconductive material may, in particular, exhibit a size from 1 nm to 100 nm, preferably from 2 nm to 100 nm, more preferred from 2 nm to 15 nm, provided that the quantum dots actually comprised in a specific thin film may exhibit a size being below the thickness of the specific thin film. In practice, the quantum dots may comprise nanometer-scale semiconductor crystals which might be capped with surfactant molecules and dispersed in a solution in order to form the colloidal film. Herein, the surfactant molecules may be selected to allow determining an average distance between the individual quantum dots within the colloidal film, in particular, as a result from approximate spatial extensions of the selected surfactant molecules. Further, depending on the synthesis of ligands, quantum dots may exhibit hydrophilic or hydrophobic properties. The CQD can be produced by applying a gas-phase, a liquid-phase, or a solid-phase approach. Hereby, various ways for a synthesis of the CQD are possible, in particular by employing known processes such as thermal spraying, colloidal synthesis, or plasma synthesis. However, other production processes may also be feasible.

Further in this preferred embodiment, the photoconductive material used for the quantum dots may, preferably, be selected from one of the photoconductive materials as mentioned above, more particular, from the group comprising lead sulfide (PbS), lead selenide (PbSe), lead telluride (PbTe), cadmium telluride (CdTe), indium phosphide (InP), cadmium sulfide (CdS), cadmium selenide (CdSe), indium antimonide (InSb), mercury cadmium telluride (HgCdTe; MCT), copper indium sulfide (CIS), copper indium gallium selenide (CIGS), zinc sulfide (ZnS), zinc selenide (ZnSe), a perovskite structure materials $ABC_3$, wherein A denotes an alkaline metal or an organic cation, B=Pb, Sn, or Cu, and C a halide, and copper zinc tin sulfide (CZTS). Further, solid solutions and/or doped variants of the mentioned compounds or of other compounds of this kind may also be feasible. Core shell structures of the materials of this kind of materials may also be feasible. However, kinds of other photoconductive materials may also be feasible.

In accordance with the present invention, the photoconductive material is placed on at least one surface of a curved substrate. Herein, the photoconductive material, in particular one or more of the photoconductive materials as described above, may, preferentially, be obtained by using a deposition process which may allow generating a film having a thickness from 1 nm to 100 µm, preferably from 10 nm to 10 µm, more preferred from 100 nm to 1 µm.

More particular, the film comprising the photoconductive material, especially, having the thickness in the range as indicated here, may, preferably, be obtained by using a deposition process in which a distance between the substrate and a deposition unit providing the photoconductive material can be considered as negligible. This purpose may, in particular, be achieved by applying a bath deposition process as the particularly preferred deposition process. Herein, a metastable complex in a homogeneous solution may, preferably, be employed which may, especially by being adapted to provide sufficient mixing, lead to a practically constant thickness of the film within the desired range. Based on this background, other deposition processes, including but not limited to a physical vapor deposition (PVD) process, an atomic layer deposition (ALD) process, a chemical vapor deposition (CVD) process and/or a dip-coating process may, although potentially more sophisticated to handle in order to achieve the desired constant thickness of the film, also be applicable. For the same reason, further deposition processes, including but not limited to sputtering, spin coating, slot coating, or ink-jet printing, may be less preferred to be used for the present purposes.

As mentioned above, the film of the photoconductive material is placed on at least one surface of the curved substrate. As generally used, the term "curved substrate" may relate to an extended object in space, which may comprise one or more surfaces, wherein at least the surface being designed in order to receive the film of the photoconductive material, may deviate from being a flat plane. By way of example, the object may be a cube, wherein, the surface on which the film of the photoconductive material is designated to be deposited is not flat but rather exhibits a convex or a concave curvature.

Thus, in a preferred embodiment, the curved substrate may constitute or comprise an optical element, wherein the optical element may be at least partially optically transparent with respect to the optical element is at least partially optically transparent with respect to at least a partition of a wavelength range of the light beam. For this purpose, the curved substrate used for the optical element may comprise an at least partially optically transparent material, in particular selected from glass, quartz, silicon, germanium, ZnSe, ZnS, CaF$_2$, MgF, NaCl, KBr, sapphire, fused silica, a transparent conducting oxide (TOO), or a transparent organic polymer. As used herein, the transparent conducting oxide may, preferably, be selected from indium tin oxide (ITO), fluorine doped tin oxide (SnO2:F; FTO), aluminum doped zinc oxide (AZO), magnesium oxide (MgO), or a perovskite transparent conducting oxide. However, other materials which may be at least partially transparent in a desired part of the spectrum in particular the infrared spectral range, may also be used.

Further, in this preferred embodiment, the optical element may be selected from a group consisting of an optical lens, a curved mirror, a grating, and a diffractive optical element. More particular, the optical lens may, especially, be selected from a group consisting of a biconvex lens, a plano-convex lens, a biconcave lens, a plano-concave lens, a aspherical lens, a cylindrical lens and a meniscus lens. However, the optical element may be selected from other kinds of optical components, such as further optical components known to the skilled person as long as they comprise at least one curved or structured surface that may be adapted for being coated with one or more photoconductive materials.

In a particular embodiment of the present invention, the surface of the curved substrate may be selected from a spheric surface or an aspheric surface. As generally used, the term "spheric surface" may refer to a surface of an extended object in space, wherein the surface comprises a section of a sphere. Herein, the term "spheric section" refers, as generally used, to a partition of a sphere which can be obtained by intersection of the sphere by an extended plane which may not intersect the center of the sphere. As a result, the curved substrate comprising the spheric surface may behave in the manner similar to a sphere reacting to an incident light beam. Thus, the simple biconvex optical lens which may be approximated by two opposing partial spheric surfaces may, close to the optical axis, exhibit similar optical properties as the sphere. In reality, the light beams impinging the simple optical lens far from the optical axis, in particular, at an edge of the lens, may, however, cause a deviation from this behavior resulting in a number of deviating effects, including spherical aberration and/or astigmatism. Thus, in order reduce or, preferably, eliminate the deviating effects, the surface of the curved substrate may be or comprise an aspheric surface. In contrast to the spheric surface, the aspheric surface may comprise a deviation from the spheric section as described above. Preferably, the at least one optical element comprising an aspheric surface, which may, therefore, also be denominated as an "asphere", may be a combination of at least two optical elements, such as a multi-lens system, or, preferably, be a single optical element comprising an individually formed shape which may, especially, be designed for this purpose.

More particular, the curved substrate may be arranged in a manner that it may follow a section of a Petzval surface or, at least, an approximation of the Petzval surface. In general, the term "Petzval surface" may refer to a two-dimensional image curvature on which an extended linear object may be focused by using the simple optical lens as described above. Thus, the term "Petzval surface" may be used in order to describe the optical aberration which may cause an effect that a flat object normal to the optical axis cannot be brought properly into the focus on a flat image plane. To the contrary, the focus of the flat object normal to the optical axis may be located on the two-dimensional image curvature which may, generally, be curved towards the edges of the convex lens and away from the edges of the concave lens. Consequently, using the curved substrate in accordance with the present invention which may, preferably, follow, at least approximately, the section of the Petzval surface may result in the contrary effect that the flat object normal to the optical axis can now be brought properly into the focus on any location of the Petzval surface. Thus, the film of the photoconductive material may, preferably, deposited on the curved substrate following approximately the Petzval surface, by which arrangement it may be possible to allow the focus of the impinging light beam, independent of its angle of incidence, to be located within the film. As a result, the film of the photoconductive material placed on the curved substrate located in the sensor region of the optical sensor may, thus allow the optical sensor to generate the at least one sensor signal depending on an illumination of the sensor region by a light beam which may be in focus within the film, which is not possible by using a flat substrate located in the sensor region of the optical sensor, such as described in WO 2012/110924 A1, WO 2014/097181 A1, or WO 2016/120392 A1.

In addition, the detector comprises at least one transfer device, which may further be arranged along the common optical axis. Most preferably, the light beam which emerges from the object, thus, travels first through the at least one transfer device and thereafter at or through the at least one optical sensor until it may, finally, impinge on an imaging device. As used herein, the term "transfer device" refers to an optical component which may be configured to transfer the at least one light beam emerging from the object to the at least one optical sensor within the detector. Thus, the transfer device is designed to feed or guide light propagating from the object to the detector to the at least one optical sensor, wherein this feeding can, optionally, be effected by means of imaging or else by means of non-imaging properties of the transfer device.

In particular the transfer device can also be designed to collect the electromagnetic radiation before the latter is fed or guided to the at least one optical sensor.

In addition, the at least one transfer device may have imaging properties. Consequently, the transfer device may comprise at least one imaging element, e.g., at least one lens and/or at least one curved mirror, since, in the case of such imaging elements, a geometry of the illumination on the sensor region can be dependent on a relative positioning, e.g., a distance, between the transfer device and the object. As used herein, the transfer device may be designed in such a way that the electromagnetic radiation emerging from the object may be transferred completely to the sensor region, e.g., is focused completely on the sensor region, in particular, if the object is arranged in a visual range of the detector. Preferably, the at least one optical element as employed for the transfer device may be at least partially optically transparent with respect to at least a partition of the wavelength range of the light beam. For this purpose, the transfer device comprises an at least partially optically transparent material selected from a group consisting of glass, quartz, silicon, germanium, ZnSe, ZnS, $CaF_2$, MgF, NaCl, KBr, sapphire, fused silica, a transparent conducting oxide (TCO), and a transparent organic polymer.

In particular, the at least one transfer device may, thus, constitute or comprise a converging optical element, preferably a converging optical lens, in particular one or more refractive lenses, particularly converging thin refractive lenses, such as convex or biconvex thin lenses and/or one or more convex mirrors, which may further be arranged along the common optical axis. Herein, the transfer device, in particular, the converging optical element, may, preferably, have at least one focal point, wherein the curved substrate and the transfer device are placed with respect to each other in a manner that one or more of the focal points are located within a volume of the film placed on the curved substrate. As already mentioned above, the curvature of the curved substrate on which the film can be deposited, may, in a preferred embodiment, follow at least approximately the Petzval surface, by which arrangement the focus of the impinging light beam may, thus, be located, independent of its angle of incidence, within the film.

In a specific embodiment, the optical element may comprise at least two individually curved surfaces, in particular two individually curved surfaces, which may, thus, as denoted as a "two-sided curved optical element". In this specific embodiment, the two individually curved surfaces may, preferably, be placed with respect to each other in a manner that the focal point may be located within the volume of the film being placed on both of the curved substrates. Herein, the same film or an individual film for each of the two individually curved substrates may be used. In a specific case, the transfer device may have at least two focal points, in particular, two focal points which may be located at different positions with respect to each other. Herein, the two or more individually curved surfaces of the two-sided curved optical element may be placed with respect to each other in a manner that each of the different focal points may be located within the volume of one of the individual films. As a result, it may, thus, be possible to provide an optical sensor, in which the curved substrate may comprise two individual optical sensors.

Herein, one of the two optical sensors may be a longitudinal optical sensor while the other of the two optical sensors may function as a transversal optical sensor. Consequently, by using this kind of optical detector having the two-sided curved optical element both the depth and the width of the object may be determined concurrently. In other words, a location in space made be determined here by using a particular simple arrangement for the optical detector which may comprise only two individual optical components, i.e. a single transfer element and the single two-sided curved optical element. Thus, the present invention may allow providing a detector designed for generating one or more items of information on a three-dimensional position of the object, wherein the detector may only comprise two individual optical components.

Alternatively, both optical sensors may be longitudinal optical sensors, such that the detector may comprise a first longitudinal optical sensor and a second longitudinal optical sensor. Herein, the transfer device may be selected from the spheric lens or the aspheric lens. Consequently, this kind of arrangement which uses the two-sided curved optical element having a single longitudinal optical sensor on each curved surface may in accordance with the FiP effect, as described above in more detail, be designated to determine the longitudinal position of the object with a high degree of accuracy and without ambiguity.

In a further alternative embodiment, both optical sensors may be selected from the same kind of optical sensors, such as two longitudinal optical sensors or two transversal optical sensors, wherein the two optical sensors of the same kind may differ with respect to each in a further optical property, such as an optical sensitivity, e.g., for a specific wavelength or a spectral range. By way of example, it may, thus, be possible to determine two different colors of the incident light beam by using the two-sided curved optical element carrying the two individual films of the photoconductive material having different spectral sensitivity. However, other kinds of differing optical properties between the two optical sensors of the same kind may also be feasible.

In a further embodiment, the transfer device may comprise a diffractive optical element, wherein the diffractive optical element may be a dispersive optical element being adapted to split the incident light beam into at least two split beams. For this purpose, the diffractive optical element may, preferably, be selected from a group consisting of a diffractive optical lens, a prism, a diffractive curved mirror, a beam-splitter, an engineered Diffuser™, and an optical grating. However, other kinds of diffractive optical elements which may be suited here can also be conceived.

In particular, the optical sensor and the transfer device may be placed with respect to each other in a manner that the at least two of the two split beams may be fed or guided to the film comprising the photoconductive material. Herein, at least two of the split beams may, preferably, be guided to at least one of:
   the same film;
   portions of the film which may be comprised on the same optical sensor; or
   at least two individual films that may be placed two different curved surfaces.

In a particularly preferred embodiment, each of the at least one optical sensors may, thus, be arranged within the detector of the present invention in a manner that the light beam impinges only a single optical sensor. This embodiment may comprise a first arrangement in which a single incident light beam may impinge the single optical sensor as comprised by detector, wherein the single optical sensor may have single curved surface or, as an alternative, at least two individually curved surfaces, such as a two-sided curved optical element. Alternatively, this embodiment may comprise a second arrangement in which the incident light beam may be split into at least two split beams, such as by using a dispersive optical element being which may be adapted for his purpose, wherein, however, each of the single split beams may impinge only a single optical sensor, wherein the detector may, thus, comprise a single optical sensor for each of the split beams.

In a particular embodiment, the optical grating as used for the diffractive optical element may have an equally spaced ruling that may be placed on a concave surface, in particular, on a spherical grating mount. This kind of optical grating may, in general, easier being manufactured compared to optical gratings which exhibit a non-equal spacing of the grating lines, irrespective whether placed on a flat mount or on the spherical mount. As a result, the optical grating placed on the spherical grating mount may split an incident light beam, preferably, being provided through an entrance slit into spectrally resolved reflected beams of all diffraction orders which are spectrally resolved between a first wavelength $\lambda_1$ and a second wavelength $\lambda_2$. As generally known, the light beams being reflected by this kind of optical grating may have their focus at a position on a the Rowland circle for any wavelength between the first wavelength $\lambda_1$ and the second wavelength $\lambda_2$. As generally used, the term "Rowland circle" refers to a circle having tangent to the center of the grating surface provided on the spherical grating mount and having half the radius of the spherical grating. Consequently, in order to provide a spectrometer, it may, particularly, be advantageous to locate the one or more optical sensors at a location on the Rowland circle. In addition, for a purpose of accomplishing a spectral resolution, the sensor region of the at least one optical sensor may, preferably, be or comprise an array of sensor areas, such as a linear array of sensor areas, particularly, being arranged in an adjacent manner within a plane defined by the spectrally resolved beam as reflected by the optical grating. Thus, this kind of optical sensor may, in particular, allow detecting an intensity of the incident light beam being resolved as a function of the wavelength.

As further used herein, the term "evaluation device" generally refers to an arbitrary device designed to generate the items of information, i.e. the at least one item of information on the position of the object. As an example, the evaluation device may be or may comprise one or more integrated circuits, such as one or more application-specific integrated circuits (ASICs), and/or one or more data processing devices, such as one or more computers, preferably one or more microcomputers and/or microcontrollers. Additional components may be comprised, such as one or more preprocessing devices and/or data acquisition devices, such as one or more devices for receiving and/or preprocessing of the sensor signals, such as one or more AD-converters and/or one or more filters. As used herein, the sensor signal may generally refer to one of the longitudinal sensor signal and, if applicable, to the transversal sensor signal. Further, the evaluation device may comprise one or more data storage devices. Further, as outlined above, the evaluation device may comprise one or more interfaces, such as one or more wireless interfaces and/or one or more wire-bound interfaces.

The at least one evaluation device may be adapted to perform at least one computer program, such as at least one computer program performing or supporting the step of generating the items of information. As an example, one or more algorithms may be implemented which, by using the sensor signals as input variables, may perform a predetermined transformation into the position of the object.

The evaluation device may particularly comprise at least one data processing device, in particular an electronic data processing device, which can be designed to generate the items of information by evaluating the sensor signals. Thus, the evaluation device is designed to use the sensor signals as input variables and to generate the items of information on the transversal position and the longitudinal position of the object by processing these input variables. The processing can be done in parallel, subsequently or even in a combined manner. The evaluation device may use an arbitrary process for generating these items of information, such as by calculation and/or using at least one stored and/or known relationship. Besides the sensor signals, one or a plurality of further parameters and/or items of information can influence said relationship, for example at least one item of information about a modulation frequency. The relationship can be determined or determinable empirically, analytically or else semi-empirically. Particularly preferably, the relationship comprises at least one calibration curve, at least one set of calibration curves, at least one function or a combination of the possibilities mentioned. One or a plurality of calibration curves can be stored for example in the form of a set of values and the associated function values thereof, for example in a data storage device and/or a table. Alternatively or additionally, however, the at least one calibration curve can also be stored for example in parameterized form and/or as a functional equation. Separate relationships for processing the sensor signals into the items of information may be used. Alternatively, at least one combined relationship for processing the sensor signals is feasible. Various possibilities are conceivable and can also be combined.

By way of example, the evaluation device can be designed in terms of programming for the purpose of determining the items of information. The evaluation device can comprise in particular at least one computer, for example at least one microcomputer. Furthermore, the evaluation device can comprise one or a plurality of volatile or nonvolatile data memories. As an alternative or in addition to a data processing device, in particular at least one computer, the evaluation device can comprise one or a plurality of further electronic components which are designed for determining the items of information, for example an electronic table and in particular at least one look-up table and/or at least one application-specific integrated circuit (ASIC).

The detector has, as described above, at least one evaluation device. In particular, the at least one evaluation device can also be designed to completely or partly control or drive the detector, for example by the evaluation device being designed to control at least one illumination source and/or to control at least one modulation device of the detector. The evaluation device can be designed, in particular, to carry out at least one measurement cycle in which one or a plurality of sensor signals, such as a plurality of sensor signals, are picked up, for example a plurality of sensor signals of successively at different modulation frequencies of the illumination.

The evaluation device is designed, as described above, to generate at least one item of information on the position of the object by evaluating the at least one sensor signal. Said position of the object can be static or may even comprise at least one movement of the object, for example a relative movement between the detector or parts thereof and the object or parts thereof. In this case, a relative movement can generally comprise at least one linear movement and/or at least one rotational movement. Items of movement information can for example also be obtained by comparison of at least two items of information picked up at different times, such that for example at least one item of location information can also comprise at least one item of velocity information and/or at least one item of acceleration information, for example at least one item of information about at least one relative velocity between the object or parts thereof and the detector or parts thereof. In particular, the at least one item of location information can generally be selected from: an item of information about a distance between the object or parts thereof and the detector or parts thereof, in particular an optical path length; an item of information about a distance or an optical distance between the object or parts thereof and the optional transfer device or parts thereof; an item of information about a positioning of the object or parts thereof relative to the detector or parts thereof; an item of information about an orientation of the object and/or parts thereof relative to the detector or parts thereof; an item of information about a relative movement between the object or parts thereof and the detector or parts thereof; an item of information about a two-dimensional or three-dimensional spatial configuration of the object or of parts thereof, in particular a geometry or form of the object. Generally, the at least one item of location information can therefore be selected for example from the group consisting of: an item of information about at least one location of the object or at least one part thereof; information about at least one orientation of the object or a part thereof; an item of information about a geometry or form of the object or of a part thereof, an item of information about a velocity of the object or of a part thereof, an item of information about an acceleration of the object or of a part thereof, an item of information about a presence or absence of the object or of a part thereof in a visual range of the detector.

The at least one item of location information can be specified for example in at least one coordinate system, for example a coordinate system in which the detector or parts thereof rest. Alternatively or additionally, the location information can also simply comprise for example a distance between the detector or parts thereof and the object or parts thereof. Combinations of the possibilities mentioned are also conceivable.

As used herein, the term "transversal optical sensor" generally refers to a device which is adapted to determine a transversal position of at least one light beam traveling from the object to the detector. With regard to the term position, reference may be made to the definition above. Thus, preferably, the transversal position may be or may comprise at least one coordinate in at least one dimension perpendicular to an optical axis of the detector. As an example, the transversal position may be a position of a light spot generated by the light beam in a plane perpendicular to the optical axis, such as on a light-sensitive sensor surface of the transversal optical sensor. As an example, the position in the plane may be given in Cartesian coordinates and/or polar coordinates. Other embodiments are feasible. For potential embodiments of the transversal optical sensor, reference may be made to WO 2014/097181 A1. However, other embodiments are feasible and will be outlined in further detail below.

The transversal optical sensor may provide at least one transversal sensor signal. Herein, the transversal sensor signal may generally be an arbitrary signal indicative of the transversal position. As an example, the transversal sensor signal may be or may comprise a digital and/or an analog signal. As an example, the transversal sensor signal may be or may comprise a voltage signal and/or a current signal. Additionally or alternatively, the transversal sensor signal may be or may comprise digital data. The transversal sensor signal may comprise a single signal value and/or a series of signal values. The transversal sensor signal may further comprise an arbitrary signal which may be derived by combining two or more individual signals, such as by averaging two or more signals and/or by forming a quotient of two or more signals.

In a first embodiment similar to the disclosure according to WO 2014/097181 A1, the transversal optical sensor may be a photo detector having at least one first electrode, at least one second electrode and at least one photovoltaic material, wherein the photovoltaic material may be embedded in between the first electrode and the second electrode. Thus, the transversal optical sensor may be or may comprise one or more photo detectors, such as one or more organic photodetectors and, most preferably, one or more dye-sensitized organic solar cells (DSCs, also referred to as dye solar cells), such as one or more solid dye-sensitized organic solar cells (s-DSCs). Thus, the detector may comprise one or more DSCs (such as one or more sDSCs) acting as the at least one transversal optical sensor and one or more DSCs (such as one or more sDSCs) acting as the at least one longitudinal optical sensor.

In a further embodiment, the transversal optical sensor may comprise a layer of the photoconductive material, preferably an inorganic photoconductive material, such as one of the photoconductive materials as mentioned above and/or below. Herein, the layer of the photoconductive material may comprise a composition selected from a homogeneous, a crystalline, a polycrystalline, a microcrystalline, a nanocrystalline and/or an amorphous phase. Alternatively, the photoconductive material may be provided in the form of quantum dots as described above. Preferably, the layer of the photoconductive material may be embedded in between two layers of a transparent conducting oxide (TCO), preferably indium tin oxide (ITO), fluorine doped tin oxide (SnO2:F; FTO), aluminum doped zinc oxide (AZO), magnesium oxide (MgO), or a perovskite transparent conducting oxide, wherein one of the two layers may be replaced by metal nanowires, in particular by Ag nanowires. However, other material may be feasible, in particular according to the desired transparent spectral range.

Further, at least two electrodes may be present for recording the transversal optical signal. In a preferred embodiment, the at least two electrodes may actually be arranged in the form of at least two physical electrodes, wherein each physical electrode may comprise an electrically conducting material, preferably a metallically conducting material, more preferred a highly metallically conducting material such as copper, silver, gold, an alloy or a composition comprising these kinds of materials, or graphene. Herein, each of the at least two physical electrodes may, preferably, be arranged in a manner that a direct electrical contact between the respective electrode and the photoconductive layer in the optical sensor may be achieved, particularly in order to acquire the longitudinal sensor signal with as little loss as possible, such as due to additional resistances in a transport path between the optical sensor and the evaluation device.

Preferably, at least one of the electrodes of the transversal optical sensor may be a split electrode having at least two partial electrodes, wherein the transversal optical sensor may have a sensor region, wherein the at least one transversal sensor signal may indicate an x- and/or a y-position of the incident light beam within the sensor region. The sensor region may be a surface of the photo detector facing towards the object. The sensor region preferably may be oriented perpendicular to the optical axis. Thus, the transversal sensor signal may indicate a position of a light spot generated by the light beam in a plane of the sensor region of the transversal optical sensor. Generally, as used herein, the term "partial electrode" refers to an electrode out of a plurality of electrodes, adapted for measuring at least one current and/or voltage signal, preferably independent from other partial electrodes. Thus, in case a plurality of partial electrodes is provided, the respective electrode is adapted to provide a plurality of electric potentials and/or electric currents and/or voltages via the at least two partial electrodes, which may be measured and/or used independently.

The transversal optical sensor may further be adapted to generate the transversal sensor signal in accordance with the electrical currents through the partial electrodes. Thus, a ratio of electric currents through two horizontal partial electrodes may be formed, thereby generating an x-coordinate, and/or a ratio of electric currents through to vertical partial electrodes may be formed, thereby generating a y-coordinate. The detector, preferably the transversal optical sensor and/or the evaluation device, may be adapted to derive the information on the transversal position of the object from at least one ratio of the currents through the partial electrodes. Other ways of generating position coordinates by comparing currents through the partial electrodes are feasible.

The partial electrodes may generally be defined in various ways, in order to determine a position of the light beam in the sensor region. Thus, two or more horizontal partial electrodes may be provided in order to determine a horizontal coordinate or x-coordinate, and two or more vertical partial electrodes may be provided in order to determine a vertical coordinate or y-coordinate. Thus, the partial electrodes may be provided at a rim of the sensor region, wherein an interior space of the sensor region remains free and may be covered by one or more additional electrode materials. As will be outlined in further detail below, the additional electrode material preferably may be a transparent additional electrode material, such as a transparent metal and/or a transparent conductive oxide and/or, most preferably, a transparent conductive polymer.

By using the transversal optical sensor, wherein one of the electrodes is a split electrode with three or more partial electrodes, currents through the partial electrodes may be dependent on a position of the light beam in the sensor region. This may generally be due to the fact that Ohmic losses or resistive losses may occur on the way from a location of generation of electrical charges due to the impinging light onto the partial electrodes. Thus, besides the partial electrodes, the split electrode may comprise one or more additional electrode materials connected to the partial electrodes, wherein the one or more additional electrode materials provide an electrical resistance. Thus, due to the Ohmic losses on the way from the location of generation of the electric charges to the partial electrodes through with the one or more additional electrode materials, the currents through the partial electrodes depend on the location of the generation of the electric charges and, thus, to the position of the light beam in the sensor region. For details of this principle of determining the position of the light beam in the sensor region, reference may be made to the preferred embodiments below and/or to the physical principles and device options as disclosed in WO 2014/097181 A1 and the respective references therein.

Accordingly, the transversal optical sensor may comprise the sensor region, which, preferably, may be transparent to the light beam travelling from the object to the detector. The transversal optical sensor may, therefore, be adapted to determine a transversal position of the light beam in one or more transversal directions, such as in the x- and/or in the y-direction. For this purpose, the at least one transversal optical sensor may further be adapted to generate at least one transversal sensor signal. Thus, the evaluation device may be designed to generate at least one item of information on a transversal position of the object by evaluating the transversal sensor signal of the longitudinal optical sensor.

Further embodiments of the present invention referred to the nature of the light beam which propagates from the object to the detector. As used herein, the term "light" generally refers to electromagnetic radiation in one or more of the visible spectral range, the ultraviolet spectral range and the infrared spectral range. Therein, the term "ultraviolet spectral range" generally refers to electromagnetic radiation in the range of 1 nm to 380 nm, preferably in the range of 100 nm to 380 nm. Further, in partial accordance with standard ISO-21348 in a valid version at the date of this document, the term "visible spectral range" generally refers to a spectral range of 380 nm to 760 nm. The term "infrared spectral range" (IR) generally refers to electromagnetic radiation in the range of 760 nm to 1000 µm, wherein the range of 760 nm to 1.5 µm is usually denominated as "near infrared spectral range" (NIR) and the range from 1.5µ to 15 µm as "mid infrared spectral range" (MidIR) while the range from 15 µm to 1000 µm is denominated as "far infrared spectral range" (FIR). Preferably, light as used within the present invention is light in the infrared spectral range, more preferred in the mid infrared spectral range.

The term "light beam" generally refers to an amount of light emitted into a specific direction. Thus, the light beam may be a bundle of the light rays having a predetermined extension in a direction perpendicular to a direction of propagation of the light beam. Preferably, the light beam may be or may comprise one or more Gaussian light beams which may be characterized by one or more Gaussian beam parameters, such as one or more of a beam waist, a Rayleigh-length or any other beam parameter or combination of beam parameters suited to characterize a development of a beam diameter and/or a beam propagation in space.

The light beam might be admitted by the object itself, i.e. might originate from the object. Additionally or alternatively, another origin of the light beam is feasible. Thus, as will be outlined in further detail below, one or more illumination sources might be provided which illuminate the object, such as by using one or more primary rays or beams, such as one or more primary rays or beams having a predetermined characteristic. In the latter case, the light beam propagating from the object to the detector might be a light beam which is reflected by the object and/or a reflection device connected to the object.

As outlined above, the at least one longitudinal sensor signal, given the same total power of the illumination by the light beam, is, according to the FiP effect, dependent on a beam cross-section of the light beam in the sensor region of the at least one longitudinal optical sensor. As used herein, the term beam cross-section generally refers to a lateral extension of the light beam or a light spot generated by the light beam at a specific location. In case a circular light spot is generated, a radius, a diameter or a Gaussian beam waist or twice the Gaussian beam waist may function as a measure of the beam cross-section. In case non-circular light-spots are generated, the cross-section may be determined in any other feasible way, such as by determining the cross-section of a circle having the same area as the non-circular light spot, which is also referred to as the equivalent beam cross-section. In this regard, it may be possible to employ the observation of an extremum, i.e. a maximum or a minimum, of the longitudinal sensor signal, in particular a global extremum, under a condition in which the corresponding material, such as a photovoltaic material, may be impinged by a light beam with the smallest possible cross-section, such as when the material may be located at or near a focal point as affected by an optical lens. In case the extremum is a maximum, this observation may be denominated as the positive FiP-effect, while in case the extremum is a minimum, this observation may be denominated as the negative FiP-effect.

Thus, irrespective of the material actually comprised in the sensor region but given the same total power of the illumination of the sensor region by the light beam, a light beam having a first beam diameter or beam cross-section may generate a first longitudinal sensor signal, whereas a light beam having a second beam diameter or beam-cross section being different from the first beam diameter or beam cross-section generates a second longitudinal sensor signal being different from the first longitudinal sensor signal. Thus, by comparing the longitudinal sensor signals, at least one item of information on the beam cross-section, specifically on the beam diameter, may be generated. For details of this effect, reference may be made to WO 2012/110924 A1. Accordingly, the longitudinal sensor signals generated by the longitudinal optical sensors may be compared, in order to gain information on the total power and/or intensity of the light beam and/or in order to normalize the longitudinal sensor signals and/or the at least one item of information on the longitudinal position of the object for the total power and/or total intensity of the light beam. Thus, as an example, a maximum value of the longitudinal optical sensor signals may be detected, and all longitudinal sensor signals may be divided by this maximum value, thereby generating normalized longitudinal optical sensor signals, which, then, may be transformed by using the above-mentioned known relationship, into the at least one item of longitudinal information on the object. Other ways of normalization are feasible, such as a normalization using a mean value of the longitudinal sensor signals and dividing all longitudinal sensor signals by the mean value. Other options are possible. Each of these options may be appropriate to render the transformation independent from the total power and/or intensity of the light beam. In addition, information on the total power and/or intensity of the light beam might, thus, be generated.

Specifically in case one or more beam properties of the light beam propagating from the object to the detector are known, the at least one item of information on the longitudinal position of the object may thus be derived from a known relationship between the at least one longitudinal sensor signal and a longitudinal position of the object. The known relationship may be stored in the evaluation device as an algorithm and/or as one or more calibration curves. As an example, specifically for Gaussian beams, a relationship between a beam diameter or beam waist and a position of the object may easily be derived by using the Gaussian relationship between the beam waist and a longitudinal coordinate.

This embodiment may, particularly, be used by the evaluation device in order to resolve an ambiguity in the known relationship between a beam cross-section of the light beam and the longitudinal position of the object. Thus, even if the beam properties of the light beam propagating from the object to the detector are known fully or partially, it is known that, in many beams, the beam cross-section narrows before reaching a focal point and, afterwards, widens again. Thus, before and after the focal point in which the light beam has the narrowest beam cross-section, positions along the axis of propagation of the light beam occur in which the light beam has the same cross-section. Thus, as an example, at a distance z0 before and after the focal point, the cross-section of the light beam is identical. Thus, in case only one longitudinal optical sensor with a specific spectral sensitivity is used, a specific cross-section of the light beam might be determined, in case the overall power or intensity of the light beam is known. By using this information, the distance z0 of the respective longitudinal optical sensor from the focal point might be determined. However, in order to determine whether the respective longitudinal optical sensor is located before or behind the focal point, additional information is required, such as a history of movement of the object and/or the detector and/or information on whether the detector is located before or behind the focal point. In typical situations, this additional information may not be provided. Therefore, additional information may be gained in order to resolve the above-mentioned ambiguity. Thus, in case the evaluation device, by evaluating the longitudinal sensor signals, recognizes that the beam cross-section of the light beam on a first longitudinal optical sensor is larger than the beam cross-section of the light beam on a second longitudinal optical sensor, wherein the second longitudinal optical sensor is located behind the first longitudinal optical sensor, the evaluation device may determine that the light beam is still narrowing and that the location of the first longitudinal optical sensor is situated before the focal point of the light beam. Contrarily, in case the beam cross-section of the light beam on the first longitudinal optical sensor is smaller than the beam cross-section of the light beam on the second longitudinal optical sensor, the evaluation device may determine that the light beam is widening and that the location of the second longitudinal optical sensor is situated behind the focal point. Thus, generally, the evaluation device may be adapted to recognize whether the light beam widens or narrows, by comparing the longitudinal sensor signals of different longitudinal sensors.

For further details with regard to determining the at least one item of information on the longitudinal position of the object by employing the evaluation device according to the present invention, reference may made to the description in WO 2014/097181 A1. Thus, generally, the evaluation device may be adapted to compare the beam cross-section and/or the diameter of the light beam with known beam properties of the light beam in order to determine the at least one item of information on the longitudinal position of the object, preferably from a known dependency of a beam diameter of the light beam on at least one propagation coordinate in a direction of propagation of the light beam and/or from a known Gaussian profile of the light beam.

In addition to the at least one longitudinal coordinate of the object, at least one transversal coordinate of the object may be determined. Thus, generally, the evaluation device may further be adapted to determine at least one transversal coordinate of the object by determining a position of the light beam on the at least one transversal optical sensor, which may be a pixelated, a segmented or a large-area transversal optical sensor, as further outlined also in WO 2014/097181 A1.

Generally, the detector may further comprise at least one imaging device, i.e. a device capable of acquiring at least one image. The imaging device can be embodied in various ways. Thus, the imaging device can be for example part of the detector in a detector housing. Alternatively or additionally, however, the imaging device can also be arranged outside the detector housing, for example as a separate imaging device. Alternatively or additionally, the imaging device can also be connected to the detector or even be part of the detector. In a preferred arrangement, the optical sensor and the imaging device are aligned along a common optical axis along which the light beam travels. Thus, it may be possible to locate an imaging device in the optical path of the light beam in a manner that the light beam travels through the optical sensor until it impinges on the imaging device. However, other arrangements are possible.

As used herein, an "imaging device" is generally understood as a device which can generate a one-dimensional, a two-dimensional, or a three-dimensional image of the object or of a part thereof. In particular, the detector, with or without the at least one optional imaging device, can be completely or partly used as a camera, such as an IR camera, or an RGB camera, i.e. a camera which is designed to deliver three basic colors which are designated as red, green, and blue, on three separate connections. Thus, as an example, the at least one imaging device may be or may comprise at least one imaging device selected from the group consisting of: a pixelated organic camera element, preferably a pixelated organic camera chip; a pixelated inorganic camera element, preferably a pixelated inorganic camera chip, more preferably a CCD- or CMOS-chip; a monochrome camera element, preferably a monochrome camera chip; a multicolor camera element, preferably a multicolor camera chip; a full-color camera element, preferably a full-color camera chip. The imaging device may be or may comprise at least one device selected from the group consisting of a monochrome imaging device, a multi-chrome imaging device and at least one full color imaging device. A multi-chrome imaging device and/or a full color imaging device may be generated by using filter techniques and/or by using intrinsic color sensitivity or other techniques, as the skilled person will recognize. Other embodiments of the imaging device are also possible.

The imaging device may be designed to image a plurality of partial regions of the object successively and/or simultaneously. By way of example, a partial region of the object can be a one-dimensional, a two-dimensional, or a three-dimensional region of the object which is delimited for example by a resolution limit of the imaging device and from which electromagnetic radiation emerges. In this context, imaging should be understood to mean that the electromagnetic radiation which emerges from the respective partial region of the object is fed into the imaging device, for example by means of the at least one optional transfer device of the detector. The electromagnetic rays can be generated by the object itself, for example in the form of a luminescent radiation. Alternatively or additionally, the at least one detector may comprise at least one illumination source for illuminating the object.

In particular, the imaging device can be designed to image sequentially, for example by means of a scanning method, in particular using at least one row scan and/or line scan, the plurality of partial regions sequentially. However, other embodiments are also possible, for example embodiments in which a plurality of partial regions is simultaneously imaged. The imaging device is designed to generate, during this imaging of the partial regions of the object, signals, preferably electronic signals, associated with the partial regions. The signal may be an analogue and/or a digital signal. By way of example, an electronic signal can be associated with each partial region. The electronic signals can accordingly be generated simultaneously or else in a temporally staggered manner. By way of example, during a row scan or line scan, it is possible to generate a sequence of electronic signals which correspond to the partial regions of the object, which are strung together in a line, for example. Further, the imaging device may comprise one or more signal processing devices, such as one or more filters and/or analogue-digital-converters for processing and/or preprocessing the electronic signals.

Light emerging from the object can originate in the object itself, but can also optionally have a different origin and propagate from this origin to the object and subsequently toward the optical sensors. The latter case can be affected for example by at least one illumination source being used. The illumination source can be embodied in various ways. Thus, the illumination source can be for example part of the detector in a detector housing. Alternatively or additionally, however, the at least one illumination source can also be arranged outside a detector housing, for example as a separate light source. The illumination source can be arranged separately from the object and illuminate the object from a distance. Alternatively or additionally, the illumination source can also be connected to the object or even be part of the object, such that, by way of example, the electromagnetic radiation emerging from the object can also be generated directly by the illumination source. By way of example, at least one illumination source can be arranged on and/or in the object and directly generate the electromagnetic radiation by means of which the sensor region is illuminated. This illumination source can for example be or comprise an ambient light source and/or may be or may comprise an artificial illumination source. By way of example, at least one infrared emitter and/or at least one emitter for visible light and/or at least one emitter for ultraviolet light can be arranged on the object. By way of example, at least one light emitting diode and/or at least one laser diode can be arranged on and/or in the object. The illumination source can comprise in particular one or a plurality of the following illumination sources: a laser, in particular a laser diode, although in principle, alternatively or additionally, other types of lasers can also be used; a light emitting diode; an incandescent lamp; a neon light; a flame source; a heat source; an organic light source, in particular an organic light emitting diode; a structured light source. Alternatively or additionally, other illumination sources can also be used. It is particularly preferred if the illumination source is designed to generate one or more light beams having a Gaussian beam profile, as is at least approximately the case for example in many lasers. For further potential embodiments of the optional illumination source, reference may be made to one of WO 2012/110924 A1 and WO 2014/097181 A1. Still, other embodiments are feasible.

The at least one optional illumination source generally may emit light in at least one of the ultraviolet spectral range (preferably 200 nm to 380 nm), the visible spectral range (380 nm to 780 nm); the infrared spectral range (780 nm to 1000μ), preferably in the range of 780 nm to 15 micrometers. Most preferably, the at least one illumination source is adapted to emit light in at least one of the mentioned spectral ranges, i.e. the ultraviolet spectral range, the visible spectral range, and/or the infrared spectral range. Herein, it is particularly preferred when the illumination source may exhibit a spectral range which may be related to the spectral sensitivities of the longitudinal sensors, particularly in a manner to ensure that the longitudinal sensor which may be illuminated by the respective illumination source may provide a sensor signal with a high intensity which may, thus, enable a high-resolution evaluation with a sufficient signal-to-noise-ratio.

Irrespective of the actual configuration of this preferred embodiment, a comparatively simple and cost-efficient setup for the optical sensor may be obtained by using the detector according to the present invention. This advantage may particularly become obvious when compared to the optical sensor as, for example, depicted in WO 2012/110924 A1 or WO 2014/097181 A1, wherein more individual optical components may be required for the setup of the optical detector. Nevertheless, the lower number of individual optical components which may be used here may still provide a working embodiment for the optical sensor. However, other embodiments may also be appropriate as the setup for the optical sensor according to the present invention.

Furthermore, the detector can have at least one modulation device for modulating the illumination, in particular for a periodic modulation, in particular a periodic beam interrupting device. A modulation of the illumination should be understood to mean a process in which a total power of the illumination is varied, preferably periodically, in particular with one or a plurality of modulation frequencies. In particular, a periodic modulation can be effected between a maximum value and a minimum value of the total power of the illumination. The minimum value can be 0, but can also be >0, such that, by way of example, complete modulation does not have to be effected. The modulation can be effected for example in a beam path between the object and the optical sensor, for example by the at least one modulation device being arranged in said beam path. Alternatively or additionally, however, the modulation can also be effected in a beam path between an optional illumination source—described in even greater detail below—for illuminating the object and the object, for example by the at least one modulation device being arranged in said beam path. A combination of these possibilities is also conceivable. The at least one modulation device can comprise for example a beam chopper or some other type of periodic beam interrupting device, for example comprising at least one interrupter blade or interrupter wheel, which preferably rotates at constant speed and which can thus periodically interrupt the illumination. Alternatively or additionally, however, it is also possible to use one or a plurality of different types of modulation devices, for example modulation devices based on an electro-optical effect and/or an acousto-optical effect. Once again alternatively or additionally, the at least one optional illumination source itself can also be designed to generate a modulated illumination, for example by said illumination source itself having a modulated intensity and/or total power, for example a periodically modulated total power, and/or by said illumination source being embodied as a pulsed illumination source, for example as a pulsed laser. Thus, by way of example, the at least one modulation device can also be wholly or partly integrated into the illumination source. Various possibilities are conceivable.

Accordingly, the detector can be designed in particular to detect at least two longitudinal sensor signals in the case of different modulations, in particular at least two longitudinal sensor signals at respectively different modulation frequencies. The evaluation device can be designed to generate the geometrical information from the at least two longitudinal sensor signals. As described in WO 2012/110924 A1 and WO 2014/097181 A1, it is possible to resolve ambiguities and/or it is possible to take account of the fact that, for example, a total power of the illumination is generally unknown. By way of example, the detector can be designed to bring about a modulation of the illumination of the object and/or at least one sensor region of the detector, such as at least one sensor region of the at least one longitudinal optical sensor, with a frequency of 0.05 Hz to 1 MHz, such as 0.1 Hz to 10 kHz. As outlined above, for this purpose, the detector may comprise at least one modulation device, which may be integrated into the at least one optional illumination source and/or may be independent from the illumination source. Thus, at least one illumination source might, by itself, be adapted to generate the above-mentioned modulation of the illumination, and/or at least one independent modulation device may be present, such as at least one chopper and/or at least one device having a modulated transmissibility, such as at least one electro-optical device and/or at least one acousto-optical device.

According to the present invention, it may be advantageous in order to apply at least one modulation frequency to the optical detector as described above. However, it may still be possible to directly determine the longitudinal sensor signal without applying a modulation frequency to the optical detector. As will be demonstrated below in more detail, an application of a modulation frequency may not be required under many relevant circumstances in order to acquire the desired longitudinal information about the object. As a result, the optical detector may, thus, not be required to comprise a modulation device which may further contribute to the simple and cost-effective setup of the spatial detector. As a further result, a spatial light modulator may be used in a time-multiplexing mode rather than a frequency-multiplexing mode or in a combination thereof.

In a further aspect of the present invention, an arrangement comprising at least two individual detectors according to any of the preceding embodiments, preferably two or three individual optical sensors, which may be placed at two distinct locations is proposed. Herein, the at least two detectors preferably may have identical optical properties but might also be different with respect from each other. In addition, the arrangement may further comprise at least one illumination source. Herein, the at least one object might be illuminated by using at least one illumination source which generates primary light, wherein the at least one object elastically or inelastically reflects the primary light, thereby generating a plurality of light beams which propagate to one of the at least two detectors. The at least one illumination source may form or may not form a constituent part of each of the at least two detectors. By way of example, the at least one illumination source itself may be or may comprise an ambient light source and/or may be or may comprise an artificial illumination source. This embodiment is preferably suited for an application in which at least two detectors, preferentially two identical detectors, are employed for acquiring depth information, in particular, for the purpose to providing a measurement volume which extends the inherent measurement volume of a single detector.

In this regard, the individual optical sensor may, preferably, be spaced apart from the other individual optical sensors comprised by the detector in order to allow acquiring an individual image which may differ from the images taken by the other individual optical sensors. In particular, the individual optical sensors may be arranged in separate beam paths in a collimated arrangement in order to generate a single circular, three-dimensional image. Thus, the individual optical sensors may be aligned in a manner that they are located parallel to the optical axis and may, in addition, exhibit an individual displacement in an orientation perpendicular to the optical axis of the detector. Herein, an alignment may be achieved by adequate measures, such as by adjusting a location and orientation of the individual optical sensor and/or the corresponding transfer element. Thus, the two individual optical sensors may, preferably, be spaced apart in a manner that they may be able to generate or increase a perception of depth information, especially in a fashion that the depth information may be obtained by combining visual information as derived from the two individual optical sensors having overlapping fields of view, such as the visual information as obtained by binocular vision. For this purpose, the individual optical sensors may, preferably be spaced apart from each other by a distance from 1 cm to 100 cm, preferably from 10 cm to 25 cm, as determined in the direction perpendicular to the optical axis. As used herein, the detector as provided in this embodiment may, in particular, be part of a "stereoscopic system" which will be described below in more detail. Besides allowing stereoscopic vision, further particular advantages of the stereoscopic system which are primarily based on a use of more than one optical sensor may, in particular, include an increase of the total intensity and/or a lower detection threshold.

In a further aspect of the present invention, a human-machine interface for exchanging at least one item of information between a user and a machine is proposed. The human-machine interface as proposed may make use of the fact that the above-mentioned detector in one or more of the embodiments mentioned above or as mentioned in further detail below may be used by one or more users for providing information and/or commands to a machine. Thus, preferably, the human-machine interface may be used for inputting control commands.

The human-machine interface comprises at least one detector according to the present invention, such as according to one or more of the embodiments disclosed above and/or according to one or more of the embodiments as disclosed in further detail below, wherein the human-machine interface is designed to generate at least one item of geometrical information of the user by means of the detector wherein the human-machine interface is designed to assign the geometrical information to at least one item of information, in particular to at least one control command.

In a further aspect of the present invention, an entertainment device for carrying out at least one entertainment function is disclosed. As used herein, an entertainment device is a device which may serve the purpose of leisure and/or entertainment of one or more users, in the following also referred to as one or more players. As an example, the entertainment device may serve the purpose of gaming, preferably computer gaming. Additionally or alternatively, the entertainment device may also be used for other purposes, such as for exercising, sports, physical therapy or motion tracking in general. Thus, the entertainment device may be implemented into a computer, a computer network or a computer system or may comprise a computer, a computer network or a computer system which runs one or more gaming software programs.

The entertainment device comprises at least one human-machine interface according to the present invention, such as according to one or more of the embodiments disclosed above and/or according to one or more of the embodiments disclosed below. The entertainment device is designed to enable at least one item of information to be input by a player by means of the human-machine interface. The at least one item of information may be transmitted to and/or may be used by a controller and/or a computer of the entertainment device.

In a further aspect of the present invention, a tracking system for tracking the position of at least one movable object is provided. As used herein, a tracking system is a device which is adapted to gather information on a series of past positions of the at least one object or at least one part of an object. Additionally, the tracking system may be adapted to provide information on at least one predicted future position of the at least one object or the at least one part of the object. The tracking system may have at least one track controller, which may fully or partially be embodied as an electronic device, preferably as at least one data processing device, more preferably as at least one computer or microcontroller. Again, the at least one track controller may comprise the at least one evaluation device and/or may be part of the at least one evaluation device and/or might fully or partially be identical to the at least one evaluation device.

The tracking system comprises at least one detector according to the present invention, such as at least one detector as disclosed in one or more of the embodiments listed above and/or as disclosed in one or more of the embodiments below. The tracking system further comprises at least one track controller. The tracking system may comprise one, two or more detectors, particularly two or more identical detectors, which allow for a reliable acquisition of depth information about the at least one object in an overlapping volume between the two or more detectors. The track controller is adapted to track a series of positions of the object, each position comprising at least one item of information on a position of the object at a specific point in time.

The tracking system may further comprise at least one beacon device connectable to the object. For a potential definition of the beacon device, reference may be made to WO 2014/097181 A1. The tracking system preferably is adapted such that the detector may generate an information on the position of the object of the at least one beacon device, in particular to generate the is information on the position of the object which comprises a specific beacon device exhibiting a specific spectral sensitivity. Thus, more than one beacon exhibiting a different spectral sensitivity may be tracked by the detector of the present invention, preferably in a simultaneous manner. Herein, the beacon device may fully or partially be embodied as an active beacon device and/or as a passive beacon device. As an example, the beacon device may comprise at least one illumination source adapted to generate at least one light beam to be transmitted to the detector. Additionally or alternatively, the beacon device may comprise at least one reflector adapted to reflect light generated by an illumination source, thereby generating a reflected light beam to be transmitted to the detector.

In a further aspect of the present invention, a scanning system for determining at least one position of at least one object is provided. As used herein, the scanning system is a device which is adapted to emit at least one light beam being configured for an illumination of at least one dot located at at least one surface of the at least one object and for generating at least one item of information about the distance between the at least one dot and the scanning system. For the purpose of generating the at least one item of information about the distance between the at least one dot and the scanning system, the scanning system comprises at least one of the detectors according to the present invention, such as at least one of the detectors as disclosed in one or more of the embodiments listed above and/or as disclosed in one or more of the embodiments below.

Thus, the scanning system comprises at least one illumination source which is adapted to emit the at least one light beam being configured for the illumination of the at least one dot located at the at least one surface of the at least one object. As used herein, the term "dot" refers to a small area on a part of the surface of the object which may be selected, for example by a user of the scanning system, to be illuminated by the illumination source. Preferably, the dot may exhibit a size which may, on one hand, be as small as possible in order to allow the scanning system determining a value for the distance between the illumination source comprised by the scanning system and the part of the surface of the object on which the dot may be located as exactly as possible and which, on the other hand, may be as large as possible in order to allow the user of the scanning system or the scanning system itself, in particular by an automatic procedure, to detect a presence of the dot on the related part of the surface of the object.

For this purpose, the illumination source may comprise an artificial illumination source, in particular at least one laser source and/or at least one incandescent lamp and/or at least one semiconductor light source, for example, at least one light-emitting diode, in particular an organic and/or inorganic light-emitting diode. On account of their generally defined beam profiles and other properties of handleability, the use of at least one laser source as the illumination source is particularly preferred. Herein, the use of a single laser source may be preferred, in particular in a case in which it may be important to provide a compact scanning system that might be easily storable and transportable by the user. The illumination source may thus, preferably be a constituent part of the detector and may, therefore, in particular be integrated into the detector, such as into the housing of the detector. In a preferred embodiment, particularly the housing of the scanning system may comprise at least one display configured for providing distance-related information to the user, such as in an easy-to-read manner. In a further preferred embodiment, particularly the housing of the scanning system may, in addition, comprise at least one button which may be configured for operating at least one function related to the scanning system, such as for setting one or more operation modes. In a further preferred embodiment, particularly the housing of the scanning system may, in addition, comprise at least one fastening unit which may be configured for fastening the scanning system to a further surface, such as a rubber foot, a base plate or a wall holder, such comprising as magnetic material, in particular for increasing the accuracy of the distance measurement and/or the handleablity of the scanning system by the user.

In a particularly preferred embodiment, the illumination source of the scanning system may, thus, emit a single laser beam which may be configured for the illumination of a single dot located at the surface of the object. By using at least one of the detectors according to the present invention at least one item of information about the distance between the at least one dot and the scanning system may, thus, be generated. Hereby, preferably, the distance between the illumination system as comprised by the scanning system and the single dot as generated by the illumination source may be determined, such as by employing the evaluation device as comprised by the at least one detector. However, the scanning system may, further, comprise an additional evaluation system which may, particularly, be adapted for this purpose. Alternatively or in addition, a size of the scanning system, in particular of the housing of the scanning system, may be taken into account and, thus, the distance between a specific point on the housing of the scanning system, such as a front edge or a back edge of the housing, and the single dot may, alternatively, be determined.

Alternatively, the illumination source of the scanning system may emit two individual laser beams which may be configured for providing a respective angle, such as a right angle, between the directions of an emission of the beams, whereby two respective dots located at the surface of the same object or at two different surfaces at two separate objects may be illuminated. However, other values for the respective angle between the two individual laser beams may also be feasible. This feature may, in particular, be employed for indirect measuring functions, such as for deriving an indirect distance which may not be directly accessible, such as due to a presence of one or more obstacles between the scanning system and the dot or which may otherwise be hard to reach. By way of example, it may, thus, be feasible to determine a value for a height of an object by measuring two individual distances and deriving the height by using the Pythagoras formula. In particular for being able to keep a predefined level with respect to the object, the scanning system may, further, comprise at least one leveling unit, in particular an integrated bubble vial, which may be used for keeping the predefined level by the user.

As a further alternative, the illumination source of the scanning system may emit a plurality of individual laser beams, such as an array of laser beams which may exhibit a respective pitch, in particular a regular pitch, with respect to each other and which may be arranged in a manner in order to generate an array of dots located on the at least one surface of the at least one object. For this purpose, specially adapted optical elements, such as beam-splitting devices and mirrors, may be provided which may allow a generation of the described array of the laser beams.

Thus, the scanning system may provide a static arrangement of the one or more dots placed on the one or more surfaces of the one or more objects. Alternatively, illumination source of the scanning system, in particular the one or more laser beams, such as the above described array of the laser beams, may be configured for providing one or more light beams which may exhibit a varying intensity over time and/or which may be subject to an alternating direction of emission in a passage of time. Thus, the illumination source may be configured for scanning a part of the at least one surface of the at least one object as an image by using one or more light beams with alternating features as generated by the at least one illumination source of the scanning device. In particular, the scanning system may, thus, use at least one row scan and/or line scan, such as to scan the one or more surfaces of the one or more objects sequentially or simultaneously. Thus, the scanning system may be adapted to measure angles by measuring three or more dots, or the scanning system may be adapted to measure corners or narrow regions such as a gable of a roof, which may be hardly accessible using a conventional measuring stick.

As a non-limiting example, the scanning system may be attached to a tripod and point towards an object or region with a several corners and surfaces. One or more flexibly movable laser sources are attached to the scanning system. The one or more laser sources are moved as such that they illuminate points of interest. The position of the illuminated points with respect to the scanning system is measured when pressing a designated button on the scanning system and the position information is transmitted via a wireless interface to a mobile phone. The position information is stored in a mobile phone application. The laser sources are moved to illuminate further points of interest the position of which are measured and transmitted to the mobile phone application. The mobile phone application may transform the set of points into a 3d model by connecting adjacent points with planar surfaces. The 3d model may be stored and processed further. The distances and or angles between the measured points or surfaces may be displayed directly on a display attached to a scanning system or on the mobile phone to which the position information is transmitted.

As a non-limiting example, a scanning system may comprise two or more flexible movable laser sources to project points and further one movable laser source projecting a line. The line may be used to arrange the two or more laser spots along a line and the display of the scanning device may display the distance between the two or more laser spots that may be arranged along the line, such as at equal distance. In the case of two laser spots, a single laser source may be used whereas the distance of the projected points is modified using one or more beam-splitters or prisms, where a beam-splitter or prism can be moved as such that the projected laser spots move apart or closer together. Further, the scanning system may be adapted to project further patterns such as a right angle, a circle, a square, a triangle, or the like, along which a measurement can be done by projecting laser spots and measuring their position.

As a non-limiting example, the scanning system may be adapted to support the work with tools, such as wood or metal processing tools, such as a saw, a driller, or the like. Thus, the scanning system may be adapted to measure the distance in two opposite directions and display the two measured distances or the sum of the distances in a display. Further, the scanning system may be adapted to measure the distance to the edge of a surface as such that when the scanning system is placed on the surface, a laser point is moved automatically away from the scanning system along the surface, until the distance measurement shows a sudden change due to a corner or the edge of a surface. This makes it possible to measure the distance of the end of a wood plank while the scanning device is placed on the plank but remote from its end. Further, the scanning system may measure the distance of the end of a plank in one direction and project a line or circle or point in a designated distance in the opposite direction. The scanning system may be adapted to project the line or circle or point in a distance depending on the distance measured in the opposite direction such as depending on a predetermined sum distance. This allows working with a tool such as a saw or driller at the projected position while placing the scanning system in a safe distance from the tool and simultaneously performing a process using the tool in a predetermined distance to the edge of the plank. Further, the scanning system may be adapted to project points or lines or the like in two opposite directions in a predetermined distance. When the sum of the distances is changed, only one of the projected distances changes.

As a non-limiting example, the scanning system may be adapted to be placed onto a surface, such as a surface on which a task is performed, such as cutting, sawing, drilling, or the like, and to project a line onto the surface in a predetermined distance that can be adjusted such as with buttons on the scanning device.

In a further aspect of the present invention, a stereoscopic system for generating at least one single circular, three-dimensional image of at least one object is provided. As used herein, the stereoscopic system as disclosed above and/or below may comprise at least two of the FiP sensors as the optical sensors, wherein a first FiP sensor may be comprised in a tracking system, in particular in a tracking system according to the present invention, while a second FiP sensor may be comprised in a scanning system, in particular in a scanning system according to the present invention. Herein, the FiP sensors may, preferably, be arranged in separate beam paths in a collimated arrangement, such as by aligning the FiP sensors parallel to the optical axis and individually displaced perpendicular to the optical axis of the stereoscopic system. Thus, the FiP sensors may be able to generate or increase a perception of depth information, especially, by obtaining the depth information by a combination of the visual information derived from the individual FiP sensors which have overlapping fields of view and are, preferably, sensitive to an individual modulation frequency. For this purpose, the individual FiP sensors may, preferably, be spaced apart from each other by a distance from 1 cm to 100 cm, preferably from 10 cm to 25 cm, as determined in the direction perpendicular to the optical axis. In this preferred embodiment, the tracking system may, thus, be employed for determining a position of a modulated active target while the scanning system which is adapted to project one or more dots onto the one or more surfaces of the one or more objects may be used for generating at least one item of information about the distance between the at least one dot and the scanning system. In addition, the stereoscopic system may further comprise a separate position sensitive device being adapted for generating the item of information on the transversal position of the at least one object within the image as described elsewhere in this application.

Besides allowing stereoscopic vision, further particular advantages of the stereoscopic system which are primarily based on a use of more than one optical sensor may, in particular, include an increase of the total intensity and/or a lower detection threshold. Further, whereas in a conventional stereoscopic system which comprises at least two conventional position sensitive devices corresponding pixels in the respective images have to be determined by applying considerable computational effort, in the stereoscopic system according to the present invention which comprises at least two FiP sensors the corresponding pixels in the respective images being recorded by using the FiP sensors, wherein each of the FiP sensors may be operated with a different modulation frequency, may apparently be assigned with respect to each other. Thus, it may be emphasized that the stereoscopic system according to the present invention may allow generating the at least one item of information on the longitudinal position of the object as well as on the transversal position of the object with reduced effort.

For further details of the stereoscopic system, reference may be made to the description of the tracking system and the scanning system, respectively.

In a further aspect of the present invention, a camera for imaging at least one object is disclosed. The camera comprises at least one detector according to the present invention, such as disclosed in one or more of the embodiments given above or given in further detail below. Thus, the detector may be part of a photographic device, specifically of a digital camera. Specifically, the detector may be used for 3D photography, specifically for digital 3D photography. Thus, the detector may form a digital 3D camera or may be part of a digital 3D camera. As used herein, the term "photography" generally refers to the technology of acquiring image information of at least one object. As further used herein, a "camera" generally is a device adapted for performing photography. As further used herein, the term "digital photography" generally refers to the technology of acquiring image information of at least one object by using a plurality of light-sensitive elements adapted to generate electrical signals indicating an intensity of illumination, preferably digital electrical signals. As further used herein, the term "3D photography" generally refers to the technology of acquiring image information of at least one object in three spatial dimensions. Accordingly, a 3D camera is a device adapted for performing 3D photography. The camera generally may be adapted for acquiring a single image, such as a single 3D image, or may be adapted for acquiring a plurality of images, such as a sequence of images. Thus, the camera may also be a video camera adapted for video applications, such as for acquiring digital video sequences.

Thus, generally, the present invention further refers to a camera, specifically a digital camera, more specifically a 3D camera or digital 3D camera, for imaging at least one object. As outlined above, the term imaging, as used herein, generally refers to acquiring image information of at least one object. The camera comprises at least one detector according to the present invention. The camera, as outlined above, may be adapted for acquiring a single image or for acquiring a plurality of images, such as image sequence, preferably for acquiring digital video sequences. Thus, as an example, the camera may be or may comprise a video camera. In the latter case, the camera preferably comprises a data memory for storing the image sequence.

In a further aspect of the present invention, a method for determining a position of at least one object is disclosed. The method preferably may make use of at least one detector according to the present invention, such as of at least one detector according to one or more of the embodiments disclosed above or disclosed in further detail below. Thus, for optional embodiments of the method, reference might be made to the description of the various embodiments of the detector.

The method comprises the following steps, which may be performed in the given order or in a different order. Further, additional method steps might be provided which are not listed. Further, two or more or even all of the method steps might be performed simultaneously, at least partially. Further, two or more or even all of the method steps might be performed twice or even more than twice, repeatedly.

The method according to the present invention comprises the following steps:
generating at least one longitudinal sensor signal by using at least one longitudinal optical sensor, the optical sensor having at least one sensor region, the sensor region comprising at least one curved substrate and at least one film of a photoconductive material, wherein the film is placed on at least one surface of the curved substrate, wherein the optical sensor is designed to generate at least one sensor signal in a manner dependent on an illumination of the sensor region by a light beam, wherein at least one transfer device is adapted to transfer the light beam from the object to the optical sensor, thereby being adapted to guide the light beam to the film located on the curved substrate; and
generating at least one item of information on a position of the object by evaluating the sensor signal of the optical sensor.

In a further aspect of the present invention, a use of a detector according to the present invention is disclosed. Therein, a use of the detector for a purpose of determining a position of an object, in particular a lateral position of an object, is proposed, wherein the detector may, preferably, be used concurrently as at least one longitudinal optical sensor or combined with at least one additional longitudinal optical sensor, in particular, for a purpose of use selected from the group consisting of: a position measurement, in particular in traffic technology; an entertainment application; a security application; a human-machine interface application; a tracking application; a scanning application; a stereoscopic vision application; a photography application; an imaging application or camera application; a mapping application for generating maps of at least one space; a homing or tracking beacon detector for vehicles; a position measurement of objects with a thermal signature (hotter or colder than background); a machine vision application; a robotic application.

Further uses of the optical detector according to the present invention may also refer to combinations with applications already been known, such as determining the presence or absence of an object; extending optical applications, e.g. camera exposure control, auto slide focus, automated rear view mirrors, electronic scales, automatic gain control, particularly in modulated light sources, automatic headlight dimmers, night (street) light controls, oil burner flame outs, or smoke detectors; or other applications, such as in densitometers, e.g. determining the density of toner in photocopy machines; or in colorimetric measurements.

Thus, generally, the devices according to the present invention, such as the detector, may be applied in various fields of uses. Specifically, the detector may be applied for a purpose of use, selected from the group consisting of: a position measurement in traffic technology; an entertainment application; a security application; a human-machine interface application; a tracking application; a photography application; a cartography application; a mapping application for generating maps of at least one space; a homing or tracking beacon detector for vehicles; a mobile application; a webcam; an audio device; a Dolby surround audio system; a computer peripheral device; a gaming application; a camera or video application; a surveillance application; an automotive application; a transport application; a logistics application; a vehicle application; an airplane application; a ship application; a spacecraft application; a robotic application; a medical application; a sports' application; a building application; a construction application; a manufacturing application; a machine vision application; a use in combination with at least one sensing technology selected from time-of-flight detector, radar, Lidar, ultrasonic sensors, or interferometry. Additionally or alternatively, applications in local and/or global positioning systems may be named, especially landmark-based positioning and/or navigation, specifically for use in cars or other vehicles (such as trains, motorcycles, bicycles, trucks for cargo transportation), robots or for use by pedestrians. Further, indoor positioning systems may be named as potential applications, such as for household applications and/or for robots used in manufacturing, logistics, surveillance, or maintenance technology.

Thus, firstly, the devices according to the present invention may be used in mobile phones, tablet computers, laptops, smart panels or other stationary or mobile or wearable computer or communication applications. Thus, the devices according to the present invention may be combined with at least one active light source, such as a light source emitting light in the visible range or infrared spectral range, in order to enhance performance. Thus, as an example, the devices according to the present invention may be used as cameras and/or sensors, such as in combination with mobile software for scanning and/or detecting environment, objects and living beings. The devices according to the present invention may even be combined with 2D cameras, such as conventional cameras, in order to increase imaging effects. The devices according to the present invention may further be used for surveillance and/or for recording purposes or as input devices to control mobile devices, especially in combination with voice and/or gesture recognition. Thus, specifically, the devices according to the present invention acting as human-machine interfaces, also referred to as input devices, may be used in mobile applications, such as for controlling other electronic devices or components via the mobile device, such as the mobile phone. As an example, the mobile application including at least one device according to the present invention may be used for controlling a television set, a game console, a music player or music device or other entertainment devices.

Further, the devices according to the present invention may be used in webcams or other peripheral devices for computing applications. Thus, as an example, the devices according to the present invention may be used in combination with software for imaging, recording, surveillance, scanning, or motion detection. As outlined in the context of the human-machine interface and/or the entertainment device, the devices according to the present invention are particularly useful for giving commands by facial expressions and/or body expressions. The devices according to the present invention can be combined with other input generating devices like e.g. mouse, keyboard, touchpad, microphone etc. Further, the devices according to the present invention may be used in applications for gaming, such as by using a webcam. Further, the devices according to the present invention may be used in virtual training applications and/or video conferences. Further, devices according to the present invention may be used to recognize or track hands, arms, or objects used in a virtual or augmented reality application, especially when wearing head mounted displays.

Further, the devices according to the present invention may be used in mobile audio devices, television devices and gaming devices, as partially explained above. Specifically, the devices according to the present invention may be used as controls or control devices for electronic devices, entertainment devices or the like. Further, the devices according to the present invention may be used for eye detection or eye tracking, such as in 2D- and 3D-display techniques, especially with transparent displays for augmented reality applications and/or for recognizing whether a display is being looked at and/or from which perspective a display is being looked at. Further, devices according to the present invention may be used to explore a room, boundaries, obstacles, in connection with a virtual or augmented reality application, especially when wearing a head-mounted display.

Further, the devices according to the present invention may be used in or as digital cameras such as DSC cameras and/or in or as reflex cameras such as SLR cameras. For these applications, reference may be made to the use of the devices according to the present invention in mobile applications such as mobile phones, as disclosed above.

Further, the devices according to the present invention may be used for security or surveillance applications. Thus, as an example, at least one device according to the present invention can be combined with one or more digital and/or analogue electronics that will give a signal if an object is within or outside a predetermined area (e.g. for surveillance applications in banks or museums). Specifically, the devices according to the present invention may be used for optical encryption. Detection by using at least one device according to the present invention can be combined with other detection devices to complement wavelengths, such as with IR, x-ray, UV-VIS, radar or ultrasound detectors. The devices according to the present invention may further be combined with an active infrared light source to allow detection in low light surroundings. The devices according to the present invention are generally advantageous as compared to active detector systems, specifically since the devices according to the present invention avoid actively sending signals which may be detected by third parties, as is the case e.g. in radar applications, ultrasound applications, LIDAR or similar active detector devices. Thus, generally, the devices according to the present invention may be used for an unrecognized and undetectable tracking of moving objects. Additionally, the devices according to the present invention generally are less prone to manipulations and irritations as compared to conventional devices.

Further, given the ease and accuracy of 3D detection by using the devices according to the present invention, the devices according to the present invention generally may be used for facial, body and person recognition and identification. Therein, the devices according to the present invention may be combined with other detection means for identification or personalization purposes such as passwords, finger prints, iris detection, voice recognition or other means. Thus, generally, the devices according to the present invention may be used in security devices and other personalized applications.

Further, the devices according to the present invention may be used as 3D barcode readers for product identification.

In addition to the security and surveillance applications mentioned above, the devices according to the present invention generally can be used for surveillance and monitoring of spaces and areas. Thus, the devices according to the present invention may be used for surveying and monitoring spaces and areas and, as an example, for triggering or executing alarms in case prohibited areas are violated. Thus, generally, the devices according to the present invention may be used for surveillance purposes in building surveillance or museums, optionally in combination with other types of sensors, such as in combination with motion or heat sensors, in combination with image intensifiers or image enhancement devices and/or photomultipliers. Further, the devices according to the present invention may be used in public spaces or crowded spaces to detect potentially hazardous activities such as commitment of crimes such as theft in a parking lot or unattended objects such as unattended baggage in an airport.

Further, the devices according to the present invention may advantageously be applied in camera applications such as video and camcorder applications. Thus, the devices according to the present invention may be used for motion capture and 3D-movie recording. Therein, the devices according to the present invention generally provide a large number of advantages over conventional optical devices.

Thus, the devices according to the present invention generally require a lower complexity with regard to optical components. Thus, as an example, the number of lenses may be reduced as compared to conventional optical devices, such as by providing the devices according to the present invention having one lens only. Due to the reduced complexity, very compact devices are possible, such as for mobile use. Conventional optical systems having two or more lenses with high quality generally are voluminous, such as due to the general need for voluminous beam-splitters. Further, the devices according to the present invention generally may be used for focus/autofocus devices, such as autofocus cameras. Further, the devices according to the present invention may also be used in optical microscopy, especially in confocal microscopy.

Further, the devices according to the present invention generally are applicable in the technical field of automotive technology and transport technology. Thus, as an example, the devices according to the present invention may be used as distance and surveillance sensors, such as for adaptive cruise control, emergency brake assist, lane departure warning, surround view, blind spot detection, traffic sign detection, traffic sign recognition, lane recognition, rear cross traffic alert, light source recognition for adapting the head light intensity and range depending on approaching traffic or vehicles driving ahead, adaptive front-lighting systems, automatic control of high beam head lights, adaptive cut-off lights in front light systems, glare-free high beam front lighting systems, marking animals, obstacles, or the like by headlight illumination, rear cross traffic alert, and other driver assistance systems, such as advanced driver assistance systems, or other automotive and traffic applications. Further, devices according to the present invention may be used in driver assistance systems which may, particularly, be adapted for anticipating maneuvers of the driver beforehand for collision avoidance. Further, the devices according to the present invention can also be used for velocity and/or acceleration measurements, such as by analyzing a first and second time-derivative of position information gained by using the detector according to the present invention. This feature generally may be applicable in automotive technology, transportation technology or general traffic technology. Applications in other fields of technology are feasible. A specific application in an indoor positioning system may be the detection of positioning of passengers in transportation, more specifically to electronically control the use of safety systems such as airbags. Herein, the use of an airbag may, especially, be prevented in a case in which the passenger may be located within the vehicle in a manner that a use of the airbag might cause an injury, in particular a severe injury, with the passenger. Further, in vehicles such as cars, trains, planes or the like, especially in autonomous vehicles, devices according to the present invention may be used to determine whether a driver pays attention to the traffic or is distracted, or asleep, or tired, or incapable of driving, such as due to the consumption of alcohol or other drugs.

In these or other applications, generally, the devices according to the present invention may be used as stand-alone devices or in combination with other sensor devices, such as in combination with radar and/or ultrasonic devices. Specifically, the devices according to the present invention may be used for autonomous driving and safety issues. Further, in these applications, the devices according to the present invention may be used in combination with infrared sensors, radar sensors, which are sonic sensors, two-dimensional cameras or other types of sensors. In these applications, the generally passive nature of the devices according to the present invention is advantageous. Thus, since the devices according to the present invention generally do not require emitting signals, the risk of interference of active sensor signals with other signal sources may be avoided. The devices according to the present invention specifically may be used in combination with recognition software, such as standard image recognition software. Thus, signals and data as provided by the devices according to the present invention typically are readily processable and, therefore, generally require lower calculation power than established stereovision systems such as LIDAR. Given the low space demand, the devices according to the present invention such as cameras may be placed at virtually any place in a vehicle, such as on or behind a window screen, on a front hood, on bumpers, on lights, on mirrors or other places and the like. Various detectors according to the present invention such as one or more detectors based on the effect disclosed within the present invention can be combined, such as in order to allow autonomously driving vehicles or in order to increase the performance of active safety concepts. Thus, various devices according to the present invention may be combined with one or more other devices according to the present invention and/or conventional sensors, such as in the windows like rear window, side window or front window, on the bumpers or on the lights.

A combination of at least one device according to the present invention such as at least one detector according to the present invention with one or more rain detection sensors is also possible. This is due to the fact that the devices according to the present invention generally are advantageous over conventional sensor techniques such as radar, specifically during heavy rain. A combination of at least one device according to the present invention with at least one conventional sensing technique such as radar may allow for a software to pick the right combination of signals according to the weather conditions.

Further, the devices according to the present invention may generally be used as break assist and/or parking assist and/or for speed measurements. Speed measurements can be integrated in the vehicle or may be used outside the vehicle, such as in order to measure the speed of other cars in traffic control. Further, the devices according to the present invention may be used for detecting free parking spaces in parking lots.

Further, the devices according to the present invention may generally be used for vision, in particular for vision under difficult visibility conditions, such as in night vision, fog vision, or fume vision. For achieving this purpose, the optical detector may comprise a specifically selected colloidal quantum dots which may be sensitive at least within a wavelength range in which small particles, such as particles being present in smoke or fume, or small droplets, such as droplets being present in fog, mist or haze, may not reflect an incident light beam or only a small partition thereof. As generally know, the reflection of the incident light beam may be small or negligent in a case in which the wavelength of the incident beam exceeds the size of the particles or of the droplets, respectively. Further, might vision may be enabled by detecting thermal radiation being emitted by a bodies and objects. Thus, the optical detector which comprises the specifically selected colloidal quantum dots which may particularly be sensitive within the infrared (IR) spectral range, preferably within the near infrared (NIR) spectral range, may, thus, allow good visibility even at night, in fume, smoke, fog, mist, or haze.

Further, the devices according to the present invention may be used in the fields of medical systems and sports.

Thus, in the field of medical technology, surgery robotics, e.g. for use in endoscopes, may be named, since, as outlined above, the devices according to the present invention may require a low volume only and may be integrated into other devices. Specifically, the devices according to the present invention having one lens, at most, may be used for capturing 3D information in medical devices such as in endoscopes. Further, the devices according to the present invention may be combined with an appropriate monitoring software, in order to enable tracking and analysis of movements. This may allow an instant overlay of the position of a medical device, such as an endoscope or a scalpel, with results from medical imaging, such as obtained from magnetic resonance imaging, x-ray imaging, or ultrasound imaging. These applications are specifically valuable e.g. in medical treatments where precise location information is important such as in brain surgery and long-distance diagnosis and tele-medicine. Further, the devices according to the present invention may be used in 3D-body scanning. Body scanning may be applied in a medical context, such as in dental surgery, plastic surgery, bariatric surgery, or cosmetic plastic surgery, or it may be applied in the context of medical diagnosis such as in the diagnosis of myofascial pain syndrome, cancer, body dysmorphic disorder, or further diseases. Body scanning may further be applied in the field of sports to assess ergonomic use or fit of sports equipment.

Body scanning may further be used in the context of clothing, such as to determine a suitable size and fitting of clothes. This technology may be used in the context of tailor-made clothes or in the context of ordering clothes or shoes from the internet or at a self-service shopping device such as a micro kiosk device or customer concierge device. Body scanning in the context of clothing is especially important for scanning fully dressed customers.

Further, the devices according to the present invention may be used in the context of people counting systems, such as to count the number of people in an elevator, a train, a bus, a car, or a plane, or to count the number of people passing a hallway, a door, an aisle, a retail store, a stadium, an entertainment venue, a museum, a library, a public location, a cinema, a theater, or the like. Further, the 3D-function in the people counting system may be used to obtain or estimate further information about the people that are counted such as height, weight, age, physical fitness, or the like. This information may be used for business intelligence metrics, and/or for further optimizing the locality where people may be counted to make it more attractive or safe. In a retail environment, the devices according to the present invention in the context of people counting may be used to recognize returning customers or cross shoppers, to assess shopping behavior, to assess the percentage of visitors that make purchases, to optimize staff shifts, or to monitor the costs of a shopping mall per visitor. Further, people counting systems may be used for anthropometric surveys. Further, the devices according to the present invention may be used in public transportation systems for automatically charging passengers depending on the length of transport. Further, the devices according to the present invention may be used in playgrounds for children, to recognize injured children or children engaged in dangerous activities, to allow additional interaction with playground toys, to ensure safe use of playground toys or the like.

Further, the devices according to the present invention may be used in construction tools, such as a range meter that determines the distance to an object or to a wall, to assess whether a surface is planar, to align or objects or place objects in an ordered manner, or in inspection cameras for use in construction environments or the like.

Further, the devices according to the present invention may be applied in the field of sports and exercising, such as for training, remote instructions or competition purposes. Specifically, the devices according to the present invention may be applied in the fields of dancing, aerobic, football, soccer, basketball, baseball, cricket, hockey, track and field, swimming, polo, handball, volleyball, rugby, sumo, judo, fencing, boxing, golf, car racing, laser tag, battlefield simulation etc. The devices according to the present invention can be used to detect the position of a ball, a bat, a sword, motions, etc., both in sports and in games, such as to monitor the game, support the referee or for judgment, specifically automatic judgment, of specific situations in sports, such as for judging whether a point or a goal actually was made.

Further, the devices according to the present invention may be used in the field of auto racing or car driver training or car safety training or the like to determine the position of a car or the track of a car, or the deviation from a previous track or an ideal track or the like.

The devices according to the present invention may further be used to support a practice of musical instruments, in particular remote lessons, for example lessons of string instruments, such as fiddles, violins, violas, celli, basses, harps, guitars, banjos, or ukuleles, keyboard instruments, such as pianos, organs, keyboards, harpsichords, harmoniums, or accordions, and/or percussion instruments, such as drums, timpani, marimbas, xylophones, vibraphones, bongos, congas, timbales, djembes or tablas.

The devices according to the present invention further may be used in rehabilitation and physiotherapy, in order to encourage training and/or in order to survey and correct movements. Therein, the devices according to the present invention may also be applied for distance diagnostics.

Further, the devices according to the present invention may be applied in the field of machine vision. Thus, one or more of the devices according to the present invention may be used e.g. as a passive controlling unit for autonomous driving and or working of robots. In combination with moving robots, the devices according to the present invention may allow for autonomous movement and/or autonomous detection of failures in parts. The devices according to the present invention may also be used for manufacturing and safety surveillance, such as in order to avoid accidents including but not limited to collisions between robots, production parts and living beings. In robotics, the safe and direct interaction of humans and robots is often an issue, as robots may severely injure humans when they are not recognized. Devices according to the present invention may help robots to position objects and humans better and faster and allow a safe interaction. Given the passive nature of the devices according to the present invention, the devices according to the present invention may be advantageous over active devices and/or may be used complementary to existing solutions like radar, ultrasound, 2D cameras, IR detection etc. One particular advantage of the devices according to the present invention is the low likelihood of signal interference. Therefore multiple sensors can work at the same time in the same environment, without the risk of signal interference. Thus, the devices according to the present invention generally may be useful in highly automated production environments like e.g. but not limited to automotive, mining, steel, etc. The devices according to the present invention can also be used for quality control in production, e.g. in combination with other sensors like 2-D imaging, radar, ultrasound, IR etc., such as for quality control or other purposes. Further, the devices according to the present invention may be used for assessment of surface quality, such as for surveying the surface evenness of a product or the adherence to specified dimensions, from the range of micrometers to the range of meters. Other quality control applications are feasible. In a manufacturing environment, the devices according to the present invention are especially useful for processing natural products such as food or wood, with a complex 3-dimensional structure to avoid large amounts of waste material. Further, devices according to the present invention may be used to monitor the filling level of tanks, silos etc. Further, devices according to the present invention may be used to inspect complex products for missing parts, incomplete parts, loose parts, low quality parts, or the like, such as in automatic optical inspection, such as of printed circuit boards, inspection of assemblies or sub-assemblies, verification of engineered components, engine part inspections, wood quality inspection, label inspections, inspection of medical devices, inspection of product orientations, packaging inspections, food pack inspections, or the like.

Further, the devices according to the present invention may be used in vehicles, trains, airplanes, ships, spacecraft and other traffic applications. Thus, besides the applications mentioned above in the context of traffic applications, passive tracking systems for aircraft, vehicles and the like may be named. The use of at least one device according to the present invention, such as at least one detector according to the present invention, for monitoring the speed and/or the direction of moving objects is feasible. Specifically, the tracking of fast moving objects on land, sea and in the air including space may be named. The at least one device according to the present invention, such as the at least one detector according to the present invention, specifically may be mounted on a still-standing and/or on a moving device. An output signal of the at least one device according to the present invention can be combined e.g. with a guiding mechanism for autonomous or guided movement of another object. Thus, applications for avoiding collisions or for enabling collisions between the tracked and the steered object are feasible. The devices according to the present invention generally are useful and advantageous due to the low calculation power required, the instant response and due to the passive nature of the detection system which generally is more difficult to detect and to disturb as compared to active systems, like e.g. radar. The devices according to the present invention are particularly useful but not limited to e.g. speed control and air traffic control devices. Further, the devices according to the present invention may be used in automated tolling systems for road charges.

The devices according to the present invention may, generally, be used in passive applications. Passive applications include guidance for ships in harbors or in dangerous areas, and for aircraft when landing or starting. Wherein, fixed, known active targets may be used for precise guidance. The same can be used for vehicles driving on dangerous but well defined routes, such as mining vehicles. Further, the devices according to the present invention may be used to detect rapidly approaching objects, such as cars, trains, flying objects, animals, or the like. Further, the devices according to the present invention can be used for detecting velocities or accelerations of objects, or to predict the movement of an object by tracking one or more of its position, speed, and/or acceleration depending on time.

Further, as outlined above, the devices according to the present invention may be used in the field of gaming. Thus, the devices according to the present invention can be passive for use with multiple objects of the same or of different size, color, shape, etc., such as for movement detection in combination with software that incorporates the movement into its content. In particular, applications are feasible in implementing movements into graphical output. Further, applications of the devices according to the present invention for giving commands are feasible, such as by using one or more of the devices according to the present invention for gesture or facial recognition. The devices according to the present invention may be combined with an active system in order to work under e.g. low light conditions or in other situations in which enhancement of the surrounding conditions is required. Additionally or alternatively, a combination of one or more devices according to the present invention with one or more IR or VIS light sources is possible. A combination of a detector according to the present invention with special devices is also possible, which can be distinguished easily by the system and its software, e.g. and not limited to, a special color, shape, relative position to other devices, speed of movement, light, frequency used to modulate light sources on the device, surface properties, material used, reflection properties, transparency degree, absorption characteristics, etc. The device can, amongst other possibilities, resemble a stick, a racquet, a club, a gun, a knife, a wheel, a ring, a steering wheel, a bottle, a ball, a glass, a vase, a spoon, a fork, a cube, a dice, a figure, a puppet, a teddy, a beaker, a pedal, a switch, a glove, jewelry, a musical instrument or an auxiliary device for playing a musical instrument, such as a plectrum, a drumstick or the like. Other options are feasible.

Further, the devices according to the present invention may be used to detect and or track objects that emit light by themselves, such as due to high temperature or further light emission processes. The light emitting part may be an exhaust stream or the like. Further, the devices according to the present invention may be used to track reflecting objects and analyze the rotation or orientation of these objects.

Further, the devices according to the present invention may generally be used in the field of building, construction and cartography. Thus, generally, one or more devices according to the present invention may be used in order to measure and/or monitor environmental areas, e.g. countryside or buildings. Therein, one or more devices according to the present invention may be combined with other methods and devices or can be used solely in order to monitor progress and accuracy of building projects, changing objects, houses, etc. The devices according to the present invention can be used for generating three-dimensional models of scanned environments, in order to construct maps of rooms, streets, houses, communities or landscapes, both from ground or air. Potential fields of application may be construction, cartography, real estate management, land surveying or the like. As an example, the devices according to the present invention may be used in vehicles capable of flight, such as drones or multicopters, in order to monitor buildings, chimneys, production sites, agricultural production environments such as fields, production plants, or landscapes, to support rescue operations, to support work in dangerous environments, to support fire brigades in a burning location indoors or outdoors, to find or monitor one or more persons, animals, or moving objects, or for entertainment purposes, such as a drone following and recording one or more persons doing sports such as skiing or cycling or the like, which could be realized by following a helmet, a mark, a beacon device, or the like. Devices according to the present invention could be used recognize obstacles, follow a predefined route, follow an edge, a pipe, a building, or the like, or to record a global or local map of the environment. Further, devices according to the present invention could be used for indoor or outdoor localization and positioning of drones, for stabilizing the height of a drone indoors where barometric pressure sensors are not accurate enough, or for the interaction of multiple drones such as concertized movements of several drones or recharging or refueling in the air or the like.

Further, the devices according to the present invention may be used within an interconnecting network of home appliances such as CHAIN (Cedec Home Appliances Interoperating Network) to interconnect, automate, and control basic appliance-related services in a home, e.g. energy or load management, remote diagnostics, pet related appliances, child related appliances, child surveillance, appliances related surveillance, support or service to elderly or ill persons, home security and/or surveillance, remote control of appliance operation, and automatic maintenance support. Further, the devices according to the present invention may be used in heating or cooling systems such as an air-conditioning system, to locate which part of the room should be brought to a certain temperature or humidity, especially depending on the location of one or more persons. Further, the devices according to the present invention may be used in domestic robots, such as service or autonomous robots which may be used for household chores. The devices according to the present invention may be used for a number of different purposes, such as to avoid collisions or to map the environment, but also to identify a user, to personalize the robot's performance for a given user, for security purposes, or for gesture or facial recognition. As an example, the devices according to the present invention may be used in robotic vacuum cleaners, floor-washing robots, dry-sweeping robots, ironing robots for ironing clothes, animal litter robots, such as cat litter robots, security robots that detect intruders, robotic lawn mowers, automated pool cleaners, rain gutter cleaning robots, window washing robots, toy robots, telepresence robots, social robots providing company to less mobile people, or robots translating and speech to sign language or sign language to speech. In the context of less mobile people, such as elderly persons, household robots with the devices according to the present invention may be used for picking up objects, transporting objects, and interacting with the objects and the user in a safe way. Further the devices according to the present invention may be used in robots operating with hazardous materials or objects or in dangerous environments. As a non-limiting example, the devices according to the present invention may be used in robots or unmanned remote-controlled vehicles to operate with hazardous materials such as chemicals or radioactive materials especially after disasters, or with other hazardous or potentially hazardous objects such as mines, unexploded arms, or the like, or to operate in or to investigate insecure environments such as near burning objects or post disaster areas, or for manned or unmanned rescue operations in the air, in the sea, underground, or the like.

Further, the devices according to the present invention may be used in household, mobile or entertainment devices, such as a refrigerator, a microwave, a washing machine, a window blind or shutter, a household alarm, an air condition devices, a heating device, a television, an audio device, a smart watch, a mobile phone, a phone, a dishwasher, a stove or the like, to detect the presence of a person, to monitor the contents or function of the device, or to interact with the person and/or share information about the person with further household, mobile or entertainment devices. Herein, the devices according to the present invention may be used to support elderly or disabled persons, blind persons, or persons with limited vision abilities, such as in household chores or at work such as in devices for holding, carrying, or picking objects, or in a safety system with optical and/or acoustical signals adapted for signaling obstacles in the environment.

The devices according to the present invention may further be used in agriculture, for example to detect and sort out vermin, weeds, and/or infected crop plants, fully or in parts, wherein crop plants may be infected by fungus or insects. Further, for harvesting crops, the devices according to the present invention may be used to detect animals, such as deer, which may otherwise be harmed by harvesting devices. Further, the devices according to the present invention may be used to monitor the growth of plants in a field or greenhouse, in particular to adjust the amount of water or fertilizer or crop protection products for a given region in the field or greenhouse or even for a given plant. Further, in agricultural biotechnology, the devices according to the present invention may be used to monitor the size and shape of plants.

Further, devices according to the present invention may be used to guide users during a shaving, hair cutting, or cosmetics procedure, or the like. Further, devices according to the present invention may be used to record or monitor what is played on an instrument, such as a violin. Further, devices according to the present invention may be used in smart household appliances such as a smart refrigerator, such as to monitor the contents of the refrigerator and transmit notifications depending on the contents. Further, devices according to the present invention may be used for monitoring or tracking populations of humans, animals, or plants, such as dear or tree populations in forests. Further, devices according to the present invention may be used in harvesting machines, such as for harvesting crops, flowers or fruits, such as grapes, corn, hops, apples, grains, rice, strawberries, asparagus, tulips, roses, soy beans, or the like. Further, devices according to the present invention may be used to monitor the growth of plants, animals, algae, fish, or the like, such as in breeding, food production, agriculture or research applications, to control irrigation, fertilization, humidity, temperature, use of herbicides, insecticides, fungicides, rodenticides, or the like. Further, devices according to the present invention may be used in feeding machines for animals or pets, such as for cows, pigs, cats, dogs, birds, fish, or the like. Further, devices according to the present invention may be used in animal product production processes, such as for collecting milk, eggs, fur, meat, or the like, such as in automated milking or butchering processes. Further, devices according to the present invention may be used for automated seeding machines, or sowing machines, or planting machines such as for planting corn, garlic, trees, salad or the like. Further, devices according to the present invention may be used to assess or monitor weather phenomena, such as clouds, fog, or the like, or to warn from danger of avalanches, tsunamis, gales, earthquakes, thunder storms, or the like. Further, devices according to the present invention may be used to measure motions, shocks, concussions, or the like such as to monitor earthquake risk. Further, devices according to the present invention may be used in traffic technology to monitor dangerous crossings, to control traffic lights depending on traffic, to monitor public spaces, to monitor roads, gyms, stadiums, ski resorts, public events, or the like. Further, devices according to the present invention may be used in medical applications such as to monitor or analyze tissues, medical or biological assays, changes in tissues such as in moles or melanoma or the like, to count bacteria, blood cells, cells, algae, or the like, for retina scans, breath or pulse measurements, gastroscopy, patient surveillance, or the like. Further, devices according to the present invention may be used to monitor the shape, size, or circumference of drops, streams, jets, or the like or to analyze, assess, or monitor profiles or gas or liquid currents such as in a wind channel, or the like. Further, devices according to the present invention may be used to warn drivers such as car or train drivers when they are getting sick or tired or the like. Further, devices according to the present invention may be used in material testing to recognize strains or tensions or fissures, or the like. Further, devices according to the present invention may be used in sailing to monitor and optimize sail positions such as automatically. Further, devices according to the present invention may be used for fuel level gauges.

Further, the devices according to the present invention may be combined with sensors to detect chemicals or pollutants, electronic nose chips, microbe sensor chips to detect bacteria or viruses or the like, Geiger counters, tactile sensors, heat sensors, or the like. This may for example be used in constructing smart robots which are configured for handling dangerous or difficult tasks, such as in treating highly infectious patients, handling or removing highly dangerous substances, cleaning highly polluted areas, such as highly radioactive areas or chemical spills, or for pest control in agriculture.

One or more devices according to the present invention can further be used for scanning of objects, such as in combination with CAD or similar software, such as for additive manufacturing and/or 3D printing. Therein, use may be made of the high dimensional accuracy of the devices according to the present invention, e.g. in x-, y- or z-direction or in any arbitrary combination of these directions, such as simultaneously. In this regard, determining a distance of an illuminated spot on a surface which may provide reflected or diffusely scattered light from the detector may be performed virtually independent of the distance of the light source from the illuminated spot. This property of the present invention is in direct contrast to known methods, such as triangulation or such as time-of-flight (TOF) methods, wherein the distance between the light source and the illuminated spot must be known a priori or calculated a posteriori in order to be able to determine the distance between the detector and the illuminated spot. In contrast hereto, for the detector according to the present invention is may be sufficient that the spot is adequately illuminated. Further, the devices according to the present invention may be used for scanning reflective surfaces, such of metal surfaces, independent whether they may comprise a solid or a liquid surface. Further, the devices according to the present invention may be used in inspections and maintenance, such as pipeline inspection gauges. Further, in a production environment, the devices according to the present invention may be used to work with objects of a badly defined shape such as naturally grown objects, such as sorting vegetables or other natural products by shape or size or cutting products such as meat or objects that are manufactured with a precision that is lower than the precision needed for a processing step.

Further, the devices according to the present invention may be used in local navigation systems to allow autonomously or partially autonomously moving vehicles or multicopters or the like through an indoor or outdoor space. A non-limiting example may comprise vehicles moving through an automated storage for picking up objects and placing them at a different location. Indoor navigation may further be used in shopping malls, retail stores, museums, airports, or train stations, to track the location of mobile goods, mobile devices, baggage, customers or employees, or to supply users with a location specific information, such as the current position on a map, or information on goods sold, or the like.

Further, the devices according to the present invention may be used to ensure safe driving of motorcycles, such as driving assistance for motorcycles by monitoring speed, inclination, upcoming obstacles, unevenness of the road, or curves or the like. Further, the devices according to the present invention may be used in trains or trams to avoid collisions.

Further, the devices according to the present invention may be used in handheld devices, such as for scanning packaging or parcels to optimize a logistics process. Further, the devices according to the present invention may be used in further handheld devices such as personal shopping devices, RFID-readers, handheld devices for use in hospitals or health environments such as for medical use or to obtain, exchange or record patient or patient health related information, smart badges for retail or health environments, or the like.

As outlined above, the devices according to the present invention may further be used in manufacturing, quality control or identification applications, such as in product identification or size identification (such as for finding an optimal place or package, for reducing waste etc.). Further, the devices according to the present invention may be used in logistics applications. Thus, the devices according to the present invention may be used for optimized loading or packing containers or vehicles. Further, the devices according to the present invention may be used for monitoring or controlling of surface damages in the field of manufacturing, for monitoring or controlling rental objects such as rental vehicles, and/or for insurance applications, such as for assessment of damages. Further, the devices according to the present invention may be used for identifying a size of material, object or tools, such as for optimal material handling, especially in combination with robots. Further, the devices according to the present invention may be used for process control in production, e.g. for observing filling level of tanks. Further, the devices according to the present invention may be used for maintenance of production assets like, but not limited to, tanks, pipes, reactors, tools etc. Further, the devices according to the present invention may be used for analyzing 3D-quality marks. Further, the devices according to the present invention may be used in manufacturing tailor-made goods such as tooth inlays, dental braces, prosthesis, clothes or the like. The devices according to the present invention may also be combined with one or more 3D-printers for rapid prototyping, 3D-copying or the like. Further, the devices according to the present invention may be used for detecting the shape of one or more articles, such as for anti-product piracy and for anti-counterfeiting purposes.

Further, the devices according to the present invention may be used in the context of gesture recognition. In this context, gesture recognition in combination with devices according to the present invention may, in particular, be used as a human-machine interface for transmitting information via motion of a body, of body parts or of objects to a machine. Herein, the information may, preferably, be transmitted via a motion of hands or hand parts, such as fingers, in particular, by pointing at objects, applying sign language, such as for deaf people, making signs for numbers, approval, disapproval, or the like, by waving the hand, such as when asking someone to approach, to leave, or to greet a person, to press an object, to take an object, or, in the field of sports or music, in a hand or finger exercise, such as a warm-up exercise. Further, the information may be transmitted by motion of arms or legs, such as rotating, kicking, grabbing, twisting, rotating, scrolling, browsing, pushing, bending, punching, shaking, arms, legs, both arms, or both legs, or a combination of arms and legs, such as for a purpose of sports or music, such as for entertainment, exercise, or training function of a machine. Further, the information may be transmitted by motion of the whole body or major parts thereof, such as jumping, rotating, or making complex signs, such as sign language used at airports or by traffic police in order to transmit information, such as "turn right", "turn left", "proceed", "slow down", "stop", or "stop engines", or by pretending to swim, to dive, to run, to shoot, or the like, or by making complex motions or body positions such as in yoga, pilates, judo, karate, dancing, or ballet. Further, the information may be transmitted by using a real or mock-up device for controlling a virtual device corresponding to the mock-up device, such as using a mock-up guitar for controlling a virtual guitar function in a computer program, using a real guitar for controlling a virtual guitar function in a computer program, using a real or a mock-up book for reading an e-book or moving pages or browsing through in a virtual document, using a real or mock-up pen for drawing in a computer program, or the like. Further, the transmission of the information may be coupled to a feedback to the user, such as a sound, a vibration, or a motion.

In the context of music and/or instruments, devices according to the present invention in combination with gesture recognition may be used for exercising purposes, control of instruments, recording of instruments, playing or recording of music via use of a mock-up instrument or by only pretending to have a instrument present such as playing air guitar, such as to avoid noise or make recordings, or, for conducting of a virtual orchestra, ensemble, band, big band, choir, or the like, for practicing, exercising, recording or entertainment purposes or the like.

Further, in the context of safety and surveillance, devices according to the present invention in combination with gesture recognition may be used to recognize motion profiles of persons, such as recognizing a person by the way of walking or moving the body, or to use hand signs or movements or signs or movements of body parts or the whole body as access or identification control such as a personal identification sign or a personal identification movement.

Further, in the context of smart home applications or internet of things, devices according to the present invention in combination with gesture recognition may be used for central or non-central control of household devices which may be part of an interconnecting network of home appliances and/or household devices, such as refrigerators, central heating, air condition, microwave ovens, ice cube makers, or water boilers, or entertainment devices, such as television sets, smart phones, game consoles, video recorders, DVD players, personal computers, laptops, tablets, or combinations thereof, or a combination of household devices and entertainment devices.

Further, in the context of virtual reality or of augmented reality, devices according to the present invention in combination with gesture recognition may be used to control movements or function of the virtual reality application or of the augmented reality application, such as playing or controlling a game using signs, gestures, body movements or body part movements or the like, moving through a virtual world, manipulating virtual objects, practicing, exercising or playing sports, arts, crafts, music or games using virtual objects such as a ball, chess figures, go stones, instruments, tools, brushes.

Further, in the context of medicine, devices according to the present invention in combination with gesture recognition may be used to support rehabilitation training, remote diagnostics, or to monitor or survey surgery or treatment, to overlay and display medical images with positions of medical devices, or to overlay display prerecorded medical images such as from magnetic resonance tomography or x-ray or the like with images from endoscopes or ultra sound or the like that are recorded during an surgery or treatment.

Further, in the context of manufacturing and process automation, devices according to the present invention in combination with gesture recognition may be used to control, teach, or program robots, drones, unmanned autonomous vehicles, service robots, movable objects, or the like, such as for programming, controlling, manufacturing, manipulating, repairing, or teaching purposes, or for remote manipulating of objects or areas, such as for safety reasons, or for maintenance purposes.

Further, in the context of business intelligence metrics, devices according to the present invention in combination with gesture recognition may be used for people counting, surveying customer movements, areas where customers spend time, objects, customers test, take, probe, or the like.

Further, devices according to the present invention may be used in the context of do-it-yourself or professional tools, especially electric or motor driven tools or power tools, such as drilling machines, saws, chisels, hammers, wrenches, staple guns, disc cutters, metals shears and nibblers, angle grinders, die grinders, drills, hammer drills, heat guns, wrenches, sanders, engraivers, nailers, jig saws, buiscuit joiners, wood routers, planers, polishers, tile cutters, washers, rollers, wall chasers, lathes, impact drivers, jointers, paint rollers, spray guns, morticers, or welders, in particular, to support precision in manufacturing, keeping a minimum or maximum distance, or for safety measures.

Further, the devices according to the present invention may be used to aid visually impaired persons. Further, devices according to the present invention may be used in touch screen such as to avoid direct context such as for hygienic reasons, which may be used in retail environments, in medical applications, in production environments, or the like. Further, devices according to the present invention may be used in agricultural production environments such as in stable cleaning robots, egg collecting machines, milking machines, harvesting machines, farm machinery, harvesters, forwarders, combine harvesters, tractors, cultivators, ploughs, destoners, harrows, strip tills, broadcast seeders, planters such as potato planters, manure spreaders, sprayers, sprinkler systems, swathers, balers, loaders, forklifts, mowers, or the like.

Further, devices according to the present invention may be used for selection and/or adaption of clothing, shoes, glasses, hats, prosthesis, dental braces, for persons or animals with limited communication skills or possibilities, such as children or impaired persons, or the like. Further, devices according to the present invention may be used in the context of warehouses, logistics, distribution, shipping, loading, unloading, smart manufacturing, industry 4.0, or the like. Further, in a manufacturing context, devices according to the present invention may be used in the context of processing, dispensing, bending, material handling, or the like.

The devices according to the present invention may be combined with one or more other types of measurement devices. Thus, the devices according to the present invention may be combined with one or more other types of sensors or detectors, such as a time of flight (TOF) detector, a stereo camera, a lightfield camera, a lidar, a radar, a sonar, an ultrasonic detector, or interferometry. When combining devices according to the present invention with one or more other types of sensors or detectors, the devices according to the present invention and the at least one further sensor or detector may be designed as independent devices, with the devices according to the present invention being separate from the at least one further sensor or detector. Alternatively, the devices according to the present invention and the at least one further sensor or detector may fully or partially be integrated or designed as a single device.

Thus, as a non-limiting example, the devices according to the present invention may further comprise a stereo camera. As used herein, a stereo camera is a camera which is designed for capturing images of a scene or an object from at least two different perspectives. Thus, the devices according to the present invention may be combined with at least one stereo camera.

The stereo camera's functionality is generally known in the art, since stereo cameras generally are known to the skilled person. The combination with the devices according to the present invention may provide additional distance information. Thus, the devices according to the present invention may be adapted, in addition to the stereo camera's information, to provide at least one item of information on a longitudinal position of at least one object within a scene captured by the stereo camera. Information provided by the stereo camera, such as distance information obtained by evaluating triangulation measurements performed by using the stereo camera, may be calibrated and/or validated by using the devices according to the present invention. Thus, as an example, the stereo camera may be used to provide at least one first item of information on the longitudinal position of the at least one object, such as by using triangulation measurements, and the devices according to the present invention may be used to provide at least one second item of information on the longitudinal position of the at least one object. The first item of information and the second item of information may be used to improve accuracy of the measurements. Thus, the first item of information may be used for calibrating the second item of information or vice a versa. Consequently, the devices according to the present invention, as an example, may form a stereo camera system, having the stereo camera and the devices according to the present invention, wherein the stereo camera system is adapted to calibrate the information provided by the stereo camera by using the information provided by devices according to the present invention.

Consequently, additionally or alternatively, the devices according to the present invention may be adapted to use the second item of information, provided by the devices according to the present invention, for correcting the first item of information, provided by the stereo camera. Additionally or alternatively, the devices according to the present invention may be adapted to use the second item of information, provided by the devices according to the present invention, for correcting optical distortion of the stereo camera. Further, the devices according to the present invention may adapted to calculate stereo information provided by the stereo camera, and the second item of information provided by devices according to the present invention may be used for speeding up the calculation of the stereo information.

As an example, the devices according to the present invention may be adapted to use at least one virtual or real object within a scene captured by the devices according to the present invention for calibrating the stereo camera. As an example, one or more objects and/or areas and/or spots may be used for calibration. As an example, the distance of at least one object or spot may be determined by using the devices according to the present invention, and distance information provided by the stereo camera may be calibrated by using this distance is determined by using the devices according to the present invention. For instance, at least one active light spot of the devices according to the present invention may be used as a calibration point for the stereo camera. The active light spot, as an example, may move freely in the picture.

The devices according to the present invention may be adapted to continuously or discontinuously calibrate the stereo camera by using information provided by the active distance sensor. Thus, as an example, the calibration may take place at regular intervals, continuously or occasionally.

Further, typical stereo cameras exhibit measurement errors or uncertainties which are dependent on the distance of the object. This measurement error may be reduced when combined with information provided by the devices according to the present invention.

Combinations of stereo cameras with other types of distance sensors are generally known in the art. Thus, in D. Scaramuzza et al., IEEE/RSJ International Conference on Intelligent Robots and Systems, 2007, IROS 2007, pages 4164-4169, an extrinsic self calibration of a camera and a 3D laser range finder from natural scenes is disclosed. Similarly, in D. Klimentjew et al., 2010 IEEE Conference on Multisensor Fusion and Integration for Intelligent Systems (MFI), pages 236-241, a multi sensor fusion of camera and 3D laser range finder for object recognition is disclosed. As the skilled person will recognize, the laser range finder in these setups known in the art may simply be replaced or complemented by at least one device according to the present invention, without altering the methods and advantages disclosed by these prior art documents. For potential setups of the stereo camera, reference may be made to these prior art documents. Still, other setups and embodiments of the at least one optional stereo camera are feasible.

Preferably, for further potential details of the optical detector, the method, the human-machine interface, the entertainment device, the tracking system, the camera and the various uses of the detector, in particular with regard to the transfer device, the transversal optical sensors, the evaluation device and, if applicable, to the longitudinal optical sensor, the modulation device, the illumination source and the imaging device, specifically with respect to the potential materials, setups and further details, reference may be made to one or more of WO 2012/110924 A1, US 2012/206336 A1, WO 2014/097181 A1, US 2014/291480 A1, and PCT patent application No. PCT/EP2016/051817, filed Jan. 28, 2016, the full content of all of which is herewith included by reference.

Further, the devices according to the present invention may be used for infra-red detection applications, heat-detection applications, thermometer applications, heat-seeking applications, flame-detection applications, fire-detection applications, smoke-detection applications, temperature sensing applications, spectroscopy applications, or the like. Further, devices according to the present invention may be used in photocopy or xerography applications. Further, devices according to the present invention may be used to monitor exhaust gas, to monitor combustion processes, to monitor pollution, to monitor industrial processes, to monitor chemical processes, to monitor food processing processes, to assess water quality, to assess air quality, or the like. Further, devices according to the present invention may be used for quality control, temperature control, motion control, exhaust control, gas sensing, gas analytics, motion sensing, chemical sensing, or the like.

The above-described detector, the method, the human-machine interface and the entertainment device and also the proposed uses have considerable advantages over the prior art. Thus, generally, a simple and, still, efficient detector for an accurate determining a position of at least one object in space may be provided. Therein, as an example, three-dimensional coordinates of an object or a part thereof may be determined in a fast and efficient way. As compared to devices known in the art, the detector as proposed here provides a high degree of simplicity, specifically with regard to an optical setup of the detector. Herein, a combination of a single aspheric lens provided as the transfer device and a biconcave lens carrying the film of a photoconductive material as the optical sensor may, particularly, be advantageous since the single aspheric lens is already adapted to provide a good image, thus, allowing a simple, cost-efficient and, concurrently, reliable detector. Similarly, a two-sided curved optical element which may be adapted to carry two individual films of the photoconductive material may, preferably, be employed for arranging two individual optical sensors, such as two individual longitudinal optical sensors or, alternatively, one longitudinal optical sensor and one transversal optical sensor, within a comparatively small volume, by which the integration density of the optical sensors may be enhanced, thereby using a simple setup may. Further, the curved optical sensors may also be useful for providing a spectrometer setup which may have an unprecedented simplicity in optical grating fabrication. In addition, the one or more films of the photoconductive material may easily be deposited on the respective curved surfaces of the optical element in the sensor region of the optical sensor since known simple deposition methods, in particular a bath deposition method, may be applied. This high degree of simplicity, in combination with the possibility of high precision measurements, is specifically suited for machine control, such as in human-machine interfaces and, more preferably, in gaming, tracking, scanning, and a stereoscopic vision. Thus, cost-efficient entertainment devices may be provided which may be used for a large number of gaming, entertaining, tracking, scanning, and stereoscopic vision purposes.

Summarizing, in the context of the present invention, the following embodiments are regarded as particularly preferred:

Embodiment 1

A detector for an optical detection of at least one object, comprising:
- at least one optical sensor, the optical sensor having at least one sensor region, the sensor region comprising at least one curved substrate and at least one film having a photoconductive material, wherein the film is placed on at least one surface of the curved substrate, wherein the optical sensor is designed to generate at least one sensor signal in a manner dependent on an illumination of the sensor region by a light beam;
- at least one transfer device, the transfer device being adapted to transfer the light beam from the object to the optical sensor, thereby being adapted to guide the light beam to the film located on the curved substrate; and
- at least one evaluation device, wherein the evaluation device is designed to generate at least one item of information on a position of the object by evaluating the sensor signal of the optical sensor.

Embodiment 2

The detector according to the preceding embodiment, wherein the surface of the curved substrate is one of a spheric surface, wherein the spheric surface constitutes a spheric section, or an aspheric surface.

Embodiment 3

The detector according to the preceding embodiment, wherein the curved substrate is arranged as one of a section of a Petzval surface or an approximate Petzval surface.

Embodiment 4

The detector according to any one of the preceding embodiments, wherein the curved substrate constitutes or comprises an optical element, wherein the optical element is at least partially optically transparent with respect to at least a partition of a wavelength range of the light beam.

Embodiment 5

The detector according to the preceding embodiment, wherein the optical element comprises an at least partially optically transparent material selected from a group consisting of glass, quartz, silicon, germanium, ZnSe, ZnS, $CaF_2$, MgF, NaCl, KBr, sapphire, fused silica, a transparent conducting oxide (TOO), and a transparent organic polymer.

Embodiment 6

The detector according to any one of the two preceding embodiments, wherein the optical element is selected from a group consisting of an optical lens, a curved mirror, a grating and a diffractive optical element.

Embodiment 7

The detector according to the preceding embodiment, wherein the optical lens is selected from a group consisting of a biconvex lens, a plano-convex lens, a biconcave lens, a plano-concave lens, an aspherical lens, a cylindrical lens and a meniscus lens.

Embodiment 8

The detector according to any one of the preceding embodiments, wherein the transfer device constitutes or comprises a converging optical element, wherein the converging element is at least partially optically transparent with respect to at least a partition of a wavelength range of the light beam.

Embodiment 9

The detector according to the preceding embodiment, wherein the converging optical element comprises an at least partially optically transparent material selected from a group consisting of glass, quartz, silicon, germanium, ZnSe, ZnS, CaF$_2$, MgF, NaCl, KBr, sapphire, fused silica, quartz, a transparent conducting oxide (TOO), and a transparent organic polymer.

Embodiment 10

The detector according to any one of the two preceding embodiments, wherein the converging optical element is selected from a group consisting of a converging optical lens, converging diffractive optical element and a converging curved mirror.

Embodiment 11

The detector according to any one of the preceding embodiments, wherein the transfer device has at least one focal point, wherein the curved substrate and the transfer device are placed with respect to each other in a manner that at least one of the at least one focal point is located in the film placed on the curved substrate.

Embodiment 12

The detector according to the preceding embodiment, wherein the optical element comprises at least two individually curved surfaces.

Embodiment 13

The detector according to the preceding embodiment, wherein the at least two individually curved surfaces are placed with respect to each other in a manner that the focal point is located in the film placed on at least one of the curved substrates.

Embodiment 14

The detector according to any one of the two preceding embodiments, wherein an individual film is placed on each of the at least two individually curved substrates.

Embodiment 15

The detector according to the preceding embodiment, wherein the transfer device has at least two focal points, wherein the focal points are located at different positions with respect to each other, wherein the at least two individually curved surfaces are placed with respect to each other in a manner that each of the at least two focal points are placed in at least one of the individual films.

Embodiment 16

The detector according to any one of the preceding embodiments, wherein the transfer device comprises a diffractive optical element, wherein the diffractive element is at least partially optically transparent with respect to at least a partition of a wavelength range of the light beam, wherein the diffractive optical element is adapted to split the light beam into at least two split beams.

Embodiment 17

The detector according to the preceding embodiment, wherein the diffractive optical element comprises an at least partially optically transparent material selected from a group consisting of glass, quartz, silicon, germanium, ZnSe, ZnS, CaF$_2$, MgF, NaCl, KBr, sapphire, fused silica, a transparent conducting oxide (TOO), and a transparent organic polymer.

Embodiment 18

The detector according to any one of the two preceding embodiments, wherein the diffractive optical element is selected from a group consisting of a diffractive optical lens, a prism, a diffractive curved mirror, a beam-splitter, an engineered Diffuser™, and an optical grating.

Embodiment 19

The detector according to any one of the three preceding embodiments, wherein the optical sensor and the transfer device are placed with respect to each other in a manner that the at least two of the two split beams are guided to the film.

Embodiment 20

The detector according to the preceding embodiment, wherein at least two of the at least two split beams are guided to at least one of:
the same film;
portions of the film comprised on the same optical sensor; or
at least two films placed on at least two different curved surfaces.

Embodiment 21

The detector according to the preceding embodiment, wherein the at least two different curved surfaces are located on a Rowland circle, wherein the optical grating has, preferably, an equally spaced ruling.

Embodiment 22

The detector according to any one of the preceding embodiments, wherein each of the at least one optical sensors is arranged in a manner that the light beam impinges only a single optical sensor.

Embodiment 23

The detector according to any one of the preceding embodiments, wherein the photoconductive material comprises an inorganic photoconductive material, an organic photoconductive material, or a combination thereof.

Embodiment 24

The detector according to the preceding embodiment, wherein the inorganic photoconductive material comprises one or more of selenium, tellurium, a selenium-tellurium alloy, a metal oxide, a group IV element or compound, a III-V compound, a II-VI compound, a chalcogenide, a pnictogenide, a halide, and solid solutions and/or doped variants thereof.

Embodiment 25

The detector according to the preceding embodiment, wherein the chalcogenide is selected from a group comprising sulfide chalcogenides, selenide chalcogenides, telluride chalcogenides, ternary chalcogenides, quaternary and higher chalcogenides.

Embodiment 26

The detector according to the preceding embodiment, wherein the sulfide chalcogenide is selected from a group comprising lead sulfide (PbS), cadmium sulfide (CdS), zinc sulfide (ZnS), mercury sulfide (HgS), silver sulfide (Ag2S), manganese sulfide (MnS), bismuth trisulfide (Bi2S3), antimony trisulfide (Sb2S3), arsenic trisulfide (As2S3), tin (II) sulfide (SnS), tin (IV) disulfide (SnS2), indium sulfide (In2S3), copper sulfide (CuS), cobalt sulfide (CoS), nickel sulfide (NiS), molybdenum disulfide (MoS2), iron disulfide (FeS2), chromium trisulfide (CrS3), copper indium sulfide (CIS), copper indium gallium selenide (CIGS), copper zinc tin sulfide (CZTS), and solid solutions and/or doped variants thereof.

Embodiment 27

The detector according to any one of the two preceding embodiments, wherein the selenide chalcogenide is selected from a group comprising lead selenide (PbSe), cadmium selenide (CdSe), zinc selenide (ZnSe), bismuth triselenide (Bi2Se3), mercury selenide (HgSe), antimony triselenide (Sb2Se3), arsenic triselenide (As2Se3), nickel selenide (NiSe), thallium selenide (TlSe), copper selenide (CuSe), molybdenum diselenide (MoSe2), tin selenide (SnSe), cobalt selenide (CoSe), indium selenide (In2Se3), copper zinc tin selenide (CZTSe), and solid solutions and/or doped variants thereof.

Embodiment 28

The detector according to any one of the three preceding embodiments, wherein the telluride chalcogenide is selected from a group comprising lead telluride (PbTe), cadmium telluride (CdTe), zinc telluride (ZnTe), mercury telluride (HgTe), bismuth tritelluride (Bi2Te3), arsenic tritelluride (As2Te3), antimony tritelluride (Sb2Te3), nickel telluride (NiTe), thallium telluride (TlTe), copper telluride (CuTe), molybdenum ditelluride (MoTe2), tin telluride (SnTe), and cobalt telluride (CoTe), silver telluride (Ag2Te), indium telluride (In2Te3), and solid solutions and/or doped variants thereof.

Embodiment 29

The detector according to any one of the four preceding embodiments, wherein the ternary chalcogenide is selected from a group comprising mercury cadmium telluride (HgCdTe), mercury zinc telluride (HgZnTe), mercury cadmium sulfide (HgCdS), lead cadmium sulfide (PbCdS), lead mercury sulfide (PbHgS), copper indium disulfide (CuInS2), cadmium sulfoselenide (CdSSe), zinc sulfoselenide (ZnSSe), thallous sulfoselenide (TlSSe), cadmium zinc sulfide (CdZnS), cadmium chromium sulfide (CdCr2S4), mercury chromium sulfide (HgCr2S4), copper chromium sulfide (CuCr2S4), cadmium lead selenide (CdPbSe), copper indium diselenide (CuInSe2), indium gallium arsenide (InGaAs), lead oxide sulfide (Pb2OS), lead oxide selenide (Pb2OSe), lead sulfoselenide (PbSSe), arsenic selenide telluride (As2Se2Te), indium gallium phosphide (InGaP), gallium arsenide phosphide (GaAsP), aluminum gallium phosphide (AlGaP), cadmium selenite (CdSeO3), cadmium zinc telluride (CdZnTe), cadmium zinc selenide (CdZnSe), a copper-zinc-tin sulfur-selenium chalcogenide (CZTSSe), and solid solutions and/or doped variants thereof.

Embodiment 30

The detector according to any one of the seven preceding embodiments, wherein the II-VI compound is selected from a group comprising cadmium sulfide (CdS), cadmium selenide (CdSe), cadmium telluride (CdTe), zinc sulfide (ZnS), zinc selenide (ZnSe), zinc telluride (ZnTe), mercury sulfide (HgS), mercury selenide (HgSe), mercury telluride (HgTe), cadmium zinc telluride (CdZnTe), mercury cadmium telluride (HgCdTe), mercury zinc telluride (HgZnTe), and mercury zinc selenide (CdZnSe), and solid solutions and/or doped variants thereof.

Embodiment 31

The detector according to any one of the eight preceding embodiments, wherein the III-V compound is selected from a group comprising indium antimonide (InSb), boron nitride (BN), boron phosphide (BP), boron arsenide (BAs), aluminum nitride (AlN), aluminum phosphide (AlP), aluminum arsenide (AlAs), aluminum antimonide (AlSb), indium nitride (InN), indium phosphide (InP), indium arsenide (InAs), indium antimonide (InSb), gallium nitride (GaN), gallium phosphide (GaP), gallium arsenide (GaAs), and gallium antimonide (GaSb), and solid solutions and/or doped variants thereof.

Embodiment 32

The detector according to any one of the nine preceding embodiments, wherein the metal oxide is selected from a group comprising copper (II) oxide (CuO), copper (I) oxide (CuO2), nickel oxide (NiO), zinc oxide (ZnO), silver oxide (Ag2O), manganese oxide (MnO), titanium dioxide (TiO2), barium oxide (BaO), lead oxide (PbO), cerium oxide (CeO2), bismuth oxide (Bi2O3), cadmium oxide (CdO), and solid solutions and/or doped variants thereof.

Embodiment 33

The detector according to any one of the thirty-two preceding embodiments, wherein the group IV element or compound is selected from a group comprising doped diamond (C), doped silicon (Si), silicon carbide (SiC), and silicon germanium (SiGe), and solid solutions and/or doped variants thereof.

Embodiment 34

The detector according to any one of the ten preceding embodiments, wherein the photoconductive material is provided as a colloidal film comprising quantum dots.

Embodiment 35

The detector according to the preceding embodiment, wherein the photoconductive material is selected from the group comprising lead sulfide (PbS), lead selenide (PbSe), lead telluride (PbTe), cadmium telluride (CdTe), indium phosphide (InP), cadmium sulfide (CdS), cadmium selenide (CdSe), indium antimonide (InSb), mercury cadmium telluride (HgCdTe), copper indium sulfide (CIS), copper indium gallium selenide (CIGS), and copper zinc tin sulfide (CZTS).

Embodiment 36

The detector according to any one of the preceding embodiments, wherein at least one of the at least one optical sensor is a longitudinal optical sensor, the longitudinal optical sensor being designed to generate at least one longitudinal sensor signal, the longitudinal sensor signal, given the same total power of the illumination, being dependent on a beam cross-section of the light beam in the sensor region, wherein the evaluation device is designed to generate at least one item of information on a longitudinal position of the object by evaluating the longitudinal sensor signal of the longitudinal optical sensor.

Embodiment 37

The detector according to the preceding embodiment, wherein the evaluation device is designed to generate the at least one item of information on the longitudinal position of the object from at least one predefined relationship between the geometry of the illumination and a relative positioning of the object with respect to the detector, preferably taking account of a known power of the illumination.

Embodiment 38

The detector according to any one of the two preceding embodiments, wherein the longitudinal optical detector is adapted to generate the longitudinal sensor signal by performing at least one current-voltage measurement and/or at least one voltage-current-measurement.

Embodiment 39

The detector according to any one of the preceding embodiments, wherein the at least one optical sensor is a transversal optical sensor, the transversal optical sensor being adapted to determine a transversal position of the light beam traveling from the object to the detector, the transversal position being a position in at least one dimension perpendicular an optical axis of the detector, the transversal optical sensor being adapted to generate at least one transversal sensor signal, wherein the evaluation device is further designed to generate at least one item of information on a transversal position of the object by evaluating the transversal sensor signal.

Embodiment 40

The detector according to the preceding embodiment, wherein the at least one transversal optical sensor comprises at least one pair of electrodes, wherein the electrodes contact the film of the photoconductive material, wherein the electrodes are split electrodes each comprising at least two partial electrodes, wherein electrical currents through the partial electrodes are dependent on a position of the light beam in the sensor region, wherein the transversal sensor signal is generated in accordance with the electrical currents through the partial electrodes.

Embodiment 41

The detector according to the preceding embodiment, wherein the film exhibits a thickness from 1 nm to 100 μm, preferably from 10 nm to 10 μm, more preferred from 100 nm to 3 μm.

Embodiment 42

The detector according to any one of the preceding embodiments, furthermore comprising at least one illumination source.

Embodiment 43

The detector according to the preceding embodiment, wherein the illumination source is selected from: an illumination source, which is at least partly connected to the object and/or is at least partly identical to the object; an illumination source which is designed to at least partly illuminate the object with a primary radiation.

Embodiment 44

The detector according to the preceding embodiment, wherein the light beam is generated by a reflection of the primary radiation on the object and/or by light emission by the object itself, stimulated by the primary radiation.

Embodiment 45

The detector according to the preceding embodiment, wherein the spectral sensitivities of the optical sensor is covered by the spectral range of the illumination source.

Embodiment 46

The detector according to any of the preceding embodiments, wherein the detector furthermore has at least one modulation device for modulating the illumination.

Embodiment 47

The detector according to any the preceding embodiment, wherein the light beam is a modulated light beam.

Embodiment 48

The detector according to the preceding embodiment, wherein the detector is designed to detect at least two sensor signals in the case of different modulations, in particular at least two sensor signals at respectively different modulation frequencies, wherein the evaluation device is designed to generate the at least one item of information on the position of the object by evaluating the at least two sensor signals at respectively different modulation frequencies.

Embodiment 49

The detector according to any of the preceding embodiments, wherein the optical sensor is furthermore designed in such a way that the sensor signal, given the same total power of the illumination, is dependent on a modulation frequency of a modulation of the illumination.

Embodiment 50

The detector according to any one of the preceding embodiments, wherein the detector further comprises at least one imaging device.

Embodiment 51

The detector according to any of the two preceding embodiments, wherein the imaging device comprises at least one camera, wherein the camera is, preferably, selected from an inorganic camera; a monochrome camera; a multichrome camera; a full-color camera; a pixelated inorganic chip; a pixelated organic camera; a CCD chip, preferably a multicolor CCD chip or a full-color CCD chip; a CMOS chip; an IR camera; an RGB camera.

Embodiment 52

An arrangement comprising at least two detectors according to any of the preceding embodiments, wherein the arrangement, preferably, further comprises at least one illumination source.

Embodiment 53

A human-machine interface for exchanging at least one item of information between a user and a machine, in particular for inputting control commands, wherein the human-machine interface comprises at least one detector according to any of the preceding embodiments relating to a detector, wherein the human-machine interface is designed to generate at least one item of geometrical information of the user by means of the detector wherein the human-machine interface is designed to assign to the geometrical information at least one item of information, in particular at least one control command.

Embodiment 54

The human-machine interface according to the preceding embodiment, wherein the at least one item of geometrical information of the user is selected from the group consisting of: a position of a body of the user; a position of at least one body part of the user; an orientation of a body of the user; an orientation of at least one body part of the user.

Embodiment 55

The human-machine interface according to any of the two preceding embodiments, wherein the human-machine interface further comprises at least one beacon device connectable to the user, wherein the human-machine interface is adapted such that the detector may generate an information on the position of the at least one beacon device.

Embodiment 56

The human-machine interface according to the preceding embodiment, wherein the beacon device comprises at least one illumination source adapted to generate at least one light beam to be transmitted to the detector.

Embodiment 57

An entertainment device for carrying out at least one entertainment function, in particular a game, wherein the entertainment device comprises at least one human-machine interface according to any of the preceding embodiments referring to a human-machine interface, wherein the entertainment device is designed to enable at least one item of information to be input by a player by means of the human-machine interface, wherein the entertainment device is designed to vary the entertainment function in accordance with the information.

Embodiment 58

A tracking system for tracking the position of at least one movable object, the tracking system comprising at least one detector according to any of the preceding embodiments referring to a detector, the tracking system further comprising at least one track controller, wherein the track controller is adapted to track a series of positions of the object, each comprising at least one item of information on a position of the object at a specific point in time.

Embodiment 59

The tracking system according to the preceding embodiment, wherein the tracking system further comprises at least one beacon device connectable to the object, wherein the tracking system is adapted such that the detector may generate an information on the position of the object of the at least one beacon device.

Embodiment 60

A scanning system for determining at least one position of at least one object, the scanning system comprising at least one detector according to any of the preceding embodiments relating to a detector, the scanning system further comprising at least one illumination source adapted to emit at least one light beam configured for an illumination of at least one dot located at at least one surface of the at least one object, wherein the scanning system is designed to generate at least one item of information about the distance between the at least one dot and the scanning system by using the at least one detector.

Embodiment 61

The scanning system according to the preceding embodiment, wherein the illumination source comprises at least one artificial illumination source, in particular at least one laser source and/or at least one incandescent lamp and/or at least one semiconductor light source, wherein the illumination source emits a plurality of individual light beams, in particular an array of light beams exhibiting a respective pitch, in particular a regular pitch.

Embodiment 62

The scanning system according to any one of the two preceding embodiments, wherein the scanning system comprises at least one housing, wherein the at least one item of information about the distance between the at least one dot and the scanning system distance is determined between the at least one dot and a specific point on the housing of the scanning system, in particular a front edge or a back edge of the housing, wherein the housing, preferably, comprises at least one of a display, a button, a fastening unit, a leveling unit.

Embodiment 63

A stereoscopic system comprising at least one tracking system according to any one of the embodiments which refer to the tracking system and at least one scanning system according to any one of the embodiments which refer to the scanning system, wherein the tracking system and the scanning system each comprise at least one optical sensor which are placed in a collimated arrangement in such a manner that they are aligned in an orientation parallel to the optical axis of the stereoscopic system and, concurrently, exhibit an individual displacement with respect to the orientation perpendicular to the optical axis of the stereoscopic system.

Embodiment 64

The stereoscopic system according to the preceding embodiment, wherein the tracking system and the scanning system each comprise at least one longitudinal optical sensor, wherein the sensor signals of the longitudinal optical sensors are combined for determining the item of information on the longitudinal position of the object.

Embodiment 65

The stereoscopic system according to the preceding embodiment, wherein the sensor signals of the longitudinal optical sensors are distinguishable with respect to each other by applying a different modulation frequency.

Embodiment 66

A camera for imaging at least one object, the camera comprising at least one detector according to any one of the preceding embodiments referring to a detector.

Embodiment 67

A method for an optical detection of at least one object, in particular by using a detector according to any one of the preceding embodiments relating to a detector, comprising the following steps:
generating at least one longitudinal sensor signal by using at least one longitudinal optical sensor, the optical sensor having at least one sensor region, the sensor region comprising at least one curved substrate and at least one film of a photoconductive material, wherein the film is placed on at least one surface of the curved substrate, wherein the optical sensor is designed to generate at least one sensor signal in a manner dependent on an illumination of the sensor region by a light beam, wherein at least one transfer device is adapted to transfer the light beam from the object to the optical sensor, thereby being adapted to guide the light beam to the film located on the curved substrate; and
generating at least one item of information on a position of the object by evaluating the sensor signal of the optical sensor.

Embodiment 68

A method according to the preceding embodiment, wherein the photoconductive material is deposited on the curved substrate.

Embodiment 69

A method according to the preceding embodiment, wherein the photoconductive material is deposited on the curved substrate by using a bath deposition method.

Embodiment 70

A method according to any one of the three preceding embodiments, wherein the photoconductive material is selected from a material of any one of the Embodiments 23 to 35.

Embodiment 71

A method according to the preceding embodiment, wherein the photoconductive material is selected from the group consisting of lead sulfide (PbS), lead selenide (PbSe), lead telluride (PbTe), cadmium telluride (CdTe), indium phosphide (InP), cadmium sulfide (CdS), cadmium selenide (CdSe), indium antimonide (InSb), mercury cadmium telluride (HgCdTe; MCT), copper indium sulfide (CIS), copper indium gallium selenide (CIGS), zinc sulfide (ZnS), zinc selenide (ZnSe), and copper zinc tin sulfide (CZTS).

Embodiment 72

A use of a detector according to any one of the preceding embodiments relating to a detector for a purpose of: a position measurement in traffic technology; an entertainment application; a security application; a human-machine interface application; a tracking application; a scanning application; a photography application; a cartography application; a mapping application for generating maps of at least one space; a homing or tracking beacon detector for vehicles; a mobile application; a webcam; an audio device; a Dolby surround audio system; a computer peripheral device; a gaming application; a video application; a surveillance application; an automotive application; a transport application; a logistics application; a vehicle application; an airplane application; a ship application; a spacecraft application; a robotic application; a medical application; a sports' application; a building application; a construction application; a manufacturing application; a machine vision application; a use in combination with at least one sensing technology selected from time-of-flight detector, radar, Lidar, ultrasonic sensors, or interferometry.

Embodiment 73

A use of a detector according to any one of the preceding embodiments relating to a detector for a purpose of: an infra-red detection application; a heat-detection application; a thermometer application; a heat-seeking application; a flame-detection application; a fire-detection application; a smoke-detection application; a temperature sensing application; a spectroscopy application; a photocopy application; a xerography applications; exhaust gas monitoring application; a combustion process monitoring application; a pollution monitoring application; an industrial process monitoring application; a chemical process monitoring application; a food processing process monitoring application; a water quality monitoring application; an air quality monitoring application; a quality control application; a temperature control application; a motion control application; an exhaust control application; a gas sensing application; a gas analytics application; a motion sensing application; a chemical sensing application.

BRIEF DESCRIPTION OF THE FIGURES

Further optional details and features of the invention are evident from the description of preferred exemplary embodiments which follows in conjunction with the dependent claims. In this context, the particular features may be implemented alone or with features in combination. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures:

FIGS. 2A to 2D show exemplary embodiments of preferred combinations of the optical element in the optical sensor and the transfer device.

EXEMPLARY EMBODIMENTS

Figure 1:
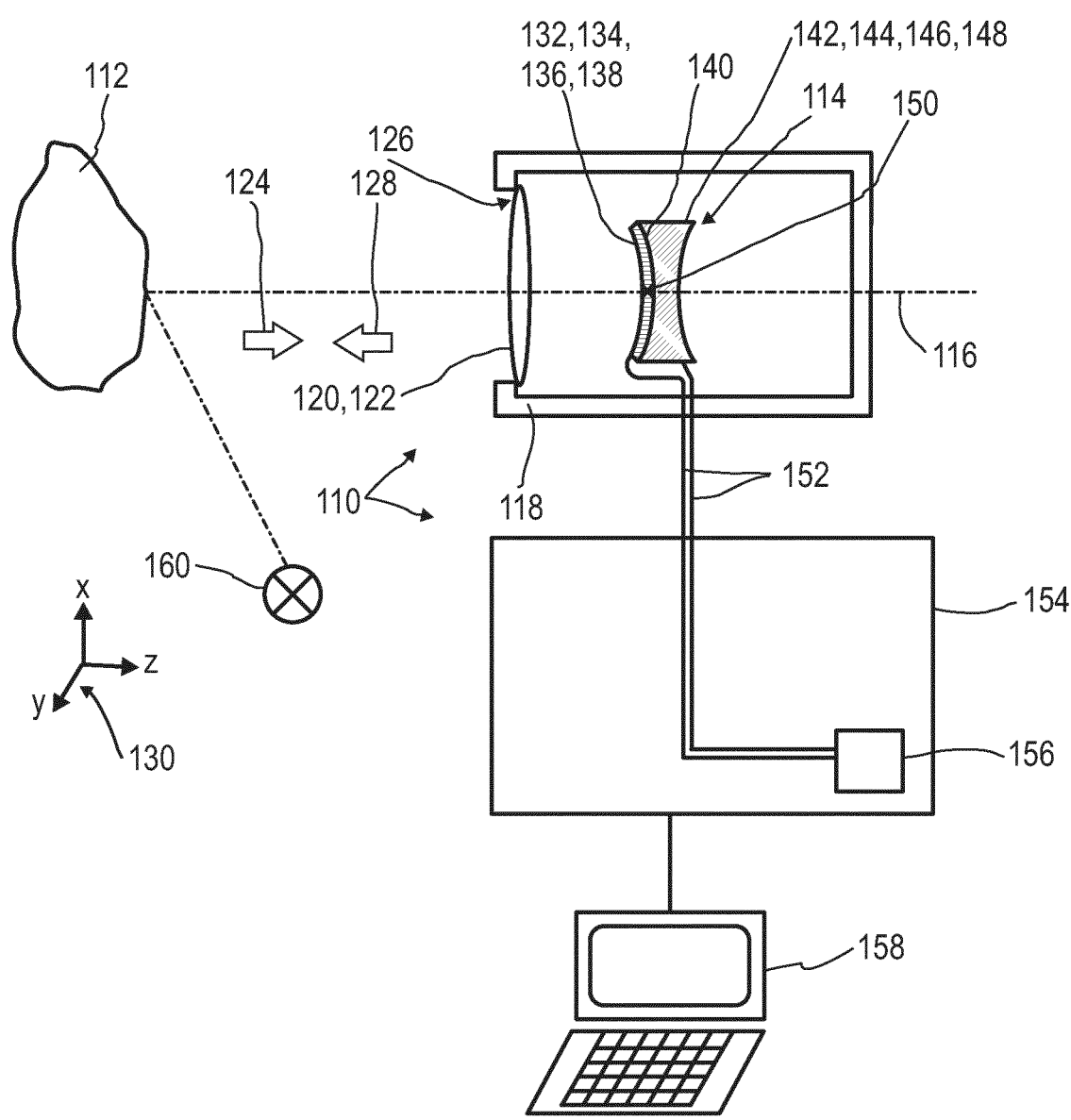
FIG. 1 shows an exemplary embodiment of a detector according to the present invention.

FIG. 1 illustrates, in a highly schematic fashion, an exemplary embodiment of an optical detector 110 according to the present invention, for determining a position of at least one object 112. The optical detector 110 comprises at least one optical sensor 114, which, in this particular embodiment, is arranged along an optical axis 116 of the detector 110. Specifically, the optical axis 116 may be an axis of symmetry and/or rotation of the setup of the optical sensors 114. The optical sensors 114 may be located inside a housing 118 of the detector 110. Further, at least one transfer device 120 is comprised, preferably a converging lens 122, which is adapted to transfer a light beam 124 from the object 112 to the optical sensor 114. An opening 126 in the housing 118, which may, particularly, be located concentrically with regard to the optical axis 116, preferably defines a direction of view 128 of the detector 110. A coordinate system 130 may be defined, in which a direction parallel or antiparallel to the optical axis 116 is defined as a longitudinal direction, whereas directions perpendicular to the optical axis 116 may be defined as transversal directions. In the coordinate system 130, symbolically depicted in FIG. 1, a longitudinal direction is denoted by z and transversal directions are denoted by x and y, respectively. However, other types of coordinate systems 130 are feasible.

Further, the optical sensor 114 is designed to generate at least one sensor signal in a manner dependent on an illumination of a sensor region 132 by the light beam 124. According to the present invention, the sensor region 132 comprises at least one film 134 of a photoconductive material 136. In a particularly preferred embodiment, the film 134 of the photoconductive material 136 may comprise at least one chalcogenide material 138, in particular selected from the group consisting of lead sulfide (PbS) lead selenide (PbSe), lead telluride (PbTe), cadmium telluride (CdTe), or indium phosphide (InP), cadmium sulfide (CdS), cadmium selenide (CdSe), indium antimonide (InSb), mercury cadmium telluride (HgCdTe; MCT), copper indium sulfide (CIS), copper indium gallium selenide (CIGS), zinc sulfide (ZnS), zinc selenide (ZnSe), and copper zinc tin sulfide (CZTS).

In accordance with the present invention, the film 134 of the photoconductive material 136 is placed on at least one surface 140 of a curved substrate 142. Herein, the photoconductive material 136, in particular, the photoconductive material 138, such as the preferred example indicated above, may, advantageously, be deposited by using a bath deposition process, which easily allows generating a thickness from 1 nm to 100 μm, preferably from 10 nm to 10 μm, more preferred from 100 nm to 1 μm, for the film 134. This thickness may allow easily generating the film 134 which has a high signal-to-noise ratio, a low absorption rate within the desired wavelength range, and, concurrently, a high mechanical stability. The achieved thickness of the film 134 may be comparative by employing a chemical vapor deposition (CVD) process, such as a plasma-enhanced chemical vapor deposition (PECVD) process. Herein, the PECVD process may, particularly, be preferred in case the photoconductive material 136 may be selected from the hydrogenated amorphous semiconducting materials as described above. Further, spin coating or ink-jet printing may also be applicable in order to provide the film 134.

As illustrated in the exemplary embodiment of FIG. 1, the curved substrate 142 may, thus, constitute or comprise an optical element 144, wherein the optical element 144 may be at least partially optically transparent with respect to at least one wavelength of the light beam 124. For this purpose, the optical element may comprise an at least partially optically transparent material, in particular selected from glass, quartz, or a transparent conducting oxide (TOO), such indium tin oxide (ITO), fluorine doped tin oxide (SnO2:F; FTO), aluminum doped zinc oxide (AZO), magnesium oxide (MgO), or a perovskite transparent conducting oxide. However, other at least partially optically transparent materials, in particular a transparent organic polymer, may also be feasible. As further illustrated in FIG. 1, the optical element 144 selected for this exemplary embodiment is an optical lens 146 in a form of biconcave lens 148. As also displayed in FIG. 1, the curved surface 140 facing the converging lens 122 of the transfer device 120 carries the film 134 of the photoconductive material 136. However, it may be indicated that the optical element 144 may be selected from other kinds of optical components, such as the preferred embodiments as illustrated in FIG. 2.

As already mentioned above, the transfer device 120 is adapted to transfer the light beam 124 from the object 112 to the optical sensor 114, thereby guiding the light beam 124 to the film 134 which is located on the surface 140 of the curved substrate 142. In a particularly preferred embodiment of the present invention, the optical sensor 114 may be located at a focal point 150 of the transfer device 120. In particular, the transfer device 120, especially the converging lens 122, having the at least one focal point 150, and the curved substrate 142 are placed with respect to each other in a fashion that at least one of the focal points 150 of the transfer device 120 is located within the film 134 as placed on the surface 140 of the curved substrate 142. As a result, the optical sensor 114 may, thus, preferably be adapted to determine at least one item of information on a position of the object 112.

Consequently, the resulting sensor signal as provided by the optical sensor 114 upon impingement of the sensor region 132 by the light beam 124 depends on properties of the photoconductive material 136 being located in the sensor region 132. Via at least one signal lead 152, the sensor signal may be transmitted to an evaluation device 154. The evaluation device 154 is, generally, designed to generate the at least one item of information on the position of the object 112 by evaluating the sensor signal as provided by the optical sensor 114. For this purpose, the evaluation device 154 may comprise one or more electronic devices and/or one or more software components, in order to evaluate the sensor signals, in particular longitudinal sensor signals, which are symbolically denoted here by a longitudinal evaluation unit 156 (denoted by "z").

Thus, the evaluation device 154 may be adapted to determine the at least one item of information on the longitudinal position of the object 112 by comparing more than one longitudinal sensor signals of the optical sensor 114 which is, in this embodiment, arranged as a longitudinal optical sensor. For this purpose, the optical detector 110 may, particularly, be adapted to generate the longitudinal sensor signal by performing at least one current-voltage measurement and/or at least one voltage-current-measurement. As known for FiP devices, the longitudinal sensor signal, given the same total power of the illumination, may be dependent on a beam cross-section of the light beam 124 in the sensor region 132. For the purpose of generating the at least one item of information on the longitudinal position of the object 112, the evaluation device 154 may, thus, be designed to employ at least one predefined relationship between the geometry of the illumination and a relative positioning of the object 112 with respect to the detector 110, hereby, preferably, taking account of a known power of the illumination. However, application of other kinds of evaluation procedures may also be feasible.

Alternatively or in addition (not depicted here), the evaluation device 154 may be adapted to determine at least one item of information on the transversal position of the object 112 by comparing more than one transversal sensor signals as provided by the optical sensor 114. For this purpose, the optical sensor 114 may, in particular, comprise at least one pair of electrodes, wherein the electrodes may contact the film 134 of the photoconductive material 136 in order to acquire the transversal sensor signals. In a particularly preferred embodiment of the transversal optical sensor, any or all of the electrodes may be split electrodes, wherein each split electrode may comprise at least two partial electrodes. Herein, electrical currents through the partial electrodes may be dependent on a position of the light beam 124 in the sensor region 132 and the transversal sensor signal may, thus, be generated in accordance with the electrical currents through the partial electrodes.

Generally, the evaluation device 154 may be part of a data processing device 158 and/or may comprise one or more data processing devices 158. The evaluation device 154 may be fully or partially integrated into the housing 118 and/or may fully or partially be embodied as a separate device which is electrically connected in a wireless or wire-bound fashion to the optical sensor 114. The evaluation device 154 may further comprise one or more additional components, such as one or more electronic hardware components and/or one or more software components, such as one or more measurement units and/or one or more evaluation units and/or one or more controlling units (not depicted here).

The light beam 124 for illumining the sensor region 132 of the optical sensor 114 may be generated by a light-emitting object 112. Alternatively or in addition, the light beam 124 may be generated by a separate illumination source 160, which may include an ambient light source and/or an artificial light source, such as a light-emitting diode, being adapted to illuminate the object 112 that the object 112 may be able to reflect at least a part of the light generated by the illumination source 160 in a manner that the light beam 124 may be configured to reach the sensor region 132 of the optical sensor 114, preferably by entering the housing 118 of the optical detector 110 through the opening 126 along the optical axis 116.

In a specific embodiment (not depicted here), the illumination source 160 may be a modulated light source, wherein one or more modulation properties of the illumination source 160 may be controlled by at least one optional modulation device. Alternatively or in addition, the modulation may be effected in a beam path between the illumination source 160 and the object 112 and/or between the object 112 and the optical sensor 114. Further possibilities may be conceivable. In this specific embodiment, it may be advantageous taking into account one or more of the modulation properties, in particular the modulation frequency, when evaluating the sensor signal of the optical sensor 114 for determining the at least one item of information on the position of the object 112.

FIGS. 2A to 2D present a number of embodiments for combinations of the at least one optical element 144 as used for the at least one optical sensor 114 and the at least one transfer device 120, wherein the respective embodiments may, preferably, be used, as displayed here or with modifications, as at least one of a longitudinal optical sensor or a transversal optical sensor. In addition, further combinations of the optical elements 144 and the transfer device 120 which are not depicted here may also be feasible.

FIG. 2A illustrates a further exemplary embodiment of the combination of the optical element 144 and the transfer device 120 similar to embodiment as already depicted in FIG. 1. Accordingly, the film 134 is placed on the surface 140 of the curved substrate 142, wherein the surface 140 faces the converging lens 122 of the transfer device 120. However, a plano-concave lens 162 is used as the optical lens 146, thus, constituting the optical element 144. Further, a surface 164 of the converging lens 122 is shaped as a spheric surface, wherein the spheric surface 164 is, as usually, defined by constituting a section out of a sphere. As a result, the single converging lens 122, which may, thus, be denominated as a spheric lens 166, is adapted for focusing a planar wave front at the focal point 150 at a distance from the converging lens 122. As already mentioned above, the focal point 150 of the transfer device 120 may, preferably, be located within the film 134 of the photoconductive material 136. Thus, in order to accomplish a configuration that not only image points for the light beams 124 along the optical axis 116 but also the image points for the light beams 124 off the optical axis 116 may be located at their respective focal point 150, the concave surface 140 of the optical lens 146 as used for the optical sensor 114 has been chosen as illustrated in FIGS. 1 and 2A. In order to accomplish this configuration, the surface 140 of the curved substrate 142 may, thus, assume a section of a so-called "Petzval" surface.

In the further exemplary embodiment as shown in FIG. 2B, again the biconcave lens 148 as used in the embodiment of FIG. 1 is employed here as the optical element 144 whereas the transfer device 120 comprises here an aspheric lens 168, also denominated as "asphere". As generally used, the aspheric lens 168 constitutes a type of the converging lens 122 in which the surface 164 may not constitute a spheric section. In particular compared to the spheric lens of FIGS. 1 and 2A, the aspheric lens 168 as illustrated FIG. 2B exhibits a function in a manner that it is adapted, to at least diminish or to, preferably, completely eliminate a spherical aberration with respect to the incident light beam 124. In addition, the aspheric lens 168 may also be adapted to diminish other kinds of optical aberrations, in particular astigmatism. As a result, the particularly preferred combination of the single aspheric lens 168 as the transfer device 120 and the biconcave lens 148, on whose surface 140 facing the aspheric lens 166 the film 134 is placed, as the optical element 144 used for the optical sensor 114 may already provide a simple and cost-efficient but, still, reliable basis for the detector 110.

In an alternative embodiment (not depicted here), instead of using the single aspheric lens 168 as illustrated FIG. 2B, a multi-lens system that may, in principle, exhibit the same function as the single aspheric lens 166, can also be employed.

FIG. 2C provides a schematic illustration of a further embodiment of a particularly preferred combination of the optical element 144 and the transfer device 120. The optical element 144 in the optical sensor 114 may, preferably, exhibit a meniscus 170 having the first surface 140, being a concave surface, and a second surface 172, being a convex surface, wherein the first surface 140 of the meniscus 170 faces the converging lens 122 whereas the second surface 172 of the meniscus 170 may look away from the converging lens 122. Consequently, the first surface 140 of the meniscus 170 facing the converging lens 122 may be equipped with the film 134 of the photoconductive material 136 and can, thus, be function in the same fashion as described with respect to FIGS. 1, 2A and 2B, wherein the focal point 150 of the converging lens 122 may, preferentially, be located in the film 134.

In contrast to the embodiments of FIGS. 1, 2A and 2B, the film 134 of the photoconductive material 136 may individually be placed on both surfaces 140, 172 of the meniscus 170, thus, comprising a first portion 174 on the first surface 140 and a second portion 176 on the second surface 170 of the meniscus 170. In a particularly preferred variant of this embodiment, the transfer device 120 may, again, comprise one or more of the converging lenses 122, which may constitute a bifocal lens 178 which can, especially, exhibit an additional focal point 180, wherein the additional focal point 180 may, preferentially, be located in the second portion 176 of the film 134 while the first focal point 150 may, as described above, be located in the first portion 174 of the film 134. However, instead of using the bifocal lens 178, the spheric lens 166 or the aspheric lens 168 may also be employed in a further preferred embodiment (not depicted here). As a result of this particular embodiment, the curved substrate 140 comprising the meniscus 170 as depicted in FIG. 2C may be adapted to carry two individual optical sensors 114.

In a preferred embodiment, one of the two optical sensors 114 may be chosen as a longitudinal optical sensor while the other of the two optical sensors 114 may be a transversal optical sensor. Consequently, by using the optical sensor 114 comprising the single optical element 144 both the depth and the width of object 112 may be determined concurrently. Thus, by choosing this particular arrangement for the two optical sensors 114, the corresponding optical detector 110 may exhibit a comparatively simple set-up which may only comprise two individual optical components, i.e. the transfer element 120 and the two-sided curved optical element 144. As a result, a fabrication of this kind of the optical detector 110 and a corresponding mounting of the only two individual optical components may be especially easy.

In an alternative embodiment in which the transfer device 120 may be selected from the spheric lens 166 or the aspheric lens 168, both optical sensors 114 as comprised by the single optical element 144 may be longitudinal optical sensors, i.e. a first longitudinal optical sensor and a second longitudinal optical sensor. Consequently, this kind of arrangement may be adapted to resolve the above-described ambiguity which may otherwise occur by using a single longitudinal optical sensor. Thus, in case the evaluation device 154, by evaluating the longitudinal sensor signals, may recognize that the beam cross-section of the light beam 124 on the sensor region 132 of the first longitudinal optical sensor is larger than the beam cross-section of the light beam 124 on the sensor region 132 of the second longitudinal optical sensor, wherein the second longitudinal optical sensor is located behind the first longitudinal optical sensor, the evaluation device 154 may determine that the light beam 124 is still narrowing and that the location of the first longitudinal optical sensor may be situated before the focal point of the light beam 124. Contrarily, in case the beam cross-section of the light beam 124 on the sensor region 132 of the first longitudinal optical sensor is smaller than the beam cross-section of the light beam on the sensor region 132 of the second longitudinal optical sensor, the evaluation device 154 may, accordingly, determine that the light beam 124 is widening and that the location of the second longitudinal optical sensor is situated behind the focal point. Thus, in this particular embodiment, the evaluation device 154 may be adapted to recognize whether the light beam 154 widens or narrows, by comparing the longitudinal sensor signals of the two individual longitudinal sensors as comprised by the single optical element 144. For further information about emerging and resolving the ambiguity as indicated here, reference may be made to WO 2014/097181 A1 and the corresponding description above.

FIG. 2D illustrates a further embodiment of a particularly preferred combination of the transfer device 120 and the at least one optical element 144. Herein, the transfer device 120 comprises an optical grating 182 which may, particularly, exhibit an equal spacing of the associated grating lines on a concave surface 164. As a result, the incident light beam 124 which can, as depicted here, provided through an entrance slit 184 located on a circle 186 usually denoted as "Rowland circle", the light beam 124 which may pass through the entrance slit 184 and strike the optical grating 182 having the concave surface 164 can be split into spectrally resolved reflected beams 188 of all diffraction orders, which are spectrally resolved between a first wavelength $\lambda_1$ and a second wavelength $\lambda_2$. Herein, the reflected beams 188 may have their focus 190, for any wavelength between the first wavelength $\lambda_1$ and the second wavelength $\lambda_2$, at a position on the Rowland circle 186. It may be emphasized here that, for sake of clarity, only a single spectrally resolved reflected beam 188 for a single diffraction order has schematically been depicted in FIG. 2D.

Thus, in order to setup a spectrometer, it may be advantageous to locate the at least one optical sensor 114 at a position on the Rowland circle 186 where the reflected beams 188 exhibit their focus 190. For the purpose of accomplishing a spectral resolution, the sensor region 132 of the at least one optical sensor 114 may, preferably, be or comprise an array of sensor areas, such as a linear array of sensor areas which may, in particular, be arranged in an adjacent manner within a plane defined by the spectrally resolved beam 188 as reflected by the optical grating 182. Thus, the optical sensor 114 may allow detecting an intensity of the incident light beam 124 resolved as a function of the wavelength. Consequently, this arrangement may enable employing the above-described optical grating 182 having the equal spacing of the associated grating lines on the concave surface 164, which is, in general, easier to manufacture compared to optical gratings which have a non-equal spacing of the grating lines, in a spectrometer.

Figure 3:
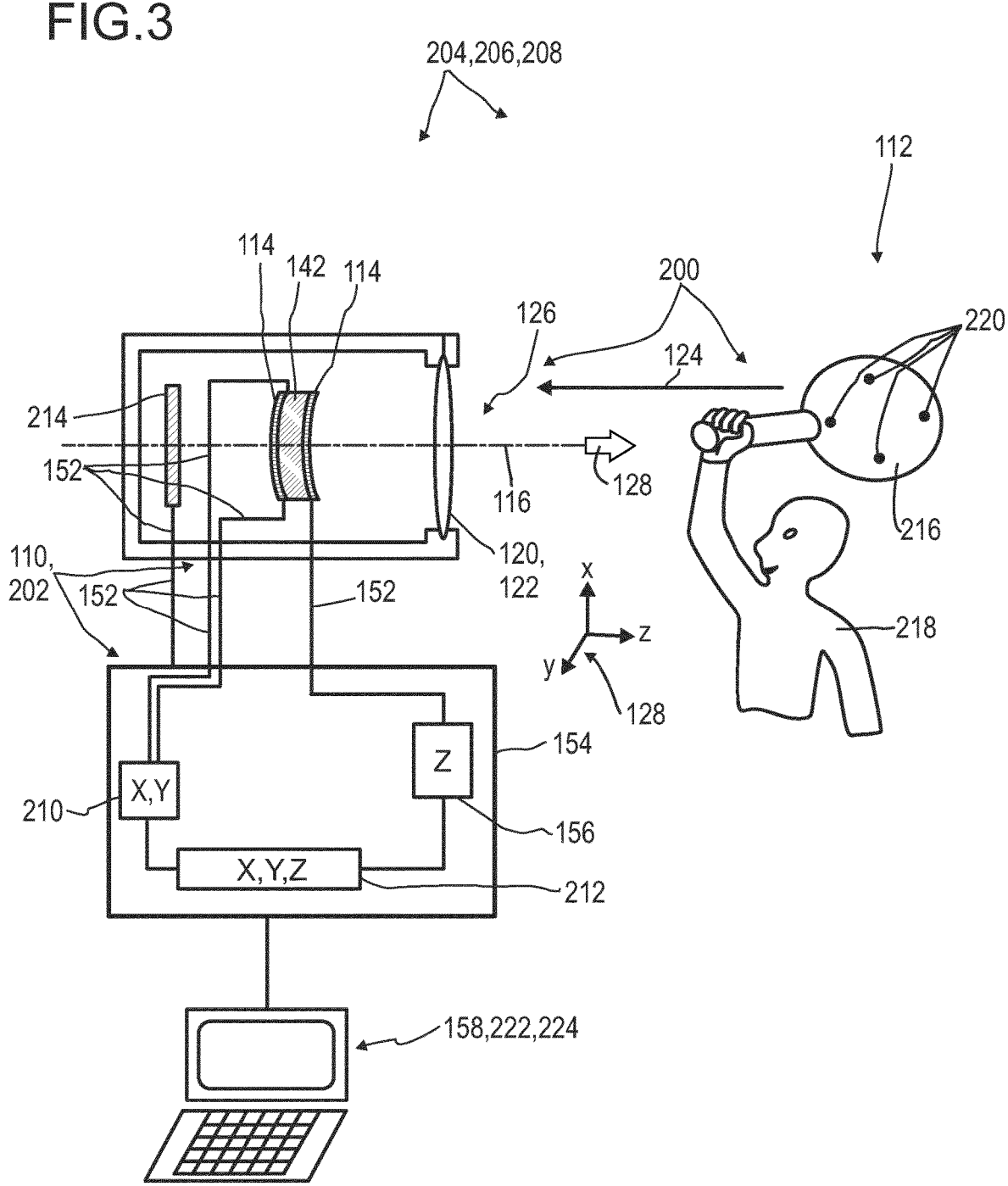
FIG. 3 shows an exemplary embodiment of an optical detector, a detector system, a human-machine interface, an entertainment device, a tracking system and a camera according to the present invention.

As a further example, FIG. 3 shows an exemplary embodiment of a detector system 200, comprising at least one optical detector 110, such as the optical detector 110 as disclosed in one or more of the embodiments shown in FIGS. 1, and 2A to 2D. Herein, the optical detector 110 may be employed as a camera 202, specifically for 3D imaging, which may be made for acquiring images and/or image sequences, such as digital video clips. Further, FIG. 3 shows an exemplary embodiment of a human-machine interface 204, which comprises the at least one detector 110 and/or the at least one detector system 200, and, further, an exemplary embodiment of an entertainment device 206 comprising the human-machine interface 204. FIG. 3 further shows an embodiment of a tracking system 208 adapted for tracking a position of at least one object 112, which comprises the detector 110 and/or the detector system 200.

With regard to the optical detector 110 and to the detector system 200, reference may be made to the full disclosure of this application. Basically, all potential embodiments of the detector 110 may also be embodied in the embodiment shown in FIG. 3. The evaluation device 154 may be connected to each of the two longitudinal optical sensors 114 as depicted here, in particular, by the signal leads 152. Herein, the detector 110 comprises two optical sensors 114, wherein, as described above, one of the two optical sensors 114 may be chosen as a longitudinal optical sensor while the other of the two optical sensors 114 may be a transversal optical sensor, thus, allowing the optical sensor 114 concurrently determining both the depth and the width of object 112. In an alternative embodiment (not depicted here), a use of two longitudinal optical sensors 114 may support the evaluation of the longitudinal sensor signals without any remaining ambiguity. By way of example, the signal leads 152 may be provided and/or one or more interfaces, which may be wireless interfaces and/or wire-bound interfaces. Further, the signal leads 152 may comprise one or more drivers and/or one or more measurement devices for generating sensor signals and/or for modifying sensor signals. Further, again, the at least one transfer device 120 is provided, in particular as the converging lens 122 or convex mirror. The optical detector 110 may further comprise the at least one housing 118 which, as an example, may encase one or more of the optical sensors 114.

Further, the evaluation device 154 may fully or partially be integrated into the optical sensors 114 and/or into other components of the optical detector 110. The evaluation device 154 may also be enclosed into housing 118 and/or into a separate housing. The evaluation device 154 may comprise one or more electronic devices and/or one or more software components, in order to evaluate the sensor signals, which are symbolically denoted by the longitudinal evaluation unit 156 (denoted by "z") and a transversal evaluation unit 210 (denoted by "xy"). By combining results derived by these evolution units 156, 210, a position information 212, preferably a three-dimensional position information, may be generated (denoted by "x, y, z").

Further, the optical detector 110 and/or to the detector system 200 may comprise an imaging device 214 which may be configured in various ways. Thus, as depicted in FIG. 3, the imaging device 214 can for example be part of the detector 110 within the detector housing 118. Herein, the imaging device signal may be transmitted by one or more imaging device signal leads 152 to the evaluation device 154 of the detector 110. Alternatively, the imaging device 214 may be separately located outside the detector housing 118. The imaging device 214 may be fully or partially transparent or intransparent. The imaging device 214 may be or may comprise an organic imaging device or an inorganic imaging device. Preferably, the imaging device 214 may comprise at least one matrix of pixels, wherein the matrix of pixels may particularly be selected from the group consisting of: an inorganic semiconductor sensor device such as a CCD chip and/or a CMOS chip; an organic semiconductor sensor device.

In the exemplary embodiment as shown in FIG. 3, the object 112 to be detected, as an example, may be designed as an article of sports equipment and/or may form a control element 216, the position and/or orientation of which may be manipulated by a user 218. Thus, generally, in the embodiment shown in FIG. 3 or in any other embodiment of the detector system 200, the human-machine interface 204, the entertainment device 206 or the tracking system 208, the object 112 itself may be part of the named devices and, specifically, may comprise the at least one control element 216, specifically, wherein the at least one control element 216 has one or more beacon devices 220, wherein a position and/or orientation of the control element 216 preferably may be manipulated by user 218. As an example, the object 112 may be or may comprise one or more of a bat, a racket, a club or any other article of sports equipment and/or fake sports equipment. Other types of objects 112 are possible. Further, the user 218 may be considered as the object 112, the position of which shall be detected. As an example, the user 218 may carry one or more of the beacon devices 220 attached directly or indirectly to his or her body.

The optical detector 110 may be adapted to determine at least one item on a longitudinal position of one or more of the beacon devices 220 and, optionally, at least one item of information regarding a transversal position thereof, and/or at least one other item of information regarding the longitudinal position of the object 112 and, optionally, at least one item of information regarding a transversal position of the object 112. Particularly, the optical detector 110 may be adapted for identifying colors and/or for imaging the object 112, such as different colors of the object 112, more particularly, the color of the beacon devices 220 which might comprise different colors. The opening 126 in the housing 118, which, preferably, may be located concentrically with regard to the optical axis 116 of the detector 110, may preferably define a direction of a view 128 of the optical detector 110.

The optical detector 110 may be adapted for determining the position of the at least one object 112. Additionally, the optical detector 110, specifically an embodiment including the camera 202, may be adapted for acquiring at least one image of the object 112, preferably a 3D-image. As outlined above, the determination of a position of the object 112 and/or a part thereof by using the optical detector 110 and/or the detector system 200 may be used for providing a human-machine interface 204, in order to provide at least one item of information to a machine 222. In the embodiments schematically depicted in FIG. 3, the machine 222 may be or may comprise at least one computer and/or a computer system comprising the data processing device 158. Other embodiments are feasible. The evaluation device 154 may be a computer and/or may comprise a computer and/or may fully or partially be embodied as a separate device and/or may fully or partially be integrated into the machine 222, particularly the computer. The same holds true for a track controller 224 of the tracking system 208, which may fully or partially form a part of the evaluation device 154 and/or the machine 222.

Similarly, as outlined above, the human-machine interface 204 may form part of the entertainment device 206. Thus, by means of the user 218 functioning as the object 112 and/or by means of the user 218 handling the object 112 and/or the control element 216 functioning as the object 112, the user 218 may input at least one item of information, such as at least one control command, into the machine 222, particularly the computer, thereby varying the entertainment function, such as controlling the course of a computer game.

As outlined above, the detector 110 may have a straight beam path or a tilted beam path, an angulated beam path, a branched beam path, a deflected or split beam path or other types of beam paths. Further, the light beam 124 may propagate along each beam path or partial beam path once or repeatedly, unidirectionally or bidirectionally. Thereby, the components listed above or the optional further components listed in further detail below may fully or partially be located in front of the optical sensors 114 and/or behind the optical sensors 114.

LIST OF REFERENCE NUMBERS 110 detector
112 object
114 optical sensor
116 optical axis
118 housing
120 transfer device
122 converging lens
124 beam path
126 opening
128 direction of view
130 coordinate system
132 sensor region
134 film
136 photoconductive material
138 chalcogenide material
140 (first) surface of the curved substrate
142 curved substrate
144 optical element
146 optical lens
148 biconcave lens
150 focal point
152 signal leads
154 evaluation device
156 longitudinal evaluation unit
158 data processing device
160 illumination source
162 plano-concave lens
164 surface of the converging lens
166 spheric lens
168 aspheric lens (asphere)
170 meniscus
172 second surface of the curved substrate
174 first portion of film
176 second portion of film
178 bifocal lens
180 additional focal point
182 grating
184 entrance slit
186 Rowland circle
188 spectrally resolved reflected beams
190 focus
200 detector system
202 camera
204 human-machine interface
206 entertainment device
208 tracking system
210 transversal evaluation unit
212 position information
214 imaging device
216 control element
218 user
220 beacon device
222 machine
224 track controller

The invention claimed is:

1. A detector, comprising:
   at least one optical sensor having at least one sensor region comprising at least one curved substrate and at least one film having a photoconductive material, wherein the film is placed on at least one surface of the curved substrate, wherein the optical sensor is configured to generate at least one sensor signal in a manner dependent on an illumination of the sensor region by a light beam;
   at least one transfer device adapted to transfer the light beam from an object to be detected to the optical sensor, thereby being adapted to guide the light beam to the film located on the curved substrate; and
   at least one evaluation device, wherein the evaluation device is configured to generate at least one item of information on a position of the object by evaluating the sensor signal of the optical sensor;
   wherein the curved substrate comprises an optical element, wherein the optical element is at least partially optically transparent with respect to at least a portion of a wavelength range of the light beam; and
   wherein the at least one transfer device is an aspheric lens, the optical element is a biconcave lens, and the biconcave lens comprises the at least one surface on which the film is placed, the at least one surface facing the aspheric lens.

2. The detector according to claim 1, wherein the transfer device has at least one focal point, wherein the curved substrate and the transfer device are placed with respect to each other in a manner such that at least one of the at least one focal point is located in the film placed on the curved substrate.

3. The detector according to claim 2, wherein the optical element comprises at least two individually curved surfaces.

4. The detector according to claim 3, wherein the at least two individually curved surfaces are placed with respect to each other in a manner such that the focal point is located in the film placed on at least one of the at least two individually curved surfaces.

5. The detector according to claim 3, wherein the transfer device has at least two focal points, wherein the focal points are located at different positions with respect to each other, wherein the at least two individually curved surfaces are placed with respect to each other in a manner that each of the at least two focal points are placed in at least one of an individual film placed on each of the at least two individually curved substrates.

6. The detector according to claim 5, wherein the at least two individually curved surfaces are placed with respect to each other in a manner such that each of the at least two focal points are placed in at least one of the individual films.

7. The detector according to claim 1, wherein the transfer device further comprises a diffractive optical element, wherein the diffractive optical element is at least partially optically transparent with respect to at least a portion of a wavelength range of the light beam, wherein the diffractive optical element is adapted to split the light beam into at least two split beams, wherein the optical sensor and the transfer device are placed with respect to each other in a manner that the split beams are guided to the film, wherein the split beams are guided to at least one of the same film, portions of the film comprised on the same optical sensor, or at least two individual films placed on at least two different curved surfaces.

8. The detector according to claim 1, wherein the detector comprises more than one optical sensor, each sensor arranged in a manner such that each light beam impinges only a single one of the optical sensors.

9. The detector according to claim 1, wherein the photoconductive material comprises at least one selected from the group consisting of selenium, tellurium, a selenium-tellurium alloy, a metal oxide, a group IV element or compound, a III-V compound, a II-VI compound, a chalcogenide, a pnictogenide, and a halide.

10. The detector according to claim 9, wherein the photoconductive material is selected from the group consisting of lead sulfide (PbS), lead selenide (PbSe), cadmium telluride (CdTe), and mercury zinc telluride (HgZnTe; MZT).

11. The detector according to claim 1, wherein at least one of the at least one optical sensor is a longitudinal optical sensor configured to generate at least one longitudinal sensor signal, the longitudinal sensor signal, given the same total power of the illumination, being dependent on a beam cross-section of the light beam in the sensor region, wherein the evaluation device is configured to generate at least one item of information on a longitudinal position of the object by evaluating the longitudinal sensor signal of the longitudinal optical sensor.

12. The detector according to claim 1, wherein at least one of the at least one optical sensor is a transversal optical sensor comprising at least one pair of electrodes, wherein the electrodes contact the film of the photoconductive material, wherein the electrodes are split electrodes each comprising at least two partial electrodes, wherein electrical currents through the partial electrodes are dependent on a position of the light beam in the sensor region, wherein the transversal sensor signal is generated in accordance with the electrical currents through the partial electrodes.

13. A method for an optical detection of at least one object, the method comprising:
    generating at least one longitudinal sensor signal with at least one optical sensor having at least one sensor region comprising at least one curved substrate and at least one film of a photoconductive material, wherein the film is placed on at least one surface of the curved substrate, wherein the optical sensor is configured to generate at least one sensor signal in a manner dependent on an illumination of the sensor region by a light beam, wherein at least one transfer device is adapted to transfer the light beam from the object to the optical sensor, thereby being adapted to guide the light beam to the film located on the curved substrate; and
    generating at least one item of information on a position of the object by evaluating the sensor signal of the optical sensor;
    wherein the curved substrate comprises an optical element, wherein the optical element is at least partially optically transparent with respect to at least a portion of a wavelength range of the light beam; and
    wherein the at least one transfer device is an aspheric lens, the optical element is a biconcave lens, and the biconcave lens comprises the at least one surface on which the film is placed, the at least one surface facing the aspheric lens.

* * * * *